United States Patent
Gao et al.

(10) Patent No.: US 7,388,061 B2
(45) Date of Patent: Jun. 17, 2008

(54) SOLID CATALYST COMPONENT FOR POLYMERIZATION OF OLEFINS, CATALYST COMPRISING THE SAME AND USE THEREOF

(75) Inventors: Mingzhi Gao, Beijing (CN); Haitao Liu, Beijing (CN); Zhulan Li, Beijing (CN); Jun Wang, Beijing (CN); Juxiu Yang, Beijing (CN); Tianyi Li, Beijing (CN); Xiaodong Wang, Beijing (CN); Changxiu Li, Beijing (CN); Chunming Ding, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 106 days.

(21) Appl. No.: 10/503,515

(22) PCT Filed: Jan. 30, 2003

(86) PCT No.: PCT/CN03/00110

§ 371 (c)(1),
(2), (4) Date: Oct. 7, 2004

(87) PCT Pub. No.: WO03/068828

PCT Pub. Date: Aug. 21, 2003

(65) Prior Publication Data

US 2005/0239636 A1    Oct. 27, 2005

(30) Foreign Application Priority Data

Feb. 7, 2002  (CN) ................................ 02 1 00900

(51) Int. Cl.
C08F 4/42    (2006.01)
(52) U.S. Cl. ................ 526/142; 526/124.3; 526/124.2; 526/348; 502/103; 502/121; 502/125; 502/127
(58) Field of Classification Search ................ 502/108, 502/109, 121, 123, 125–127, 132–134, 103; 526/124.9, 124.2, 124.3, 348, 103, 121, 125, 526/124, 142
See application file for complete search history.

(56) References Cited

U.S. PATENT DOCUMENTS 4,784,983 A * 11/1988 Mao et al. .................. 502/111
5,122,492 A * 6/1992 Albizzati et al. ........... 502/120
5,583,188 A * 12/1996 Kashiwa et al. ............ 502/123
6,204,215 B1 * 3/2001 Kadoi et al. ................ 502/127
6,303,715 B1 * 10/2001 Kim et al. ................... 526/128
6,331,620 B1 * 12/2001 Kadoi et al. ................ 502/127
6,495,639 B1 * 12/2002 Kadoi et al. ................ 502/127
6,541,582 B1 * 4/2003 Morini et al. ............... 502/127

FOREIGN PATENT DOCUMENTS

| CN | 1099041 | 2/1995 |
| CN | 1259528 | 7/2000 |
| DE | 1 9927979 | 10/2000 |
| EP | 0 489 536 A2 * | 6/1992 |
| EP | 0489536 | 6/1992 |

* cited by examiner

Primary Examiner—Ling-Siu Choi
(74) Attorney, Agent, or Firm—Ladas & Parry LLP

(57) ABSTRACT

The present invention provides a solid catalyst component for the polymerization of olefins, comprising magnesium, titanium, a halogen and an electron donor, wherein said electron donor comprises at least one selected from the group consisting of ester of polyol of the formula (I):

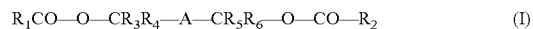

wherein, $R_1$ and $R_2$ groups, which may be identical or different, can be substituted or unsubstituted hydrocarbyl having 1 to 20 carbon atoms, $R_3$-$R_6$ groups, which may be identical or different, can be selected from the group consisting of hydrogen, halogen or substituted or unsubstituted hydrocarbyl having 1 to 20 carbon atoms, $R_1$-$R_6$ groups optionally contain one or more hetero-atoms replacing carbon, hydrogen atom or the both, said hetero-atom is selected from the group consisting of nitrogen, oxygen, sulfur, silicon, phosphorus and halogen atom, two or more of $R_3$-$R_6$ groups can be linked to form saturated or unsaturated monocyclic or polycyclic ring A is a single bond or bivalent linking group with chain length between two free radicals being 1-10 atoms, wherein said bivalent linking group is selected from the group consisting of aliphatic, alicyclic and aromatic bivalent radicals, and can carry $C_1$-$C_{20}$ linear or branched substituents one or more of carbon atom and/or hydrogen atom on above-mentioned bivalent linking group and substituents can be replaced by a hetero-atom selected from the group consisting of nitrogen, oxygen, sulfur, silicon, phosphorus, and halogen atom, and two or more said substituents on the linking group as well as above-mentioned $R_3$-$R_6$ groups can be linked to form saturated or unsaturated monocyclic or polycyclic ring.

35 Claims, No Drawings

SOLID CATALYST COMPONENT FOR POLYMERIZATION OF OLEFINS, CATALYST COMPRISING THE SAME AND USE THEREOF

CROSS REFERENCE OF RELATED APPLICATION

The present application claims priority based on Chinese Patent Application No. 02100900.7, filed on Feb. 7, 2002, which is incorporated herein by reference in its entirety and for all purposes.

TECHNICAL FIELD

The present invention relates to a solid catalyst component for polymerization of olefins, in particular, to a solid catalyst component comprising at least one special type of polyol ester compound, a catalyst comprising the solid catalyst component and its use in the polymerization of $CH_2=CHR$, in which R is hydrogen or $C_1$-$C_6$ alkyl or aryl group. Especially in the polymerization of propylene, high isotactic polymer can be obtained in high yield.

TECHNICAL BACKGROUND

It is well known that solid titanium catalyst component with magnesium, titanium, halogen and electron donor as basic compositions can be used in the polymerization of olefin $CH_2=CHR$, especially in the polymerization of alpha-olefins having 3 or more carbon atoms, higher isotactic polymer can be obtained in higher yield. An electron donor compound is one of indispensable compositions of catalyst component, and with the development of internal donor compound, polyolefin catalyst is continuously renovated. At present, a large amount of various electron donor compounds have been disclosed, for instance, polycarboxylic acids, monocarboxylic esters or polycarboxylic esters, anhydrides, ketones, monoethers or polyethers, alcohols, amines, and their derivatives, among of which aromatic dicarboxylic ester, such as di-n-butyl phthalate or diisobutyl phthalate (cf. U.S. Pat. No. 4,784,983), is common.

In recent years, the use of other compounds as electron donor compounds of catalyst for polymerization of olefins have been tried, for examples, U.S. Pat. No. 4,971,937 and EP 0728769 disclosed a catalyst component for polymerization of olefins, which used special 1,3-diether compounds containing two ether groups, such as 2-isoamyl-2-isopropyl-1,3-dimethoxypropane, 2,2-diisobutyl-1,3-dimethoxypropane and 9,9-bis(methoxymethyl)fluorene and the like as electron donor.

Lately, a special type of aliphatic dicarboxylic ester compounds, such as succinate, malonate, glutarate and the like had been disclosed (cf. WO98/56830, WO98/56834, WO01/57099, WO01/63231 and WO00/55215), and the use of said electron donor compound not only enhanced the activity of catalyst but also substantially broadened the distribution of the molecular weight of the propylene polymer obtained.

However, above-mentioned olefin polymerization catalysts prepared utilizing disclosed aromatic dicarboxylic ester compound, 1,3-diether compound containing two ether groups and aliphatic dicarboxylic ester compound exist certain defects in actual use. For instance, the catalytic activity of the catalyst with aromatic dicarboxylic ester compound is low, and the distribution of the molecular weight of the polymer obtained is narrow; although the catalyst with 1,3-diether compound has high catalytic activity and good hydrogen response, the distribution of the molecular weight of the polymer obtained is narrow, and this is disadvantageous in the development of different grades of polymers; and the catalytic activity of the catalyst with aliphatic dicarboxylic ester compound disclosed recently is still some low, and when external donor compound is not used, the isotacticity of the polymer obtained is lower.

The inventors have surprisingly found that an olefin polymerization catalyst with excellent general properties can be obtained by using a polyol ester compound with a special structure as electron donor. When the catalyst is used in the polymerization of propylene, satisfactory polymerization yield can be obtained, and the stereo-direction of the polymer is very high. Even if an external donor is not used, relatively high isotactic polymer can still be obtained. Meanwhile, the hydrogen response of the catalyst is excellent, and the distribution of the molecular weight of the polymer obtained is relatively wide, and these properties are desirable in the development of different grades of polymers. In addition, when the catalyst is used in the copolymerization of olefins, especially in the copolymerization of ethylene and propylene, less gel content can be achieved, therefore, it has better copolymerization property.

SUMMARY OF THE INVENTION

One of the object of the invention is to provide a solid catalyst component for polymerization of olefin $CH_2=CHR$, in which R is hydrogen or $C_1$-$C_6$ alkyl or aryl group, comprising magnesium, titanium, a halogen and an electron donor compound, wherein said electron donor compound comprises at least one polyol ester compounds of the formula (I):

$$R_1CO-O-CR_3R_4\text{-}A\text{-}CR_5R_6O-CO-R_2 \qquad (I)$$

wherein, $R_1$ and $R_2$ groups, which may be identical or different, can be substituted or unsubstituted hydrocarbyl having 1 to 20 carbon atoms, $R_3$-$R_6$ groups, which may be identical or different, can be selected from the group consisting of hydrogen, halogen or substituted or unsubstituted hydrocarbyl having 1 to 20 carbon atoms, $R_1$-$R_6$ groups optionally contain one or more hetero-atoms replacing carbon, hydrogen atom or the both, said hetero-atom is selected from the group consisting of nitrogen, oxygen, sulfur, silicon, phosphorus and halogen atom, two or more of $R_3$-$R_6$ groups can be linked to form saturated or unsaturated monocyclic or polycyclic ring;

A is a single bond or bivalent linking group with chain length between two free radicals being 1-10 atoms, wherein said bivalent linking group is selected from the group consisting of aliphatic, alicyclic and aromatic bivalent radicals, and can carry $C_1$-$C_{20}$ linear or branched substituents; one or more of carbon atom and/or hydrogen atom on above-mentioned bivalent linking group and substituents can be replaced by a hetero-atom selected from the group consisting of nitrogen, oxygen, sulfur, silicon, phosphorus, and halogen atom, and two or more said substituents on the linking group as well as above-mentioned $R_3$-$R_6$ groups can be linked to form saturated or unsaturated monocyclic or polycyclic ring.

Another object of the invention is to provide a solid catalyst component for the polymerization of olefin $CH_2=CHR$ mentioned above, comprising magnesium, titanium, a halogen and an electron donor compound, wherein said electron donor compound comprises a combination of at least one polyol ester compound of formula (I) and other known internal electron donor compounds.

Yet another object of the invention is to provide a solid catalyst component for the polymerization of olefin mentioned above, comprising a reaction product of titanium compound, magnesium compound, and a polyol ester compound of the invention.

Yet still another object of the invention is to provide a catalyst for polymerization of olefin $CH_2=CHR$, wherein R is hydrogen or $C_1$-$C_6$ alkyl or aryl group, the catalyst comprising a reaction product of the following components:
(a) a solid catalyst component according to the present invention, comprising Mg, Ti, halogen and polyol ester compound of formula (I) of the invention;
(b) at least one organoaluminum compound of formula $AlR_nX_{3-n}$, in which R is hydrogen or hydrocarbyl having 1 to 20 carbon atoms, X is halogen, n is a value satisfying $1<n\leq 3$; and
(c) optionally, one or more of external donor compounds.

One more object of the invention is to provide a prepolymerized catalyst for polymerization of olefin $CH_2=CHR$, in which R is hydrogen or $C_1$-$C_6$ alkyl or aryl group, comprising a prepolymer obtained by prepolymerizing an olefin in the presence of the solid catalyst component according to any one of Claims 1-20 to the extent such that 0.1-1000 gram of olefin polymer per gram of solid catalyst component is obtained.

One more object of the invention is to provide a process for the polymerization of olefin $CH_2=CHR$, in which R is hydrogen or $C_1$-$C_6$ alkyl or aryl group, comprising the step of contacting olefin(s) with the catalyst of the invention under olefin polymerization conditions.

DETAILED DESCRIPTION OF THE INVENTION

The invention provides a solid catalyst component for polymerization of olefin $CH_2=CHR$, in which R is hydrogen or $C_1$-$C_6$ alkyl or aryl, comprising magnesium, titanium, halogen and an electron donor, wherein said electron donor comprises at least one polyol ester compounds of the formula (I):

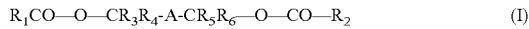

(I)

wherein, $R_1$ and $R_2$ groups, which may be identical or different, can be substituted or unsubstituted hydrocarbyl having 1 to 20 carbon atoms, $R_3$-$R_6$ groups, which may be identical or different, can be selected from the group consisting of hydrogen, halogen or substituted or unsubstituted hydrocarbyl having 1 to 20 carbon atoms, $R_1$-$R_6$ groups optionally contain one or more hetero-atoms replacing carbon, hydrogen atom or the both, said hetero-atom is selected from the group consisting of nitrogen, oxygen, sulfur, silicon, phosphorus and halogen atom, two or more of $R_3$-$R_6$ groups can be linked to form saturated or unsaturated monocyclic or polycyclic ring;
A is a single bond or bivalent linking group with chain length between two free radicals being 1-10 atoms, wherein said bivalent linking group is selected from the group consisting of aliphatic, alicyclic and aromatic bivalent radicals, and can carry $C_1$-$C_{20}$ linear or branched substituents; one or more of carbon atom and/or hydrogen atom on above-mentioned bivalent linking group and substituents can be replaced by a hetero-atom selected from the group consisting of nitrogen, oxygen, sulfur, silicon, phosphorus, and halogen atom, and two or more said substituents on the linking group as well as above-mentioned $R_3$-$R_6$ groups can be linked to form saturated or unsaturated monocyclic or polycyclic ring.

As used herein, the term "hydrocarbyl" intend to include linear or branched aliphatic radical, such as alkyl, alkenyl, and alkynyl; alicyclic radical, such as cycloalkyl, cycloalkenyl; aromatic radical, such as monocyclic or polycyclic aromatic radical, as well as a combination thereof, such as alkaryl and aralkyl.

In a preferred embodiment of the invention, said polyol ester compound of formula (I) is compounds of formula (II):

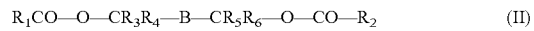

(II)

wherein, $R_1$-$R_6$ have meanings as defined in formula (I),
B is a single bond or bivalent linking group with chain length between two free radicals being 1-10 atoms, wherein said bivalent linking group is selected from the group consisting of aliphatic, alicyclic or aromatic bivalent radicals, and can carry $C_1$-$C_{20}$ linear or branched substituents, one or more of carbon atom and/or hydrogen atom on the substituents can be replaced by a hetero-atom selected from the group consisting of nitrogen, oxygen, sulfur, silicon, phosphorus, and halogen atom, and two or more said substituents as well as above-mentioned $R_3$-$R_6$ groups can be linked to form saturated or unsaturated monocyclic or polycyclic ring.

In a more preferred embodiment of the invention, said $R_3$, $R_4$, $R_5$, and $R_6$ in the formula (II) are not all hydrogen simultaneously. In another more preferred embodiment of the invention, at least one group of $R_3$, $R_4$, $R_5$ and $R_6$ in the formula (II) is selected from the group consisting of halogen, $C_1$-$C_{10}$ linear or branched alkyl, $C_3$-$C_{10}$ cycloalkyl, $C_6$-$C_{10}$ aryl, and $C_7$-$C_{10}$ alkaryl or aralkyl group. In another more preferred embodiment of the invention, at least one group of $R_3$, $R_4$, $R_5$ and $R_6$ in the formula (II) is selected from the group consisting of methyl, ethyl, propyl, isopropyl, butyl, tert-butyl, phenyl, and halophenyl group. In another more preferred embodiment of the invention, at least one group among $R_3$ and $R_4$, and at least one group among $R_5$ and $R_6$ in the formula (II) are independently selected from the group consisting of methyl, ethyl, propyl, isopropyl, butyl, tert-butyl, phenyl, and halophenyl group.

In polyol ester compounds of formula (I) and formula (II), $R_1$ and $R_2$ are preferably selected from the group consisting of benzene-ring-containing group, such as phenyl, phenyl substituted by alkyl, alkoxy or halogen, optionally the carbon atom(s) on the benzene ring being replaced by a hetero-atom of oxygen atom and/or nitrogen atom; alkenyl or phenyl substituted alkenyl, such as vinyl, propenyl, styryl; alkyl, such as methyl, ethyl, propyl, etc. More preferably, at least one of $R_1$ and $R_2$ is a benzene-ring-containing group, still more preferably, both $R_1$ and $R_2$ are a benzene-ring-containing group, and most preferably, $R_1$ and $R_2$ are independently selected from the group consisting of phenyl, halophenyl, alkylphenyl, and haloalkylphenyl.

In one embodiment of the invention, B in formula (II) is a single bond, and said polyol ester compound is 1,2-diol ester compound of the following formula:

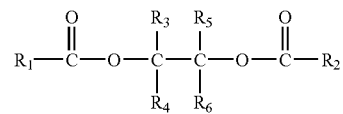

wherein $R_3$, $R_4$, $R_5$, and $R_6$ have meanings as defined in formula (II). In the 1,2-diol ester compound of above formula, preferably, one of $R_3$ and $R_4$, $R_5$ and $R_6$, respectively, is hydrogen, and the other is methyl, ethyl, propyl, isopropyl, butyl, tert-butyl, phenyl, or halophenyl.

In one embodiment of the invention, B in formula (II) is substituted or unsubstituted methylene, and said polyol ester compound is 1,3-diol ester compound of the following formula:

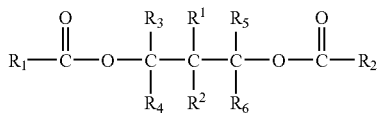

wherein $R_3$, $R_4$, $R_5$, and $R_6$ have meanings as defined in formula (II), $R^1$ and $R^2$, which are identical or different, represent hydrogen or methyl, ethyl, propyl, isopropyl, butyl, tert-butyl, allyl, phenyl, or halophenyl group. In the 1,3-diol ester compound of above formula, preferably, $R^1$, $R^2$, $R_3$, $R_4$, $R_5$, $R_6$ are not all hydrogen simultaneously, more preferably, at least one group of $R_3$, $R_4$, $R_5$ and $R_6$ is selected from the group consisting of methyl, ethyl, propyl, isopropyl, butyl, tert-butyl, phenyl, or halophenyl. Still more preferably, one of $R_3$ and $R_4$, $R_5$ and $R_6$, respectively, is hydrogen, and the other is methyl, ethyl, propyl, isopropyl, butyl, tert-butyl, phenyl, or halophenyl.

In one embodiment of the invention, B in formula (II) is substituted or unsubstituted ethylene, and said polyol ester compound is 1,4-diol ester compound of the following formula:

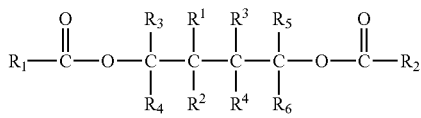

wherein $R_3$, $R_4$, $R_5$, and $R_6$ have meanings as defined in formula (II), $R^1$-$R^4$, which are identical or different, represent hydrogen or methyl, ethyl, propyl, isopropyl, butyl, tert-butyl, allyl, phenyl, or halophenyl group. In the 1,4-diol ester compound of above formula, preferably, at least one group of $R_3$, $R_4$, $R_5$ and $R_6$ is selected from the group consisting of methyl, ethyl, propyl, isopropyl, butyl, tert-butyl, phenyl, or halophenyl. More preferably, one of $R_3$ and $R_4$, $R_5$ and $R_6$, respectively, is hydrogen, and the other is methyl, ethyl, propyl, isopropyl, butyl, tert-butyl, phenyl, or halophenyl.

In one embodiment of the invention, B in formula (II) is substituted or unsubstituted trimethylene, and said polyol ester compound is 1,5-diol ester compound of the following formula:

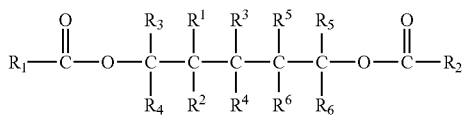

wherein $R_3$, $R_4$, $R_5$, and $R_6$ have meanings as defined in formula (II), $R^1$-$R^6$, which are identical or different, represent hydrogen or methyl, ethyl, propyl, isopropyl, butyl, tert-butyl, allyl, phenyl, or halophenyl group. In the 1,5-diol ester compound of above formula, preferably, $R^1$-$R^6$ and $R_3$-$R_6$ are not all hydrogen simultaneously.

In one embodiment of the invention, B in formula (II) is substituted or unsubstituted tetramethylene, and said polyol ester compound is 1,6-diol ester compound of the following formula:

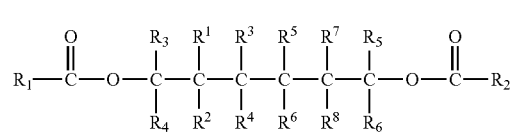

wherein $R_3$-$R_6$ have meanings as defined in formula (II), $R^1$-$R^8$, which are identical or different, represent hydrogen or methyl, ethyl, propyl, isopropyl, butyl, tert-butyl, allyl, phenyl, or halophenyl group. In the 1,6-diol ester compound of above formula, preferably, $R^1$-$R^8$ and $R_3$-$R_6$ are not all hydrogen simultaneously.

Examples of suitable polyol ester compounds of the formula (I) and formula (II) include, but not are limited to:

1,2-propylene-glycol dibenzoate
1,2-propylene-glycol di(p-chlorobenzoate)
1,2-propylene-glycol di(m-chlorobenzoate)
1,2-propylene-glycol di(p-bromobenzoate)
1,2-propylene-glycol di(o-bromobenzoate)
1,2-propylene-glycol di(p-methylbenzoate)
1,2-propylene-glycol di(p-tert-butylbenzoate)
1,2-propylene-glycol di(p-butylbenzoate)
1,2-propylene-glycol monobenzoate monocinnamate
1,2-propylene-glycol dicinnamate
2-methyl-1,2-propylene-glycol dibenzoate
2-methyl-1,2-propylene-glycol di(p-chlorobenzoate)
2-methyl-1,2-propylene-glycol di(m-chlorobenzoate)
2-methyl-1,2-propylene-glycol di(p-bromobenzoate)
2-methyl-1,2-propylene-glycol di(o-bromobenzoate)
2-methyl-1,2-propylene-glycol di(p-methylbenzoate)
2-methyl-1,2-propylene-glycol di(p-tert-butylbenzoate)
2-methyl-1,2-propylene-glycol di(p-butylbenzoate)
2-methyl-1,2-propylene-glycol monobenzoate monocinnamate
2-methyl-1,2-propylene-glycol dicinnamate
1,3-propylene-glycol dibenzoate
2-methyl-1,3-propylene-glycol dibenzoate
2-ethyl-1,3-propylene-glycol dibenzoate
2-propyl-1,3-propylene-glycol dibenzoate
2-butyl-1,3-propylene-glycol dibenzoate
2,2-dimethyl-1,3-propylene-glycol dibenzoate
(R)-1-phenyl-1,3-propylene-glycol dibenzoate
(S)-1-phenyl-1,3-propylene-glycol dibenzoate
1,3-diphenyl-1,3-propylene-glycol dibenzoate
2-methyl-1,3-diphenyl-1,3-propylene-glycol dibenzoate
1,3-diphenyl-1,3-propylene-glycol dipropionate
2-methyl-1,3-diphenyl-1,3-propylene-glycol dipropionate
2-methyl-1,3-diphenyl-1,3-propylene-glycol diacetate
2,2-dimethyl-1,3-diphenyl-1,3-propylene-glycol dibenzoate
2,2-dimethyl-1,3-diphenyl-1,3-propylene-glycol dipropionate
2-ethyl-1,3-di(tert-butyl)-1,3-propylene-glycol dibenzoate
1,3-diphenyl-1,3-propylene-glycol diacetate 2-butyl-2-ethyl-1,3-propylene-glycol dibenzoate
2,2-diethyl-1,3-propylene-glycol dibenzoate
2-dimethoxymethyl-1,3-propylene-glycol dibenzoate
2-methyl-2-propyl-1,3-propylene-glycol dibenzoate
2-isoamyl-2-isopropyl-1,3-propylene-glycol dibenzoate
2-isoamyl-2-isopropyl-1,3-propylene-glycol di(p-chlorobenzoate)
2-isoamyl-2-isopropyl-1,3-propylene-glycol di(m-chlorobenzoate)
2-isoamyl-2-isopropyl-1,3-propylene-glycol di(p-methoxybenzoate)
2-isoamyl-2-isopropyl-1,3-propylene-glycol di(p-methylbenzoate)
2-isoamyl-2-isopropyl-1,3-propylene-glycol monobenzoate monopropionate
2-isoamyl-2-isopropyl-1,3-propylene-glycol dipropionate
2-isoamyl-2-isopropyl-1,3-propylene-glycol diacrylate
2-isoamyl-2-isopropyl-1,3-propylene-glycol dicinnamate
2,2-diisobutyl-1,3-propylene-glycol dibenzoate
2-isoamyl-2-isopropyl-1,3-propylene-glycol 2,2'-biphenyl diformate
2-isoamyl-2-isopropyl-1,3-propylene-glycol phthalate
1,3-diisopropyl-1,3-propylene-glycol di(4-butylbenzoate)
2-ethyl-2-methyl-1,3-propylene-glycol dibenzoate
2-amino-1-phenyl-1,3-propylene-glycol dibenzoate
2,2-dimethyl-1,3-propylene-glycol dibenzoate
1,2-butylene-glycol dibenzoate
2-methyl-1,2-butylene-glycol dibenzoate
2,3-dimethyl-1,2-butylene-glycol dibenzoate
2,3-dimethyl-1,2-butylene-glycol di(p-chlorobenzoate)
2,3,3-trimethyl-1,2-butylene-glycol dibenzoate
2,3,3-trimethyl-1,2-butylene-glycol di(p-chlorobenzoate)
1,2-butylene-glycol di(p-chlorobenzoate)
2,3-butylene-glycol dibenzoate
2,3-butylene-glycol di(o-bromobenzoate)
2,3-butylene-glycol di(methylbenzoate)
2,3-butylene-glycol di(m-chlorobenzoate)
2-methyl-2,3-butylene-glycol dibenzoate
2-methyl-2,3-butylene-glycol di(o-bromobenzoate)
2-methyl-2,3-butylene-glycol di(methylbenzoate)
2-methyl-2,3-butylene-glycol di(m-chlorobenzoate)
2,3-dimethyl-2,3-butylene-glycol dibenzoate
2,3-dimethyl-2,3-butylene-glycol di(o-bromobenzoate)
2,3-dimethyl-2,3-butylene-glycol di(methylbenzoate)
2,3-dimethyl-2,3-butylene-glycol di(m-chlorobenzoate)
2-methyl-1-phenyl-1,3-butylene-glycol dibenzoate
2-methyl-1-phenyl-1,3-butylene-glycol dipivalate
2-methyl-2-(2-furyl)-1,3-butylene-glycol dibenzoate
1,4-butylene-glycol dibenzoate
2,3-diisopropyl-1,4-butylene-glycol dibenzoate
2,3-dimethyl-1,4-butylene-glycol dibenzoate
2,3-diethyl-1,4-butylene-glycol dibenzoate
2,3-dibutyl-1,4-butylene-glycol dibenzoate
2,3-diisopropyl-1,4-butylene-glycol dibutyrate
4,4,4-trifluoro-1-(2-naphthyl)-1,3-butylene-glycol dibenzoate
2,3-pentanediol dibenzoate
2-methyl-2,3-pentanediol dibenzoate
3-methyl-2,3-pentanediol dibenzoate
4-methyl-2,3-pentanediol dibenzoate
2,3-dimethyl-2,3-pentanediol dibenzoate
2,4-dimethyl-2,3-pentanediol dibenzoate
3,4-dimethyl-2,3-pentanediol dibenzoate
4,4-dimethyl-2,3-pentanediol dibenzoate
2,3,4-trimethyl-2,3-pentanediol dibenzoate
2,4,4-trimethyl-2,3-pentanediol dibenzoate
3,4,4-trimethyl-2,3-pentanediol dibenzoate
2,3,4,4-tetramethyl-2,3-pentanediol dibenzoate
3-ethyl-2,3-pentanediol dibenzoate
3-ethyl-2-methyl-2,3-pentanediol dibenzoate
3-ethyl-2,4-dimethyl-2,3-pentanediol dibenzoate
3-ethyl-2,4,4-trimethyl-2,3-pentanediol dibenzoate
2,4-pentanediol dibenzoate
3-methyl-2,4-pentanediol dibenzoate
3-ethyl-2,4-pentanediol dibenzoate
3-propyl-2,4-pentanediol dibenzoate
3-butyl-2,4-pentanediol dibenzoate
3,3-dimethyl-2,4-pentanediol dibenzoate
(2S,4S)-(+)-2,4-pentanediol dibenzoate
(2R,4R)-(+)-2,4-pentanediol dibenzoate
2,4-pentanediol di(p-chlorobenzoate)
2,4-pentanediol di(m-chlorobenzoate)
2,4-pentanediol di(p-bromobenzoate)
2,4-pentanediol di(o-bromobenzoate)
2,4-pentanediol di(p-methylbenzoate)
2,4-pentanediol di(p-tert-butylbenzoate)
2,4-pentanediol di(p-butylbenzoate)
2,4-pentanediol monobenzoate monocinnamate
2,4-pentanediol dicinnamate
1,3-pentanediol dipropionate
2-methyl-1,3-pentanediol dibenzoate
2-methyl-1,3-pentanediol di(p-chlorobenzoate)
2-methyl-1,3-pentanediol di(p-methylbenzoate)
2-butyl-1,3-pentanediol di(p-methylbenzoate)
2-methyl-1,3-pentanediol di(p-tert-butylbenzoate)
2-methyl-1,3-pentanediol dipivalate
2-methyl-1,3-pentanediol monobenzoate monocinnamate
2,2-dimethyl-1,3-pentanediol dibenzoate
2,2-dimethyl-1,3-pentanediol monobenzoate monocinnamate
2-ethyl-1,3-pentanediol dibenzoate
2-butyl-1,3-pentanediol dibenzoate
2-allyl-1,3-pentanediol dibenzoate
2-methyl-1,3-pentanediol monobenzoate monocinnamate
2-methyl-1,3-pentanediol dibenzoate
2-ethyl-1,3-pentanediol dibenzoate
2-propyl-1,3-pentanediol dibenzoate
2-butyl-1,3-pentanediol dibenzoate
1,3-pentanediol di(p-chlorobenzoate)
1,3-pentanediol di(m-chlorobenzoate)
1,3-pentanediol di(p-bromobenzoate)
1,3-pentanediol di(o-bromobenzoate)
1,3-pentanediol di(p-methylbenzoate)
1,3-pentanediol di(p-tert-butylbenzoate)
1,3-pentanediol di(p-butylbenzoate)
1,3-pentanediol monobenzoate monocinnamate
1,3-pentanediol dicinnamate
2,2,4-trimethyl-1,3-pentanediol dibenzoate
2,2,4-trimethyl-1,3-pentanediol di(isopropylformate)
3-methyl-1-trifluoromethyl-2,4-pentanediol dibenzoate
2,4-pentanediol di(p-fluoromethylbenzoate)
2,4-pentanediol di(2-furancarboxylate)
3-butyl-3-methyl-2,4-pentanediol dibenzoate
2,2-dimethyl-1,5-pentanediol dibenzoate
1,5-diphenyl-1,5-pentanediol dibenzoate
1,5-diphenyl-1,5-pentanediol dipropionate
2,3-hexanediol dibenzoate
2-methyl-2,3-hexanediol dibenzoate
3-methyl-2,3-hexanediol dibenzoate
4-methyl-2,3-hexanediol dibenzoate
5-methyl-2,3-hexanediol dibenzoate
2,3-dimethyl-2,3-hexanediol dibenzoate
2,4-dimethyl-2,3-hexanediol dibenzoate
2,5-dimethyl-2,3-hexanediol dibenzoate 3,4-dimethyl-2,3-hexanediol dibenzoate
3,5-dimethyl-2,3-hexanediol dibenzoate
4,4-dimethyl-2,3-hexanediol dibenzoate
4,5-dimethyl-2,3-hexanediol dibenzoate
5,5-dimethyl-2,3-hexanediol dibenzoate
2,3,4-trimethyl-2,3-hexanediol dibenzoate
2,3,5-trimethyl-2,3-hexanediol dibenzoate
2,4,4-trimethyl-2,3-hexanediol dibenzoate
2,4,5-trimethyl-2,3-hexanediol dibenzoate
2,5,5-trimethyl-2,3-hexanediol dibenzoate
3,4,4-trimethyl-2,3-hexanediol dibenzoate
3,4,5-trimethyl-2,3-hexanediol dibenzoate
3,5,5-trimethyl-2,3-hexanediol dibenzoate
2,3,4,4-tetramethyl-2,3-hexanediol dibenzoate
2,3,4,5-tetramethyl-2,3-hexanediol dibenzoate
2,3,5,5-tetramethyl-2,3-hexanediol dibenzoate
3-ethyl-2,3-hexanediol dibenzoate
3-propyl-2,3-hexanediol dibenzoate
3-isopropyl-2,3-hexanediol dibenzoate
4-ethyl-2,3-hexanediol dibenzoate
3-ethyl-2-methyl-2,3-hexanediol dibenzoate
4-ethyl-2-methyl-2,3-hexanediol dibenzoate
2-methyl-3-propyl-2,3-hexanediol dibenzoate
4-ethyl-3-methyl-2,3-hexanediol dibenzoate
3,4-diethyl-2,3-hexanediol dibenzoate
4-ethyl-3-propyl-2,3-hexanediol dibenzoate
3-ethyl-2,4-dimethyl-2,3-hexanediol dibenzoate
3-ethyl-2,5-dimethyl-2,3-hexanediol dibenzoate
3-ethyl-2,4,4-trimethyl-2,3-hexanediol dibenzoate
3-ethyl-2,4,5-trimethyl-2,3-hexanediol dibenzoate
2,5-dimethyl-3-propyl-2,3-hexanediol dibenzoate
2,4,4-trimethyl-3-propyl-2,3-hexanediol dibenzoate
2,5,5-trimethyl-3-propyl-2,3-hexanediol dibenzoate
2,4,5-trimethyl-3-propyl-2,3-hexanediol dibenzoate
3,4-diethyl-2-methyl-2,3-hexanediol dibenzoate
2-ethyl-1,3-hexanediol dibenzoate
2-propyl-1,3-hexanediol dibenzoate
2-butyl-1,3-hexanediol dibenzoate
4-ethyl-1,3-hexanediol dibenzoate
4-methyl-1,3-hexanediol dibenzoate
3-methyl-1,3-hexanediol dibenzoate
3-ethyl-1,3-hexanediol dibenzoate
2,2,4,6,6-pentamethyl-3,5-hexanediol dibenzoate
2,5-hexanediol dibenzoate
2,5-dimethyl-2,5-hexanediol dibenzoate
2,5-dimethyl-2,5-hexanediol dipropionate
2,5-dimethyl-hexa-3-yne-2,5-diol dibenzoate
hexa-3-yne-2,5-diol dibenzoate (T)
hexa-3-yne-2,5-diol dibenzoate (S)
hexa-3-yne-2,5-diol di(2-furancarboxylate)
3,4-dibutyl-1,6-hexanediol dibenzoate
1,6-hexanediol dibenzoate
hepta-6-ene-2,4-diol dibenzoate
2-methyl-hepta-6-ene-2,4-diol dibenzoate
3-methyl-hepta-6-ene-2,4-diol dibenzoate
4-methyl-hepta-6-ene-2,4-diol dibenzoate
5-methyl-hepta-6-ene-2,4-diol dibenzoate
6-methyl-hepta-6-ene-2,4-diol dibenzoate
3-ethyl-hepta-6-ene-2,4-diol dibenzoate
4-ethyl-hepta-6-ene-2,4-diol dibenzoate
5-ethyl-hepta-6-ene-2,4-diol dibenzoate
6-ethyl-hepta-6-ene-2,4-diol dibenzoate
3-propyl-hepta-6-ene-2,4-diol dibenzoate
4-propyl-hepta-6-ene-2,4-diol dibenzoate
5-propyl-hepta-6-ene-2,4-diol dibenzoate
6-propyl-hepta-6-ene-2,4-diol dibenzoate
3-butyl-hepta-6-ene-2,4-diol dibenzoate
4-butyl-hepta-6-ene-2,4-diol dibenzoate
5-butyl-hepta-6-ene-2,4-diol dibenzoate
6-butyl-hepta-6-ene-2,4-diol dibenzoate
3,5-dimethyl-hepta-6-ene-2,4-diol dibenzoate
3,5-diethyl-hepta-6-ene-2,4-diol dibenzoate
3,5-dipropyl-hepta-6-ene-2,4-diol dibenzoate
3,5-dibutyl-hepta-6-ene-2,4-diol dibenzoate
3,3-dimethyl-hepta-6-ene-2,4-diol dibenzoate
3,3-diethyl-hepta-6-ene-2,4-diol dibenzoate
3,3-dipropyl-hepta-6-ene-2,4-diol dibenzoate
3,3-dibutyl-hepta-6-ene-2,4-diol dibenzoate
3,5-heptanediol dibenzoate
2-methyl-3,5-heptanediol dibenzoate
3-methyl-3,5-heptanediol dibenzoate
4-methyl-3,5-heptanediol dibenzoate
5-methyl-3,5-heptanediol dibenzoate
6-methyl-3,5-heptanediol dibenzoate
3-ethyl-3,5-heptanediol dibenzoate
4-ethyl-3,5-heptanediol dibenzoate
5-ethyl-3,5-heptanediol dibenzoate
3-propyl-3,5-heptanediol dibenzoate
4-propyl-3,5-heptanediol dibenzoate
3-butyl-3,5-heptanediol dibenzoate
2,3-dimethyl-3,5-heptanediol dibenzoate
2,4-dimethyl-3,5-heptanediol dibenzoate
2,5-dimethyl-3,5-heptanediol dibenzoate
2,6-dimethyl-3,5-heptanediol dibenzoate
3,3-dimethyl-3,5-heptanediol dibenzoate
4,4-dimethyl-3,5-heptanediol dibenzoate
6,6-dimethyl-3,5-heptanediol dibenzoate
3,4-dimethyl-3,5-heptanediol dibenzoate
3,5-dimethyl-3,5-heptanediol dibenzoate
3,6-dimethyl-3,5-heptanediol dibenzoate
4,5-dimethyl-3,5-heptanediol dibenzoate
4,6-dimethyl-3,5-heptanediol dibenzoate
4,4-dimethyl-3,5-heptanediol dibenzoate
6,6-dimethyl-3,5-heptanediol dibenzoate
3-ethyl-2-methyl-3,5-heptanediol dibenzoate
4-ethyl-2-methyl-3,5-heptanediol dibenzoate
5-ethyl-2-methyl-3,5-heptanediol dibenzoate
3-ethyl-3-methyl-3,5-heptanediol dibenzoate
4-ethyl-3-methyl-3,5-heptanediol dibenzoate
5-ethyl-3-methyl-3,5-heptanediol dibenzoate
3-ethyl-4-methyl-3,5-heptanediol dibenzoate
4-ethyl-4-methyl-3,5-heptanediol dibenzoate
5-ethyl-4-methyl-3,5-heptanediol dibenzoate
2-methyl-3-propyl-3,5-heptanediol dibenzoate
2-methyl-4-propyl-3,5-heptanediol dibenzoate
2-methyl-5-propyl-3,5-heptanediol dibenzoate
3-methyl-3-propyl-3,5-heptanediol dibenzoate
3-methyl-4-propyl-3,5-heptanediol dibenzoate
3-methyl-5-propyl-3,5-heptanediol dibenzoate
4-methyl-3-propyl-3,5-heptanediol dibenzoate
4-methyl-4-propyl-3,5-heptanediol dibenzoate
4-methyl-5-propyl-3,5-heptanediol dibenzoate
6-methyl-2,4-heptanediol di(p-chlorobenzoate)
6-methyl-2,4-heptanediol di(p-methylbenzoate)
6-methyl-2,4-heptanediol di(m-methylbenzoate)
6-methyl-2,4-heptanediol dipivalate
hepta-6-ene-2,4-diol dipivalate
3,6-dimethyl-2,4-heptanediol dibenzoate
2,2,6,6-tetramethyl-3,5-heptanediol dibenzoate
2,6-dimethyl-2,6-heptanediol dibenzoate
4-methyl-3,5-octandiol dibenzoate
4-ethyl-3,5-octandiol dibenzoate
4-propyl-3,5-octandiol dibenzoate
5-propyl-3,5-octandiol dibenzoate 4-butyl-3,5-octandiol dibenzoate
4,4-dimethyl-3,5-octandiol dibenzoate
4,4-diethyl-3,5-octandiol dibenzoate
4,4-dipropyl-3,5-octandiol dibenzoate
4-ethyl-4-methyl-3,5-octandiol dibenzoate
3-phenyl-3,5-octandiol dibenzoate
3-ethyl-2-methyl-3,5-octandiol dibenzoate
4-ethyl-2-methyl-3,5-octandiol dibenzoate
5-ethyl-2-methyl-3,5-octandiol dibenzoate
6-ethyl-2-methyl-3,5-octandiol dibenzoate
5-methyl-4,6-nonandiol dibenzoate
5-ethyl-4,6-nonandiol dibenzoate
5-propyl-4,6-nonandiol dibenzoate
5-butyl-4,6-nonandiol dibenzoate
5,5-dimethyl-4,6-nonandiol dibenzoate
5,5-diethyl-4,6-nonandiol dibenzoate
5,5-dipropyl-4,6-nonandiol dibenzoate
5,5-dibutyl-4,6-nonandiol dibenzoate
4-ethyl-5-methyl-4,6-nonandiol dibenzoate
5-phenyl-4,6-nonandiol dibenzoate
4,6-nonandiol dibenzoate
1,1-cyclohexane dimethanol dibenzoate
1,2-cyclohexandiol dibenzoate
1,3-cyclohexandiol dibenzoate
1,4-cyclohexandiol dibenzoate
1,1-bis(benzoyloxyethyl)cyclohexane
1,4-bis(benzoyloxymethyl)cyclohexane
1,1-bis(benzoyloxymethyl)-3-cyclohexene
1,1-bis(propionyloxymethyl)-3-cyclohexene
9,9-bis(benzoyloxymethyl)fluorene
9,9-bis((m-methoxybenzoyloxy)methyl)fluorene
9,9-bis((m-chlorobenzoyloxy)methyl)fluorene
9,9-bis((p-chlorobenzoyloxy)methyl)fluorene
9,9-bis(cinnamoyloxymethyl)fluorene
9-(benzoyloxymethyl)-9-(propionyloxymethyl)fluorene
9,9-bis(propionyloxymethyl)fluorene
9,9-bis(acryloyloxymethyl)fluorene
9,9-bis(pivalyloxymethyl)fluorene
9,9-fluorene dimethanol dibenzoate
1,2-phenylene dibenzoate
1,3-phenylene dibenzoate
1,4-phenylene dibenzoate
2,2'-biphenylene dibenzoate
bis(2-benzoyloxynaphthyl)methane
1,2-xylenediol dibenzoate
1,3-xylenediol dibenzoate
1,4-xylenediol dibenzoate
2,2'-biphenyldimethanol dipivalate
2,2'-biphenyldimethanol dibenzoate
2,2'-biphenyldimethanol dipropionate
2,2'-binaphthyidimethanol dibenzoate
pentaerythritol tetrabenzoate
1,2,3-propanetriol tribenzoate.

The polyol ester compound of formula (II) can be selected from the group consisting of compounds of formula (III):

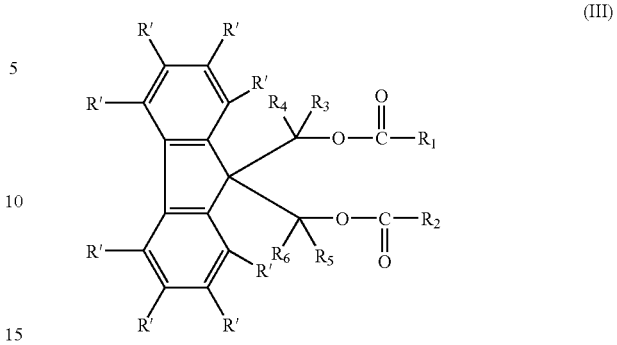

(III)

wherein $R_1$-$R_6$ are as defined in formula (I), R' can be identical or different, and represent hydrogen, halogen atom, linear or branched $C_1$-$C_{20}$ alkyl, $C_3$-$C_{20}$ cycloalkyl, $C_6$-$C_{20}$ aryl, $C_7$-$C_{20}$ alkaryl or $C_7$-$C_{20}$ aralkyl group.

In the compounds of the formula (III), preferably, $R_3$, $R_4$, $R_5$, and $R_6$ are not all hydrogen simultaneously. More preferably, at least one of $R_3$ and $R_4$, $R_5$ and $R_6$, respectively, is selected from the group consisting of halogen substituted or unsubstituted $C_1$-$C_{10}$ linear or branched alkyl, $C_3$-$C_{10}$ cycloalkyl, $C_6$-$C_{10}$ aryl, $C_7$-$C_{10}$ alkaryl or $C_7$-$C_{10}$ aralkyl group. Most preferably, at least one of $R_3$ and $R_4$, $R_5$ and $R_6$, respectively, is selected from the group consisting of methyl, ethyl, propyl, isopropyl, butyl, tert-butyl, phenyl, or halophenyl.

In the compounds of formula (III), $R_1$ and $R_2$ are preferably selected from the group consisting of benzene-ring-containing group, such as phenyl, phenyl substituted by alkyl, alkoxy or halogen, optionally the carbon atom(s) on the benzene ring being replaced by a hetero-atom of oxygen atom and/or nitrogen atom; alkenyl or phenyl substituted alkenyl, such as vinyl, propenyl, styryl; alkyl, such as methyl, ethyl, propyl, etc. More preferably, at least one of $R_1$ and $R_2$ is a benzene-ring-containing group, still more preferably, both $R_1$ and $R_2$ are a benzene-ring-containing group, and most preferably, $R_1$ and $R_2$ are independently selected from the group consisting of phenyl, halophenyl, alkylphenyl, and haloalkylphenyl.

Examples of the compounds of formula (III) include, bot not are limited to:
9,9-bis(benzoyloxymethyl)fluorene
9,9-bis((m-methoxybenzoyloxy)methyl)fluorene
9,9-bis((m-chlorobenzoyloxy) methyl)fluorene
9,9-bis((p-chlorobenzoyloxy)methyl)fluorene
9,9-bis(cinnamoyloxymethyl)fluorene
9-(benzoyloxymethyl)-9-(propionyloxymethyl)fluorene
9,9-bis(propionyloxymethyl)fluorene
9,9-bis(acryloyloxymethyl)fluorene
9,9-bis(pivalyloxymethyl)fluorene
9,9-fluorene dimethanol dibenzoate and the like.

Above described polyol ester compounds can be synthesized by known methods per se, for instance, esterification of a polyol of formula (IV) with an acid, an acyl halide or an acid anhydride can give corresponding polyol ester,

$$HO—CR_3R_4—A—CR_5R_6—OH \quad (IV)$$

wherein A, $R_3$-$R_6$ are as defined in the formula (I).

The polyol of the formula (IV) can be synthesized by known processes in the art, for instance, references can be made to *Acta Chemica Scandina-vica* 21, 1967, pp. 718-720 for the synthesis of 9,9-bis(hydroxymethyl)fluorene, and CN1141285A for the method for producing dibasic alcohol.

The solid catalyst component for the polymerization of olefins according to the present invention preferably comprises a reaction product of titanium compound, magnesium compound, and a polyol ester compound selected from the group consisting of the compounds of formulae (I)-(III).

Said magnesium compound is selected from the group consisting of magnesium dihalide, hydrate or alcohol addition compound of magnesium dihalide, a derivative formed by replacing one halogen atom of magnesium dihalide with alkoxy group or haloalkoxy group, or their mixture. Said magnesium dihalide is preferably $MgCl_2$ in active state, which, as one of Ziegler-Natta catalyst components, is well known in many patent documents.

Said titanium compound has a general formula of $TiX_n(OR)_{4-n}$, wherein R is a hydrocarbon radical having 1 to 20 carbon atoms, X is a halogen, and n is between 1 and 4. The titanium compound is preferably $TiCl_4$ or $TiCl_3$.

The solid catalyst component according to the invention can be prepared by various processes.

According to one of the processes, anhydrous magnesium dichloride and polyol ester compound(s) selected from the group consisting of the compounds of formulae (I)-(III) are ground together under the conditions of activating the magnesium dichloride, and such obtained product can be treated with excess above-mentioned titanium compound at 80-135° C. for one or more times, then washed with hydrocarbon solvent until the washing solution is substantially free of chloride ion. According to a further process, anhydrous magnesium dichloride, titanium compound, and polyol ester compound(s) selected from the group consisting of the compounds of formulae (I)-(III) are ground together, and such obtained product is treated with halohydrocarbon, such as 1,2-dichloroethane, chlorobenzene, dichloromethane, at the temperature between 40° C. to boiling point of said halohydrocarbon for a period of from 1 to 4 hours, then typically washed with inert hydrocarbon solvent, such as hexane, to give the solid catalyst component.

According to another process, magnesium dichloride is pre-activated by a process well known in the art, then treated with excess above-mentioned titanium compound at 80-135° C., wherein the reaction mixture contains polyol ester compound(s) of formulae (I)-(III). The treatment using titanium compound can be carried out for several times. The resulting solid is washed with hexane to remove free titanium compound.

According to another process, alcoholates or chloroalcoholates of magnesium, especially chloroalcoholates of magnesium produced according to U.S. Pat. No. 4,220,554, are reacted with excess a titanium compound containing polyol ester compound(s) of formulae (I)-(III) in solution at a temperature of from about 80° C. to 135° C. According to a preferred process, a titanium compound of formula $TiX_n(OR)_{4-n}$, wherein R is independently each other hydrocarbon radical having 1 to 20 carbon atoms, X is halogen, n is a value between 1 and 4, preferably $TiCl_4$, is reacted with an addition compound of formula $MgCl_2 \cdot pROH$, in which p is between 0.1 and 6, preferably between 2 and 3.5, R is a hydrocarbon radical having 1 to 18 carbon atoms, to prepare the solid catalyst component. The addition compound can be advantageously prepared into sphere according to the following process: an alcohol is mixed with magnesium dichloride in the presence of an inert hydrocarbon which is not miscible with the addition compound, and the emulsion is quenched quickly to solidify the addition compound in the form of sphere particle. Examples of the sphere $MgCl_2 \cdot pROH$ addition compound produced according to the process were described in U.S. Pat. Nos. 4,399,054 and 4,469,648. Such obtained addition compound can be directly reacted with a titanium compound, or before it is reacted with a titanium compound, it can be subjected to a heat control dealcoholization at a temperature of from 80 to 130° C. to obtain an addition compound, in which the molar number of alcohol is generally lower than 3, preferably from 0.1 to 2.5. The addition compound (dealcoholized or as such) can be suspended in cool $TiCl_4$ (generally 0° C.), and reacted with titanium compound by programmed heating to a temperature of from 80 to 130° C. and holding at said temperature for 0.5 to 2 hours. The treatment with $TiCl_4$ can be carried out for one or more times. During the treatment with $TiCl_4$, polyol ester compound(s) of formulae (I) to (III) can be added, and this treatment can also be repeated one or more times.

Another process for preparing the solid catalyst component of the invention comprises the step of halogenating magnesium dihydrocarbyloxyl compounds, such as magnesium dialkoxide or magnesium diaryloxide, with a solution of above-mentioned titanium compound in aromatic hydrocarbon solvent (such as toluene, xylene) at a temperature of from 80 to 130° C. The treatment with the solution of titanium compound in aromatic hydrocarbon solvent can be repeated for one or more times, and during one or more of such treatment, polyol ester compound(s) of formulae (I)-(III) can be added to the solution.

The solid catalyst component of the invention can also be prepared according to the process for producing solid titanium-containing catalyst component disclosed in U.S. Pat. No. 4,784,983 as follow:

Firstly, a magnesium compound is dissolved in a solvent system consisting of an organic epoxy compound, an organophosphorus compound and an inert diluent to form a uniform solution, then the solution is mixed with a titanium compound, and a solid is precipitated in the presence of precipitation aid. The obtained solid is treated with said polyol ester compound(s) to deposit it on the solid and, if necessary, the solid can be treated again with the titanium compound and inert diluent to give solid titanium-containing catalyst component. Said precipitation aid is one of organic acid anhydrides, organic acids, ethers, and ketones. The individual raw materials can be used in the amount of from 0.2 to 10 mole for the organic epoxy compound, from 0.1 to 3 mole for the organophosphorus compound, from 0.03 to 1.0 mole for the precipitation aid, and from 0.5 to 150 mole for the titanium halides and its derivatives, based on per mole magnesium halide.

Another process for preparing the solid catalyst component of the invention comprises: dissolving a magnesium compound in a donor compound, such as alcohols, ethers and the like, to form a uniform solution, mixing the solution with a titanium compound and allowing them to react to re-precipitate. This process was disclosed in EP 0452156. In addition, reference can be made to U.S. Pat. Nos. 4,866,022 and 4,829,037 for the process of preparing the solid catalyst component of the invention. In these processes, polyol ester compound(s) of formulae (I)-(III) of the invention can be added to the reaction system before, during or after contacting magnesium compound and titanium compound.

In any preparation process, polyol ester compound(s) of formulae (I)-(III) can be directly added as itself, or optionally, for example, can be prepared in-situ by using a suitable precursor which can be converted into said polyol ester compound through a known chemical reaction such as esterification or transesterification in the course of preparing the solid catalyst component. Generally, said polyol ester compound is used in such an amount that molar ratio of polyol ester compound to Mg compound is in the range of from 0.01 to 5, preferably from 0.05 to 1.0.

Generally, the solid catalyst component of the invention comprises from 0.5 to 10 percent by weight of titanium, from 1 to 30 percent by weight of magnesium, from 2 to 65 percent by weight of halogen, and from 2 to 40 percent by weight of polyol ester compound, based on the total weight of the solid catalyst component.

In addition, it has been found, this also constitutes another object of the invention, that when other known internal electron donor compounds and polyol ester compounds of the invention are used together, very interesting results can be obtained, for instance, polymers having broader molecular weight distribution can be obtained. Said other electron donor compounds can be selected from the group consisting of ethers, organic mono- or poly-carboxylic esters other than polyol ester compounds of formulae (I)-(III) and amines. The amount of said other electron donor compound can be in the range of from 5 to 95 percent by mole of the total amount of electron donor compounds.

Preferably, said other internal electron donor compounds which can be combined with polyol ester compound(s) of the invention are selected from the group consisting of: 1,3-propandiol diether of formula (V):

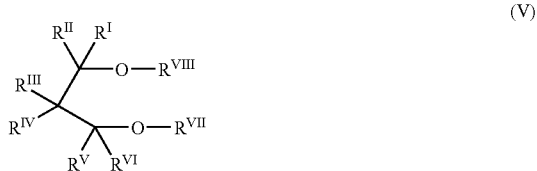

(V)

wherein $R^I$, $R^{II}$, $R^{III}$, $R^{IV}$, $R^V$, and $R^{VI}$, which may be identical or different, represent hydrogen or hydrocarbon radical having 1 to 18 carbon atoms, $R^{VII}$ and $R^{VIII}$, which may be identical or different, represent hydrocarbon radical having 1 to 18 carbon atoms, and two or more of $R^I$-$R^{VIII}$ can be linked to form saturated or unsaturated monocyclic or polycyclic ring; and organic mono- or poly-carboxylic esters other than polyol ester compounds of formulae (I)-(III), especially phthalates.

Preferably, in the above formula (V), $R^{VII}$ and $R^{VIII}$ are independently $C_1$-$C_4$ alkyl, $R^{III}$ and $R^{IV}$ form unsaturated fused ring, and $R^I$, $R^{II}$, $R^V$, and $R^{VI}$ are hydrogen.

The compound of formula (V) can be, for example, 1,3-diether compounds disclosed in EP 0395083, including: 2-isopropyl-1,3-dimethoxypropane; 2-butyl-1,3-dimethoxypropane; 2-sec-butyl-1,3-dimethoxypropane; 2-cyclohexyl-1,3-dimethoxypropane; 2-phenyl-1,3-dimethoxypropane; 2-(2-phenylethyl)-1,3-dimethoxypropane; 2-(2-cyclohexylethyl)-1,3-dimethoxypropane; 2-(p-chlorophenyl)-1,3-dimethoxypropane; 2-diphenylmethyl-1,3-dimethoxypropane; 2-(1-naphthyl)-1,3-dimethoxypropane; 2-(1-decahydronaphthyl)-1,3-dimethoxypropane; 2-(p-tert-butylphenyl)-1,3-dimethoxypropane; 2,2-dicyclohexyl-1,3-dimethoxypropane; 2,2-dicyclopentyl-1,3-dimethoxypropane; 2,2-diethyl-1,3-dimethoxypropane; 2,2-dipropyl-1,3-dimethoxypropane; 2,2-diisopropyl-1,3-dimethoxypropane; 2,2-dibutyl-1,3-dimethoxypropane; 2-methyl-2-propyl-1,3-dimethoxypropane; 2-methyl-2-benzyl-1,3-dimethoxypropane; 2-methyl-2-phenyl-1,3-dimethoxypropane; 2-methyl-2-cyclohexyl-1,3-dimethoxypropane; 2,2-bis(p-chlorophenyl)-1,3-dimethoxypropane; 2,2-bis(2-cyclohexylethyl)-1,3-dimethoxypropane; 2-(2-ethylhexyl)-2-methyl-1,3-dimethoxypropane; 2,2-diisobutyl-1,3-dimethoxypropane; 2,2-diphenyl-1,3-dimethoxypropane; 2,2-dibenzyl-1,3-dimethoxypropane; 2,2-bis(cyclohexylmethyl)-1,3-dimethoxypropane; 2-isobutyl-2-isopropyl-1,3-dimethoxypropane; 2-isopropyl-2-(1-methylbutyl)-1,3-dimethoxypropane; 2-(1-methylbutyl)-2-sec-butyl-1,3-dimethoxypropane; 2,2-di-sec-butyl-1,3-dimethoxypropane; 2,2-di-tert-butyl-1,3-dimethoxypropane; 2-isoamyl-2-isopropyl-1,3-dimethoxypropane; 2-isopropyl-2-phenyl-1,3-dimethoxypropane; 2-sec-butyl-2-phenyl-1,3-dimethoxypropane; 2-benzyl-2-isopropyl-1,3-dimethoxypropane; 2-benzyl-2-sec-butyl-1,3-dimethoxypropane; 2-benzyl-2-phenyl-1,3-dimethoxypropane; 2-cyclopentyl-2-isopropyl-1,3-dimethoxypropane; 2-sec-butyl-2-cyclopentyl-1,3-dimethoxypropane; 2-cyclohexyl-2-isopropyl-1,3-dimethoxy-propane; 2-sec-butyl-2-cyclohexyl-1,3dimethoxypropane; 2-sec-butyl-2-isopropyl-1,3-dimethoxypropane; 2-cyclohexyl-2-cyclohexylmethyl-1,3-dimethoxypropane; 1,1-bis(methoxymethyl)cyclopentadiene; 1,1-bis(methoxymethyl)-2,3,4,5-tetramethylcyclopentadiene; 1,1-bis(methoxymethyl)-2,3,4,5-tetraphenyl-cyclopentadiene; 1,1-bis(methoxymethyl)-2,3,4,5-tetrafluorocyclopentadiene; 1,1-bis(methoxymethyl)-3,4-dicyclopentylcyclopentadiene; 1,1-bis(methoxymethyl)-indene; 1,1-bis(methoxymethyl)-4,7-dimethylindene; 1,1-bis(methoxymethyl)-4-phenylindene; 1,1-bis(methoxymethyl)-2-methyl-4-phenylindene; 1,1-bis(methoxymethyl)-4,7-dimethyl-4,5,6,7-tetrahydroindene; 1,1-bis(methoxymethyl)-7-methylindene; 9,9-bis(methoxymethyl)fluorene; 9,9-bis(methoxymethyl)-2,3,6,7-tetramethylfluorene; 9,9-bis(methoxymethyl)-2,3,4,5,6,7-hexafluorofluorene; 9,9-bis(methoxymethyl)-benzo[2,3]indene; 9,9-bis(methoxymethyl)-dibenzo[2, 3,6,7]indene; 9,9-bis(methoxymethyl)-2,7-dicyclopentylfluorene; 9,9-bis(methoxymethyl)-1,2,3,4-tetrahydrofluorene; 9,9-bis(methoxymethyl)-4-tert-butylfluorene; 1,1-bis(1'-isopropoxy-n-propyl)cyclopentadiene; 1-methoxymethyl-1-(1'-methoxyethyl)-2,3,4,5-tetramethylcyclopentadiene; 1,1-bis(alpha-methoxybenzyl)-indene; 9,9-bis(alpha-methoxyphenyl)fluorene; 9,9-bis(1'-isopropoxy-n-butyl)-4,5-diphenylfluorene; 9,9-bis(1'-methoxyethyl)fluorene; 9-(methoxymethyl)-9-(1'-methoxyethyl)-2,3,6,7-tetrafluorofluorene; 1,1-bis(methoxymethyl)-2,5-cyclohexadiene; 1,1-bis(methoxymethyl)benzonaphthalene; 7,7-bis(methoxymethyl)-2,5-norbornadiene; 9,9-bis(methoxymethyl)-1,4-methyldihydronaphthalene; 9,9-bis(methoxymethyl)-9,10-dihydroanthracene; 4,4-bis(methoxymethyl)-1-phenyl-1,4-dihydronaphthalene; 4,4-bis(methoxymethyl)-1-phenyl-3,4-dihydronaphthalene; 5,5-bis(methoxymethyl)-1,3,6-cycloheptatriene.

Said organic carboxylic esters can be polycarboxylic ester compounds disclosed in U.S. Pat. No. 4,784,983, especially phthalates, including: diethyl phthalate, dipropyl phthalate, diisopropyl phthalate, di-n-butyl phthalate, diisobutyl phthalate, diamyl phthalate, dihexyl phthalate, dioctyl phthalate, dinonyl phthalate, didecyl phthalate, diheptyl phthalate, and the like, as well as halogenated derivatives of the above polycarboxylic esters.

The solid catalyst components of the invention are converted into catalysts for the polymerization of olefins by reacting with an organoaluminum compound according to known processes per se.

Especially, one object of the invention is to provide a catalyst for the polymerization of olefin $CH_2$=CHR, wherein R is hydrogen or $C_1$-$C_6$ alkyl or aryl, the catalyst comprising a reaction product of the following components:
(a) a solid catalyst component according to the present invention, comprising Mg, Ti, halogen and polyol ester compound of formulae (I) to (III) of the invention;
(b) at least one organoaluminum compound of formula $AlR_nX_{3-n}$, in which R is hydrogen or hydrocarbyl having 1 to 20 carbon atoms, X is halogen, n is a value satisfying 1<n≦3; and
(c) optionally, one or more of external donor compounds.

The ratio of the solid catalyst component (a) to the organoaluminum compound (b) and to the external donor compound (c) can be in the range of 1:5-1000: 0-500, preferably, 1:25-100:25-100, counted on the molar ratio of titanium: aluminum:external donor compound.

Preferably, organoaluminum compound (b) is trialkylaluminum compounds, such as triethylaluminum, triisobutylaluminum, tri-n-butylaluminum, tri-n-hexylaluminum, tri-n-octylaluminum. It is possible to use a mixture of trialkylaluminum and alkylaluminum hydrides or alkylaluminum halides such as $AlEt_2Cl$ and $Al_2Et_3Cl_3$. It is also possible to use alkylaluminoxane.

One aspect of the invention which is especially significant is that: even if the polymerization is performed in the absence of external donor compounds (c), polymers having high isotactic index can still be obtained by using abovementioned catalysts, for instance, propylene polymers having an isotacticity more than 95% can be obtained. Considering such a fact that when dicarboxylic ester compounds known in the art are used as internal electron donors, if the polymerization is performed in the absence of external donor compounds, the polymers obtained have poor isotactic index, this special performance is absolutely unexpected.

As to the application needing very high isotactic index, using an external donor compound is usually practical. The external donor compounds (c) can be selected from the group consisting of silicon compounds, ethers, esters, amines, heterocyclic compounds and ketones, etc.

For example, the external donor compounds (c) can also be selected from the group consisting of polyol ester compounds of formulae (I)-(III), which may be identical or different with the internal electron donor compounds used in the solid catalyst components, preferably selected from the group consisting of:

2-methyl-1,3-propylene-glycol dibenzoate
2-ethyl-1,3-propylene-glycol dibenzoate
2-propyl-1,3-propylene-glycol dibenzoate
2-butyl-1,3-propylene-glycol dibenzoate
2,2-dimethyl-1,3-propylene-glycol dibenzoate
(R)-1-phenyl-1,3-propylene-glycol dibenzoate
(S)-1-phenyl-1,3-propylene-glycol dibenzoate
1,3-diphenyl-1,3-propylene-glycol dibenzoate
2-methyl-1,3-diphenyl-1,3-propylene-glycol dibenzoate
1,3-diphenyl-1,3-propylene-glycol dipropionate
2-methyl-1,3-diphenyl-1,3-propylene-glycol dipropionate
2-methyl-1,3-diphenyl-1,3-propylene-glycol diacetate
2,2-dimethyl-1,3-diphenyl-1,3-propylene-glycol dibenzoate
2,2-dimethyl-1,3-diphenyl-1,3-propylene-glycol dipropionate
1,3-di-tert-butyl-2-ethyl-1,3-propylene-glycol dibenzoate
1,3-diphenyl-1,3-propylene-glycol diacetate
2-butyl-2-ethyl-1,3-propylene-glycol dibenzoate
2,2-diethyl-1,3-propylene-glycol dibenzoate
2,2-dimethoxymethyl-1,3-propylene-glycol dibenzoate
2-methyl-2-propyl-1,3-propylene-glycol dibenzoate
2-isoamyl-2-isopropyl-1,3-propylene-glycol dibenzoate
2-isoamyl-2-isopropyl-1,3-propylene-glycol di(p-chlorobenzoate)
2-isoamyl-2-isopropyl-1,3-propylene-glycol di(m-chlorobenzoate)
2-isoamyl-2-isopropyl-1,3-propylene-glycol di(p-methoxybenzoate)
2-isoamyl-2-isopropyl-1,3-propylene-glycol di(p-methylbenzoate)
2-isoamyl-2-isopropyl-1,3-propylene-glycol monobenzoate monopropionate
2-isoamyl-2-isopropyl-1,3-propylene-glycol dipropionate
2-isoamyl-2-isopropyl-1,3-propylene-glycol diacrylate
2-isoamyl-2-isopropyl-1,3-propylene-glycol dicinnamate
2,2-diisobutyl-1,3-propylene-glycol dibenzoate
2-isoamyl-2-isopropyl-1,3-propylene-glycol 2,2'-biphenyl diformate
2-isoamyl-2-isopropyl-1,3-propylene-glycol phthalate
1,3-diisopropyl-1,3-propylene-glycol di(4-butylbenzoate)
2-ethyl-2-methyl-1,3-propylene-glycol dibenzoate
2-amino-1-phenyl-1,3-propylene-glycol dibenzoate
2,2-dimethyl-1,3-propylene-glycol dibenzoate
2-methyl-1-phenyl-1,3-butylene-glycol dibenzoate
2-methyl-5-phenyl-1,3-butylene-glycol dipivalate
2-methyl-6-(1-furyl)-1,3-butylene-glycol dibenzoate
2,4-pentanediol dibenzoate
3-methyl-2,4-pentanediol dibenzoate
3-ethyl-2,4-pentanediol dibenzoate
3-propyl-2,4-pentanediol dibenzoate
3-butyl-2,4-pentanediol dibenzoate
3,3-dimethyl-2,4-pentanediol dibenzoate
(2S,4S)-(+)-2,4-pentanediol dibenzoate
(2R,4R)-(+)-2,4-pentanediol dibenzoate
2,4-pentanediol di(p-chlorobenzoate)
2,4-pentanediol di(m-chlorobenzoate)
2,4-pentanediol di(p-bromobenzoate)
2,4-pentanediol di(o-bromobenzoate)
2,4-pentanediol di(p-methylbenzoate)
2,4-pentanediol di(p-tert-butylbenzoate)
2,4-pentanediol di(p-butylbenzoate)
2,4-pentanediol monobenzoate monocinnamate
2,4-pentanediol dicinnamate
1,3-pentanediol dipropionate
2-methyl-1,3-pentanediol dibenzoate
2-methyl-1,3-pentanediol di(p-chlorobenzoate)
2-methyl-1,3-pentanediol di(p-methylbenzoate)
2-butyl-1,3-pentanediol di(p-methylbenzoate)
2-methyl-1,3-pentanediol di(p-tert-butylbenzoate)
2-methyl-1,3-pentanediol dipivalate
2-methyl-1,3-pentanediol monobenzoate monocinnamate
2,2-dimethyl-1,3-pentanediol dibenzoate
2,2-dimethyl-1,3-pentanediol monobenzoate monocinnamate
2-ethyl-1,3-pentanediol dibenzoate
2-butyl-1,3-pentanediol dibenzoate
2-allyl-1,3-pentanediol dibenzoate
2-methyl-1,3-pentanediol monobenzoate monocinnamate
2-methyl-1,3-pentanediol dibenzoate
2-ethyl-1,3-pentanediol dibenzoate
2-propyl-1,3-pentanediol dibenzoate
2-butyl-1,3-pentanediol dibenzoate
2,2-dimethyl-1,3-pentanediol dibenzoate
1,3-pentanediol di(p-chlorobenzoate)
1,3-pentanediol di(m-chlorobenzoate)
1,3-pentanediol di(p-bromobenzoate)

1,3-pentanediol di(o-bromobenzoate)
1,3-pentanediol di(p-methylbenzoate)
1,3-pentanediol di(p-tert-butylbenzoate)
1,3-pentanediol di(p-butylbenzoate)
1,3-pentanediol monobenzoate monocinnamate
1,3-pentanediol dicinnamate
2,2,4-trimethyl-1,3-pentanediol dibenzoate
2,2,4-trimethyl-1,3-pentanediol diisopropylformate
3-methyl-1-trifluoromethyl-2,4-pentanediol dibenzoate
2,4-pentanediol di(p-fluoromethylbenzoate)
2,4-pentanediol di(2-furancarboxylate)
3-butyl-3-methyl-2,4-pentanediol dibenzoate
2-ethyl-1,3-hexanediol dibenzoate
2-propyl-1,3-hexanediol dibenzoate
2-butyl-1,3-hexanediol dibenzoate
4-ethyl-1,3-hexanediol dibenzoate
4-methyl-1,3-hexanediol dibenzoate
3-methyl-1,3-hexanediol dibenzoate
3-ethyl-1,3-hexanediol dibenzoate
2,2,4,6,6-pentamethyl-3,5-hexanediol dibenzoate
2,5-hexanediol dibenzoate
hepta-6-ene-2,4-diol dibenzoate
2-methyl-hepta-6-ene-2,4-diol dibenzoate
3-methyl-hepta-6-ene-2,4-diol dibenzoate
4-methyl-hepta-6-ene-2,4-diol dibenzoate
5-methyl-hepta-6-ene-2,4-diol dibenzoate
6-methyl-hepta-6-ene-2,4-diol dibenzoate
3-ethyl-hepta-6-ene-2,4-diol dibenzoate
4-ethyl-hepta-6-ene-2,4-diol dibenzoate
5-ethyl-hepta-6-ene-2,4-diol dibenzoate
6-ethyl-hepta-6-ene-2,4-diol dibenzoate
3-propyl-hepta-6-ene-2,4-diol dibenzoate
4-propyl-hepta-6-ene-2,4-diol dibenzoate
5-propyl-hepta-6-ene-2,4-diol dibenzoate
6-propyl-hepta-6-ene-2,4-diol dibenzoate
3-butyl-hepta-6-ene-2,4-diol dibenzoate
4-butyl-hepta-6-ene-2,4-diol dibenzoate
5-butyl-hepta-6-ene-2,4-diol dibenzoate
6-butyl-hepta-6-ene-2,4-diol dibenzoate
3,5-dimethyl-hepta-6-ene-2,4-diol dibenzoate
3,5-diethyl-hepta-6-ene-2,4-diol dibenzoate
3,5-dipropyl-hepta-6-ene-2,4-diol dibenzoate
3,5-dibutyl-hepta-6-ene-2,4-diol dibenzoate
3,3-dimethyl-hepta-6-ene-2,4-diol dibenzoate
3,3-diethyl-hepta-6-ene-2,4-diol dibenzoate
3,3-dipropyl-hepta-6-ene-2,4-diol dibenzoate
3,3-dibutyl-hepta-6-ene-2,4-diol dibenzoate
3,5-heptanediol dibenzoate
2-methyl-3,5-heptanediol dibenzoate
3-methyl-3,5-heptanediol dibenzoate
4-methyl-3,5-heptanediol dibenzoate
5-methyl-3,5-heptanediol dibenzoate
6-methyl-3,5-heptanediol dibenzoate
3-ethyl-3,5-heptanediol dibenzoate
4-ethyl-3,5-heptanediol dibenzoate
5-ethyl-3,5-heptanediol dibenzoate
3-propyl-3,5-heptanediol dibenzoate
4-propyl-3,5-heptanediol dibenzoate
3-butyl-3,5-heptanediol dibenzoate
2,3-dimethyl-3,5-heptanediol dibenzoate
2,4-dimethyl-3,5-heptanediol dibenzoate
2,5-dimethyl-3,5-heptanediol dibenzoate
2,6-dimethyl-3,5-heptanediol dibenzoate
3,3-dimethyl-3,5-heptanediol dibenzoate
4,4-dimethyl-3,5-heptanediol dibenzoate
6,6-dimethyl-3,5-heptanediol dibenzoate
2,6-dimethyl-3,5-heptanediol dibenzoate
3,4-dimethyl-3,5-heptanediol dibenzoate
3,5-dimethyl-3,5-heptanediol dibenzoate
3,6-dimethyl-3,5-heptanediol dibenzoate
4,5-dimethyl-3,5-heptanediol dibenzoate
4,6-dimethyl-3,5-heptanediol dibenzoate
4,4-dimethyl-3,5-heptanediol dibenzoate
3-ethyl-2-methyl-3,5-heptanediol dibenzoate
4-ethyl-2-methyl-3,5-heptanediol dibenzoate
5-ethyl-2-methyl-3,5-heptanediol dibenzoate
3-ethyl-3-methyl-3,5-heptanediol dibenzoate
4-ethyl-3-methyl-3,5-heptanediol dibenzoate
5-ethyl-3-methyl-3,5-heptanediol dibenzoate
3-ethyl-4-methyl-3,5-heptanediol dibenzoate
4-ethyl-4-methyl-3,5-heptanediol dibenzoate
5-ethyl-4-methyl-3,5-heptanediol dibenzoate
2-methyl-3-propyl-3,5-heptanediol dibenzoate
2-methyl-4-propyl-3,5-heptanediol dibenzoate
2-methyl-5-propyl-3,5-heptanediol dibenzoate
3-methyl-3-propyl-3,5-heptanediol dibenzoate
3-methyl-4-propyl-3,5-heptanediol dibenzoate
3-methyl-5-propyl-3,5-heptanediol dibenzoate
4-methyl-3-propyl-3,5-heptanediol dibenzoate
4-methyl-4-propyl-3,5-heptanediol dibenzoate
4-methyl-5-propyl-3,5-heptanediol dibenzoate
6-methyl-2,4-heptanediol di(p-chlorobenzoate)
6-methyl-2,4-heptanediol di(p-methylbenzoate)
6-methyl-2,4-heptanediol di(m-methylbenzoate)
6-methyl-2,4-heptanediol dipivalate
hepta-6-ene-2,4-diol dipivalate
3,6-dimethyl-2,4-heptanediol dibenzoate
2,2,6,6-tetramethyl-3,5-heptanediol dibenzoate
4-methyl-3,5-octandiol dibenzoate
4-ethyl-3,5-octandiol dibenzoate
4-propyl-3,5-octandiol dibenzoate
5-propyl-3,5-octandiol dibenzoate
4-butyl-3,5-octandiol dibenzoate
4,4-dimethyl-3,5-octandiol dibenzoate
4,4-diethyl-3,5-octandiol dibenzoate
4,4-dipropyl-3,5-octandiol dibenzoate
4-methyl-4-ethyl-3,5-octandiol dibenzoate
3-phenyl-3,5-octandiol dibenzoate
3-ethyl-2-methyl-3,5-octandiol dibenzoate
4-ethyl-2-methyl-3,5-octandiol dibenzoate
5-ethyl-2-methyl-3,5-octandiol dibenzoate
6-ethyl-2-methyl-3,5-octandiol dibenzoate
5-methyl-4,6-nonandiol dibenzoate
5-ethyl-4,6-nonandiol dibenzoate
5-propyl-4,6-nonandiol dibenzoate
5-butyl-4,6-nonandiol dibenzoate
5,5-dimethyl-4,6-nonandiol dibenzoate
5,5-diethyl-4,6-nonandiol dibenzoate
5,5-dipropyl-4,6-nonandiol dibenzoate
5,5-dibutyl-4,6-nonandiol dibenzoate
5-methyl-4-ethyl-4,6-nonandiol dibenzoate
5-phenyl-4,6-nonandiol dibenzoate
4,6-nonandiol dibenzoate
9,9-bis(benzoyloxymethyl)fluorene
9,9-bis((m-methoxybenzoyloxy)methyl)fluorene
9,9-bis((m-chlorobenzoyloxy)methyl)fluorene
9,9-bis((p-chlorobenzoyloxy)methyl)fluorene
9,9-bis(cinnamoyloxymethyl)fluorene
9-(benzoyloxymethyl)-9-(propionyloxymethyl)fluorene
9,9-bis(propionyloxymethyl)fluorene
9,9-bis(acryloyloxymethyl)fluorene
9,9-bis(pivalyloxymethyl)fluorene
9,9-fluorene dimethanol dibenzoate.

The external donor compounds (c) can also be 1,3-propandiol diether compounds of formula (V) described above, wherein 2-isoamyl-2-isopropyl-1,3dimethoxypropane and 9,9-bis(methoxymethyl)fluorene are particularly preferable.

Another type of preferred external donor compounds (c) is silicon compounds of formula $R^{10}_aR^{11}_bSi(OR^9)_c$, in which a and b are independently each other an integer between 0 and 2, c is an integer between 1 and 3, and the sum of a+b+c is 4; $R^{10}$, $R^{11}$, and $R^9$ are independently each other $C_1$-$C_{18}$ hydrocarbyl optionally containing hetero-atom(s). Said silicon compound is especially preferably a silicon compound of above formula, wherein a is 1, b is 1, and c is 2, at least one of $R^{10}$ and $R^{11}$ is selected from the group consisting of branched alkyl, alkenyl, alkylene, cycloalkyl or aryl group having 3 to 10 carbon atoms, optionally containing hetero-atoms, and $R^9$ is $C_1$-$C_{10}$ alkyl group, especially methyl.

Examples of suitable silicon compounds include, but not limited to, cyclohexylmethyldimethoxysilane, diisopropyldimethoxysilane, di-n-butyl dimethoxysilane, diisobutyldimethoxysilane, diphenyldimethoxysilane, methyl-tert-butyidimethoxysilane, dicyclopentyidimethoxysilane, (2-ethylpiperidyl)(2-tert-butyl)dimethoxysilane, (1,1,1-trifluoropropan-2-yl) (2-ethylpiperidyl)dimethoxysilane, and (1,1,1-trifluoropropan-2-yl) methyldimethoxysilane.

In addition, preferred silicon compounds may be silicon compounds of above formula, wherein a is 0, b is 1, c is 3, $R^{11}$ is branched alkyl or cycloalkyl group, optionally containing hetero-atoms, and $R^9$ is methyl group. Examples of such silicon compounds include cyclohexyltrimethoxysilane, tert-butyltrimethoxysilane, and tert-hexyltrimethoxysilane.

Another type of preferred external electron donor compounds (c) is benzoates. It is especially worthy of note that this is one of the characteristics of the catalysts according to the invention. In general, when utilizing a combination of a catalyst of prior art with a benzoate compound as external electron donor in the polymerization of propylene, the obtained polymers have low isotacticity, and the polymerization activity of the catalyst is also low. However, when utilizing a combination of the solid catalyst components of the invention with a benzoate compound as external electron donor in the polymerization of propylene, very high polymerization activity can be achieved, and the polymers obtained can have relatively high isotacticity.

If used, the external donor compounds (c) can be used at such an amount that the molar ratio of organoaluminum compounds (b) to the external donor compounds (c) is in the range of from about 0.1 to about 500, preferably from about 1 to about 300, more preferably from about 3 to about 100, and the molar ratio of Titanium contained in the solid catalyst components (a) to the external donor compounds (c) is in the range of 1:0-500, preferably 1:25-100. As discussed above, when being used in the polymerization of olefins, especially propylene, the catalysts of the invention can produce polymers having very high isotactic index at high yield, showing good performance balance.

The term "polymerization" as used herein intends to include homopolymerization and copolymerization. The term "polymer" as used herein intends to include homopolymer, copolymer and terpolymer.

The catalysts of the invention can be used in the polymerization of the above-defined olefin $CH_2$=CHR, the examples of said olefin include ethylene, propylene, 1-butene, 4-methyl-1-pentene, 1-hexene, and 1-octene. In particular, said catalysts can be used to produce, such as, the following products: high-density polyethylene (HDPE, having a density higher than 0.940 g/cm$^3$), which includes ethylene homopolymer and copolymer of ethylene and α-olefins having 3 to 12 carbon atoms; linear low-density polyethylene (LLDPE, having a density lower than 0.940 g/cm$^3$), and very low density and ultra low density polyethylene (VLDPE and ULDPE, having a density lower than 0.920 g/cm$^3$, and as low as 0.880 g/cm$^3$), consisting of the copolymer of ethylene and one or more α-olefins having 3 to 12 carbon atoms, wherein the molar content of the unit derived from ethylene is higher than 80%; elastomeric copolymer of ethylene and propylene, and elastomeric terpolymers of ethylene and propylene as well as diolefins at a small ratio, wherein the weight content of the unit derived from ethylene is between about 30% and 70%; isotactic polypropylene and crystalline copolymer of propylene and ethylene and/or other α-olefins, wherein the content of the unit derived from propylene is higher than 85% by weight (random copolymer); impact propylene polymer, which are produced by sequential polymerization of propylene and the mixture of propylene and ethylene, with the content of ethylene being up to 40% by weight; copolymer of propylene and 1-butene, containing a great amount, such as from 10 to 40 percent by weight, of unit derived from 1-butene. It is especially significant that the propylene polymers produced by using the catalysts of the invention show very broad molecule weight distribution (MWD) and have very high isotactic index.

The catalysts of the invention can be used in various known olefin polymerization processes, including continuous polymerization and batch polymerization. For instance, the polymerization can be carried out in slurry with inert hydrocarbon solvents as diluent or in bulk with liquid monomers, such as propylene, as reaction media. Alternatively, the polymerization may be carried out in gas phase in one or more fluidized-bed or mechanically agitated bed reactors.

The polymerization reaction is generally carried out at a temperature of from 20 to 120° C., preferably from 40 to 80° C. When the polymerization is carried out in gas phase, operation pressure is usually in the range of from 0.5 to 10 MPa (absolute pressure, the same hereinafter), preferably from 1 to 5 MPa. The operation pressure in bulk polymerization is usually in the range of from 1 to 6 MPa, preferably from 1.5 to 4 MPa. Hydrogen or other compounds which act as chain-transfer agent can be used to control the molecular weight of polymers.

The catalysts of the invention can be directly added to the reactors for polymerization. Alternatively, the catalysts may be prepolymerized before being added to first polymerization reactor. The term "prepolymerized catalyst" as used herein intends to mean the catalyst that has been subjected to a polymerization at lower conversion extent. According to the invention, said prepolymerized catalysts comprise the prepolymers obtained by prepolymering an olefin using the solid catalyst components of the invention, with the prepolymerization convresion extent being in the range of from about 0.1 to 1000 gram olefin polymer per gram solid catalyst component.

It is possible to use at least one α-olefins, which are identical with above-mentioned olefins, in the prepolymerization, with ethylene or propylene being preferable. Specifically, the especially preferred is to use ethylene or a mixture of ethylene with one or more α-olefins at an amount up to 20 mol % in the prepolymerization reaction. Preferably, the conversion extent of the solid catalyst components prepolymerized is in the range of from about 0.2 to about 500 gram polymer per gram solid catalyst component.

The prepolymerization process can be performed at a temperature of from −20 to 80° C., preferably from 0 to 50° C., in liquid phase or gas phase. The pressure of the prepolymerization process can be generally in the range of from 0.01 to 10 MPa, and the prepolymerization time depends on prepolymerization temperature and pressure used and conversion extent required. The prepolymerization step can be carried out on-line as a part of continuous polymerization process, or carried out separately in a batch operation.

When the catalyst of the invention is used for the polymerization of the $CH_2$=CHR, a satisfactory polymerization yield can be obtained, and the polymers obtained show high stereospecificity, for example, the propylene homopolymers produced still show an isotactic index more than 95 percent even though the catalyst is not combined with an external donor, and molecular weight distribution of the polymers is relatively wide. In addition, when the catalyst is used in the copolymerization of ethylene and propylene, copolymers with relatively less gel content can be obtained. This means that when the catalyst is used to produce random polypropylene, polymers having better transparency can be obtained; when the catalyst is used to produce propylene multiphase copolymer, the copolymers with better impact resistant property can be obtained; when the catalyst is used to produce ethylene copolymer, the copolymers having more uniform comonomer sequence distribution can be obtained; and when the catalyst is used to produce ethylene-propylene elastomer, the polymers having better elasticity can be obtained.

EMBODIMENTS OF THE INVENTION

The following examples further describe the invention, but do not make limitation to the invention in any way.

Testing Methods:
1. Melting point: XT4A microscopic melting point measuring instrument (controlled temperature type).
2. Measurement of nuclear magnetic resonance: using Bruke dmx300 nuclear magnetic resonance spectrometer for $^1$H-NMR (300 MHz, unless specified otherwise, solvent is $CDCl_3$, TMS is used as internal standard, and measuring temperature is 300K).
3. Molecular weight and molecular weight distribution (MWD) (MWD=Mw/Mn) of polymer: measured by gel permeation chromatography using PL-GPC 220 with trichlorobenzene as solvent at 150° C. (standard sample: polystyrene, flow rate: 1.0 ml/min, columns: 3xPI gel 10 um M1xED-B 300×7.5 nm).
4. Isotacticity of polymer measured by heptane extraction method (heptane boiling extraction for 6 hours) as the following procedure: 2 g dried polymer sample is extracted with boiling heptane in an extractor for 6 hours, then the residual substance is dried to constant weight, and the ratio of the weight of residual polymer (g) to 2 is regarded as isotacticity.
5. Melt index: measured according to ASTM D1238-99.

SYNTHETIC EXAMPLES 1-90

Synthetic Example 1

Synthesis of 1,2,3-propanetriol tribenzoate

To 3.7 g 1,2,3-propanetriol was added 50 ml tetrahydrofuran, then added 14.5 ml pyridine with stirring. To the resulting homogueous mixture was slowly added 17.4 ml (0.15 mol) benzoyl chloride, and the mixture was stirred for 1 hour at room temperature, then heated refluxing for 6 hours. Upon completing the reaction, 40 ml water was added to dissolve the resulting salt. The mixture was extracted with toluene. Organic phase was separated, washed with saturated saline for two times, dried over anhydrous sodium sulfate, filtered. The solvent was removed to give a white solid. Recrystallization from ethyl acetate gave 1,2,3-propanetriol tribenzoate as a white crystal, the yield was 89%, and m.p. was 67-69° C.
$^1$HNMR δ (ppm):4.73(d, 4H, $CH_2$), 5.83(m, 1H, CH), 7.41-8.07(m, 15H, aromatic ring H).

Synthetic Example 2

Synthesis of 1,2-butylene-glycol dibenzoate

To the reactor were added 1,2-butylene-glycol (2.5 g), benzoyl chloride (7.8 g), pyridine (8.8 g) and tetrahydrofuran (70 ml). The reactants was mixed and heated refluxing for 4 hours, then cooled to room temperature. Water was added to the reaction system until the inorganic phase was transparent. Organic phase was separated. Inorganic phase was extracted with ethyl ether. The combined organic phase was washed with water, dried over anhydrous sodium sulfate. After concentrated, 3.95 g product was separated. $^1$H-NMR: δ (ppm) 1.0-1.1 (3H), 1.7-1.9(2H), 4.4-4.6(2H), 5.4-5.5(1H) and 7.4-8.2(10H).

Synthetic Example 3

Synthesis of 2,3-butylene-glycol dibenzoate

Synthesis procedure was similar to that described in synthetic example 2, and 4.4 g of product was obtained from 2,3-butylene-glycol. $^1$H-NMR: δ (ppm)1.4-1.6(6H), 5.3-5.5 (2H), 7.4-8.2(10H).

Synthetic Example 4

Synthesis of 1,2-phenylene dibenzoate

To 5.5 g pyrocatechol were added 50 ml tetrahydrofuran and 12.1 ml pyridine with stirring. Then to the resulting homogeneous mixture was slowly added 14.5 ml benzoyl chloride, and the reaction was stirred at room temperature for 1 hour, then heated refluxing for 4 hours. Next, 70 ml water was added to dissolve the resulting salt. The reaction mixture was extracted with toluene. Organic phase was separated, washed with saturated saline for two times, dried over anhydrous sodium sulfate. Removing solvent gave a white solid. After recrystallizing from ethyl acetate, 1,2-phenylene dibenzoate was obtained as a white crystal, the yield was 94%, and m.p. was 75-77° C.
$^1$HNMR: δ (ppm) 7.35-7.54 (m, 10H, aromatic ring H), 8.05-8.12(m, 4H, aromatic ring H).

Synthetic Example 5

Synthesis of 2,4-pentanediol dibenzoate (1) Synthesis of 2,4-pentanediol
To the mixture of 2.5 g sodium borohydride, 0.1 g sodium hydroxide, and 25 ml water, was added dropwise the solution of 10 g 2,4-pentandione in 30 ml methanol at 0-10° C. Upon completion, the solvent was removed by reduced pressure distillation, and the residue was continuously extracted with 40 ml ethyl acetate for 15 hours. The solvent was removed, and separation by column chromatography gave 9.4 g 2,4- pentadoil as a colorless liquid with the yield 90%. IR spectrum had a strong absorption peak at 3400 cm$^{-1}$, but had no absorption peak at about 1700 cm$^{-1}$. This demonstrated that the reduction reaction was carried out completely.

(2) Synthesis of 2,4-pentanediol dibenzoate

To 3.1 g (0.03 mol) 2,4-pentanediol were added 30 ml tetrahydrofuran and 7.1 g (0.09 mol) pyridine, then added 10.5 g (0.075 mol) benzoyl chloride with stirring. The reaction was heated refluxing for 4 hours, cooled and added 20 ml saturated saline. The reaction mixture was extracted with ethyl acetate, and the extract was dried over anhydrous sodium sulfate, filtered. After removing solvent, the crude was purified by column chromatography to give 8.9 g 2,4-pentanediol dibenzoate as a colorless liquid, the yield was 95%.

$^1$HNMR: δ (ppm) 1.3-1.4(8H, m, CH$_3$), 2.0-2.1(2H, m, CH$_2$), 5.2-5.3(2H, m, CH linked to ester radical), 7.3-8.0 (10H, m, ArH)

Synthetic Example 6

Synthesis of (2S,4S)-(+)-2,4-pentanediol dibenzoate

Synthesis procedure was identical with that described in synthetic example 5, step (2), and 8.9 g of target product as a colorless liquid was obtained from 3.1 g (2S,4S)-(+)-2,4-pentanediol, the yield was 95%.

$^1$HNMR: δ (ppm) 1.2-1.4(8H, m, CH$_3$), 2.0-2.1(2H, m, CH$_2$), 5.2-5.3(2H, m, CH linked to ester radical), 7.3-8.0 (10H, m, ArH)

Synthetic Example 7

Synthesis of (2R,4R)-(+)-2,4-pentanediol dibenzoate

Synthesis procedure was identical with that described in synthetic example 6, except with replacing (2S,4S)-(+)-2,4-pentanediol with (2R,4R) -(+)-2,4-pentanediol.

$^1$HNMR: δ (ppm) 1.3-1.4(8H, m, CH$_3$), 2.0-2.1(2H, m, CH$_2$), 5.2-5.3(2H, m, CH linked to ester radical), 7.3-8.0 (10H, m, ArH)

Synthetic Example 8

Synthesis of Pentaerythritol Tetrabenzoate

Synthesis procedure was similar to that described in synthetic example 1, and target product as a white solid was obtained from 4.1 g pentaerythritol, the yield was 89%, and m.p. was 95-97° C. $^1$HNMR: δ (ppm) 4.77(s, 8H, CH$_2$), 7.38-8.02(m, 20H, aromatic ring H).

Synthetic Example 9

Synthesis of 2,4-pentanediol di(m-chlorobenzoate)

To 0.03 mol 2,4-pentanediol were added 30 ml tetrahydrofuran and 0.09 mol pyridine, then added 0.075 mol m-chlorobenzoyl chloride with stirring. The reaction was heated refluxing for 4 hours, cooled and added 20 ml saturated saline. The reaction mixture was extracted with ethyl acetate, and the extract was dried over anhydrous sodium sulfate, filtered. After removing solvent, the crude was purified by column chromatography to give 2,4-pentanediol di(m-chlorobenzoate) as a colorless viscous liquid, the yield was 95%.

$^1$HNMR: δ (ppm) 1.3-1.4(6H, d, CH$_3$), 1.9-2.3(2H, m, CH$_2$), 5.2-5.3(2H, m, CH linked to ester radical), 7.3-8.1(8H, m, ArH).

Synthetic Example 10

Synthesis of 2,4-pentanediol di(p-bromobenzoate)

Synthesis procedure was similar to that described in synthetic example 9, except that m-chlorobenzoyl chloride was replaced by p-bromobenzoyl chloride. 2,4-pentanediol di(p-bromobenzoate) as a colorless liquid was obtained, the yield was 90%. $^1$HNMR: δ (ppm) 1.3-1.4(6H, d, CH$_3$), 1.8-2.2(2H, m, CH$_2$), 5.2-5.3(2H, m, CH linked to ester radical), 7.4-7.9 (8H, m, ArH).

Synthetic Example 11

Synthesis of 2,4-pentanediol di(o-bromobenzoate)

Synthesis procedure was similar to that described in synthetic example 9, except that m-chlorobenzoyl chloride was replaced by o-bromobenzoyl chloride. 2,4-pentanediol di(o-bromobenzoate) as a colorless liquid was obtained, the yield was 90%. $^1$HNMR: δ (ppm) 1.3-1.4(6H, m, CH$_3$), 2.06-2.09 (2H, d, CH$_2$), 5.2-5.3(2H, m, CH linked to ester radical), 7.3-7.9(8H, m, ArH).

Synthetic Example 12

Synthesis of 2,4-pentanediol di(p-n-butylbenzoate)

Synthesis procedure was similar to that described in synthetic example 9, except that m-chlorobenzoyl chloride was replaced by p-n-butylbenzoyl chloride. 2,4-pentanediol di(p-n-butylbenzoate) as a colorless liquid was obtained, the yield was 90%. $^1$HNMR: δ (ppm) 0.91-0.98(6H, m, CH$_3$ of butyl), 1.3-1.4(8H, m, CH$_2$ of butyl), 1.5-1.6 (6H, m, CH$_3$), 2.0-2.1 (2H, t, CH$_2$), 2.6-2.7(4H, t, CH$_2$ of butyl), 5.2-5.3(2H, m, CH linked to ester radical), 7.1-8.0(8H, m, ArH).

Synthetic Example 13

Synthesis of 2,4-pentanediol monobenzoate monocinnamate

To 0.03 mol 2,4-pentanediol were added 30 ml tetrahydrofuran and 0.04 mol pyridine, then added 0.03 mol benzoyl chloride with stirring. The reaction was heated refluxing for 4 hours, cooled. Then to the reaction were added 20 ml tetrahydrofuran and 0.05 mol pyridine, followed by 0.04 mol cinnamyl chloride with stirring. The reaction was heated refluxing for 4 hours, cooled and added 20 ml saturated saline. The reaction mixture was extracted with ethyl acetate, and the extract was dried over anhydrous sodium sulfate, filtered. After removing solvent, the crude was purified by column chromatography to give 2,4-pentanediol monobenzoate monocinnamate as a colorless liquid. The yield was 89%. $^1$HNMR: δ (ppm) 0.8-1.4(8H, m, CH$_3$), 1.9-2.1(1H, m, CH), 5.1-5.3(2H, m, CH linked to ester radical), 6.2-8.0(12H, m, ArH and =CH—)

Synthetic Example 14

Synthesis of 2,4-pentanediol dicinnamate

Synthesis procedure was similar to that described in synthetic example 9, except that m-chlorobenzoyl chloride was replaced by cinnamyl chloride. 2,4-pentanediol dicinnamate as a colorless viscous liquid was obtained, and the yield was 88%. $^1$HNMR: δ (ppm) 1.2-1.3(6H, m, CH$_3$), 2.0-2.1(2H, d, CH$_2$), 5.1-5.2(2H, m, CH linked to ester radical), 6.3-7.6 (14H, m, ArH and =CH—).

Synthetic Example 15

Synthesis of 2,4-pentanediol dipropionate

Synthesis procedure was similar to that described in synthetic example 9, except that m-chlorobenzoyl chloride was replaced by propionyl chloride. 2,4-pentanediol dipropionate as a colorless liquid was obtained, and the yield was 95%. $^1$HNMR: δ (ppm) 1.0-1.1(6H, d, CH$_3$), 1.21-1.24(6H, t, CH$_3$), 1.74-1.77(2H, m, CH$_2$), 2.2-2.3(4H, m, CH$_2$ of propionyloxy), 4.9-5.0(2H, m, CH linked to ester radical)

Synthetic Example 16

Synthesis of 2-methyl-2,4-pentanediol dibenzoate

To 0.03 mol 2-methyl-2,4-pentanediol were added 30 ml tetrahydrofuran and 0.09 mol pyridine, then added 0.075 mol benzoyl chloride with stirring. The reaction was heated refluxing for 4 hours, cooled and added 20 ml saturated saline. The reaction mixture was extracted with ethyl acetate, and the extract was dried over anhydrous sodium sulfate, filtered. After removing solvent, the crude was purified by column chromatography to give 2-methyl-2,4-pentanediol dibenzoate as a colorless liquid, and the yield was 88%.
$^1$HNMR: δ (ppm) 1.42-1.43(3H, d, CH$_3$), 1.68(6H, s, CH$_3$), 2.2-2.7(2H, d, CH$_2$), 5.53-5.58(1H, m, CH linked to ester radical), 7.3-8.0(10H, m, ArH).

Synthetic Example 17

Synthesis of 1,4-xylenediol dibenzoate

To 0.03 mol 1,4-xylenediol were added 30 ml tetrahydrofuran and 0.09 mol pyridine, then added 0.075 mol benzoyl chloride with stirring. The reaction was heated refluxing for 4 hours, cooled and added 20 ml saturated saline. The reaction mixture was extracted with ethyl acetate, and the extract was dried over anhydrous sodium sulfate, filtered. After removing solvent, the crude was purified by recrystallization from ethyl acetate and petroleum ether (1:1, v/v) to give 1,4-xylenediol dibenzoate as a white solid, and the yield was 95%, mp was 84-85° C. $^1$HNMR: δ (ppm) 5.3(4H, s, CH$_2$ linked to ester radical), 7.4-8.1(10H, m, ArH)

Synthetic Example 18

Synthesis of hepta-6-ene-2,4-diol dibenzoate

In N$_2$ atmosphere free of water and oxygen, to a reactor were added in succession 0.02 mol 2,4-dihydroxy-6-heptene, 20 mlTHF, and 0.06 mol pyridine. Then to the reaction mixture was added slowly dropwise 0.05 mol benzoyl chloride. Upon completing the addition, the reaction was heated refluxing for 8 hours, and react at room temperature for further 12 hours. Then the reaction mixture was filtered, and filter cake was washed with anhydrous ethyl ether for three times. The filtrate was washed with saturated saline completely, dried over anhydrous sodium sulfate. Removing solvent gave 5.1 g product. $^1$HNMR: δ (ppm) 1.2(3H, CH$_3$), 1.7(2H, CH$_2$), 2.2 (2H, CH$_2$), 4.8(2H, CH$_2$), 5.1(2H, CH), 5.6(1H, =CH—), 7.8(10H, ArH).

Synthetic Example 19

Synthesis of 3,5-heptandiol dibenzoate (1) Synthesis of 3,5-heptandiol
To the mixture of 2.5 g sodium borohydride, 0.05 g sodium hydroxide, and 25 ml water, was added dropwise the solution of 14.2 g 3,5-heptandione in 30 ml methanol at 0-10° C. Upon completion, the solvent was removed by reduced pressure distillation, and the residue was continuously extracted with 40 ml ethyl acetate for 15 hours. The solvent was removed to give 3,5-heptandiol as a white solid with the yield 90%, m.p. 60-65° C. IR spectrum had a strong absorption peak at 3400 cm$^{-1}$, but had no absorption peak at about 1700 cm$^{-1}$.
This demonstrated that the reduction reaction was carried out completely.
(2) Synthesis of 3,5-heptandiol dibenzoate
To 0.03 mol 3,5-heptandiol were added 30 ml tetrahydrofuran and 0.09 mol pyridine, then added 0.075 mol benzoyl chloride with stirring. The reaction was heated refluxing for 4 hours, cooled and added 20 ml saturated saline. The reaction mixture was extracted with ethyl acetate, and the extract was dried over anhydrous sodium sulfate, filtered. After removing solvent, the crude was purified by column chromatography to give 3,5-heptandiol dibenzoate as a colorless viscous liquid, and the yield was 92%.
$^1$HNMR: δ (ppm) 0.9-1.0(6H, m, CH$_3$), 1.7-1.8(4H, m, CH$_2$ of ethyl), 2.0-2.1(2H, m, CH$_2$), 5.21-5.37(2H, m, CH linked to ester radical), 7.3-8.1(10H, m, ArH).

Synthetic Example 20

Synthesis of 2,6-dimethyl-3,5-heptandiol dibenzoate (1) Synthesis of 2,6-dimethyl-3,5-heptandiol
Synthesis procedure was similar to that described in synthetic example 19(1), except that 3,5-heptandione was replaced by 2,6-dimethyl-3,5-heptandione, and finally the product was purified by distilling under reduced pressure. 2,6-dimethyl-3,5-heptandiol as a colorless liquid was obtained with a yield of 90%.
(2) Synthesis of 2,6-dimethyl-3,5-heptandiol dibenzoate
Synthesis procedure was similar to that described in synthetic example 19(2), and 2,6-dimethyl-3,5-heptandiol dibenzoate as a colorless liquid was obtained from 2,6-dimethyl-3,5-heptanediol with a yield of 88%.
$^1$HNMR: δ (ppm) 0.95-0.99(12H, m, CH$_3$), 1.9-2.0(4H, m, CH$_2$ and CH), 5.10-5.17(2H, m, CH linked to ester radical), 7.2-8.0(10H, m, ArH).

Synthetic Example 21

Synthesis of 6-methyl-2,4-heptandiol dibenzoate (1) Synthesis of 6-methyl-2,4-heptandiol
Synthesis procedure was similar to that described in synthetic example 19(1), except that 3,5-heptandione was replaced by 6-methyl-2,4-heptandione, and finally the product was purified by distilling under reduced pressure. 6-dimethyl-2,4-heptandiol as a colorless liquid was obtained with a yield of 90%.
(2) Synthesis of 6-methyl-2,4-heptandiol dibenzoate
Synthesis procedure was similar to that described in synthetic example 19(2), except that 3,5-heptanediol was replaced by 6-methyl-2,4-heptanediol. Finally, 6-methyl-2,4-heptandiol dibenzoate as a colorless liquid was obtained, and the yield was 95%.

$^1$HNMR: δ (ppm) 1.42-1.43(3H, d, CH$_3$), 1.68(6H, s, CH$_3$), 2.2-2.7(2H, d, CH$_2$), 5.53-5.58(1H, m, CH linked to ester radical), 7.3-8.0(10H, m, ArH)

Synthetic Example 22

Synthesis of 6-methyl-2,4-heptandiol di(p-methylbenzoate)

Synthesis procedure was similar to that described in synthetic example 21, except that benzoyl chloride was replaced by p-methylbenzoyl chloride.
Finally, 6-methyl-2,4-heptandiol di(p-methylbenzoate) as a colorless liquid was obtained, and the yield was 95%.
$^1$HNMR: δ (ppm) 1.42-1.43(3H, d, CH$_3$), 1.68(6H, s, CH$_3$), 2.2-2.7(2H, d, CH$_2$), 5.53-5.58(1H, m, CH linked to ester radical), 7.3-8.0(10H, m, ArH)

Synthetic Example 23

Synthesis of 1,4-di(benzoyloxymethyl)cyclohexane

To 0.03 mol 1,4-dihydroxymethylcyclohexane were added 30 ml tetrahydrofuran and 0.09 mol pyridine, then added 0.075 mol benzoyl chloride with stirring. The reaction was heated refluxing for 4 hours, cooled and added 20 ml saturated saline. The reaction mixture was extracted with ethyl acetate, and the extract was dried over anhydrous sodium sulfate, filtered. After removing solvent, the crude was purified by recrystallization from ethyl acetate and petroleum ether (2:1 v/v) to give 1,4-di(benzoyloxymethyl)cyclohexane as a white solid. The yield was 95%, and m.p. was 111-113° C.
$^1$HNMR: δ (ppm) 1.1-1.2(8H, m, cyclohexane H), 1.8-1.9 (2H, m, cyclohexane H), 4.2-4.3(4H, d, CH$_2$), 7.4-8.1(10H, m, ArH)

Synthetic Example 24

Synthesis of 3-methyl-2,4-pentanediol dibenzoate (1) Synthesis of 3-methyl-2,4-pentandione
To 0.1 mol sodium hydride was added 100 ml anhydrous tetrahydrofuran, slowly added dropwise 0.1 mol 2,4-pentandione at room temperature. Upon completion, the mixture was stirred for 0.5 hours, then 0.12 mol iodomethane was slowly added dropwise. After stirred at room temperature for 10 hours, 20 ml water was added to dissolve solid. The mixture was extracted with ethyl acetate. The solvent was removed. Distillation was carried out under reduced pressure, and cut fraction 84-86° C./4 kPa (165-166° C. at atmosphere pressure) was collected. The yield was 94%.
(2) Synthesis of 3-methyl-2,4-pentanediol dibenzoate
Synthesis procedure was similar to that described in synthetic example 19, and target product as a colorless liquid was obtained from 3-methyl-2,4-pentandione at a total yield of 86%.
$^1$HNMR: δ (ppm) 1.1-1.2(3H, m, CH$_3$), 1.3-1.4(6H, m, CH$_3$), 2.0-2.1(1H, m, CH), 5.1-5.3(2H, m, CH linked to ester radical), 7.3-8.0(10H, m, ArH)

Synthetic Example 25

Synthesis of 3-methyl-2,4-pentanediol di(p-chlorobenzoate)

Synthesis procedure was similar to that described in synthetic example 24, except that benzoyl chloride was replaced by p-chlorobenzoyl chloride. Finally, 3-methyl-2,4-pentanediol di(p-chlorobenzoate) as a colorless liquid was obtained, and the total yield was 83% from 3-methyl-2,4-pentandione.
$^1$HNMR: δ (ppm) 1.0-1.1(3H, m, CH$_3$), 1.3-1.4(6H, m, CH$_3$), 1.9-2.1(1H, m, CH), 5.1-5.3(2H, m, CH linked to ester radical), 7.3-7.9(8H, m, ArH)

Synthetic Example 26

Synthesis of 3-methyl-2,4-pentanediol di(p-methylbenzoate)

Synthesis procedure was similar to that described in synthetic example 24, except that benzoyl chloride was replaced by p-methylbenzoyl chloride. Finally, target product as a white solid was obtained, and total yield was 83% from 3-methyl-2,4-pentandione. m.p. was 91-92° C. $^1$HNMR: δ (ppm) 1.1-1.2(3H, m, CH$_3$), 1.3-1.4(6H, m, CH$_3$), 2.1-2.2(1H, m, CH), 2.3-2.4(6H, m, ArCH$_3$), 5.2-5.3(2H, m, CH linked to ester radical), 7.1-8.0(8H, m, ArH)

Synthetic Example 27

Synthesis of 3-butyl-2,4-pentanediol di(p-methylbenzoate)

Synthesis procedure was similar to that described in synthetic example 26, except that 3-methyl-2,4-pentanediol was replaced by 3-butyl-2,4-pentanediol. Finally, target product as a colorless liquid was obtained, and the yield was 95%
$^1$HNMR: δ (ppm) 0.8-0.9(3H, m, CH$_3$), 1.3-1.4(6H, m, CH$_3$), 1.5-1.7(6H, m, CH$_2$), 1.9-2.0(1H, m, CH), 2.3-2.4(6H, m, ArCH$_3$), 5.3-5.4(2H, m, CH linked to ester radical), δ 7.0-8.0 (8H, m, ArH)

Synthetic Example 28

Synthesis of 3-methyl-2,4-pentanediol di(p-tert-butylbenzoate)

Synthesis procedure was similar to that described in synthetic example 24, except that benzoyl chloride was replaced by p-tert-butylbenzoyl chloride. Finally, 3-methyl-2,4-pentanediol di(p-tert-butylbenzoate) as a colorless liquid was obtained, and total yield was 81% from 3-methyl-2,4-pentandione.
$^1$HNMR: δ (ppm) 1.1-1.4(27H, m, CH$_3$), 2.0-2.1(1H, m, CH), 5.2-5.4(2H, m, CH linked to ester radical), 7.4-8.1(8H, m, ArH)

Synthetic Example 29

Synthesis of 3-methyl-2,4-pentanediol monobenzoate monocinnamate

Synthesis procedure was similar to that described in synthetic example 13, and target product as a colorless viscous liquid was obtained from 3-methyl-2,4-pentanediol at a yield of 86%. $^1$HNMR: δ (ppm) 0.8-1.4(9H, m, CH$_3$), 1.9-2.1(1H, m, CH), 5.1-5.3(2H, m, CH linked to ester radical), 6.2-8.0 (12H, m, ArH and =CH—)

Synthetic Example 30

Synthesis of 3,3-dimethyl-2,4-pentanediol dibenzoate (1) Synthesis of 3,3-dimethyl-2,4-pentandione
To 0.1 mol sodium hydride was added 100 ml anhydrous tetrahydrofuran, and slowly added dropwise 0.12 mol 3-methyl-2,4-pentandione at room temperature. Upon completion, the mixture was stirred for 0.5 hours, then 0.12 mol iodomethane was slowly added dropwise. After stirred at room temperature for 10 hours, 20 ml water was added to dissolve solid. The mixture was extracted with ethyl acetate. The solvent was removed. Distillation was carried out under reduced pressure, and cut fraction 82-84° C./1 kPa was collected. The yield was 98%.

(2) Synthesis of 3,3-dimethyl-2,4-pentanediol dibenzoate

Synthesis procedure was similar to that described in synthetic example 19, and target product as a colorless liquid was obtained from 3,3-dimethyl-2,4-pentandione at a total yield of 86%. $^1$HNMR: δ (ppm) 1.1-1.2(6H, m, CH$_3$), 1.3-1.4(6H, m, CH$_3$), 5.2-5.3(2H, m, CH linked to ester radical), 7.4-8.1 (10H, m, ArH)

Synthetic Example 31

Synthesis of 3,3-dimethyl-2,4-pentanediol monobenzoate monocinnamate

Synthesis procedure was similar to that described in synthetic example 13, and target product as a colorless viscous liquid was obtained from 3,3-dimethyl-2,4-pentanediol at a yield of 88%. $^1$HNMR: δ (ppm) 1.0-1.1(6H, m, CH$_3$), 1.2-1.3(6H, m, CH$_3$), 5.0-5.2(2H, m, CH linked to ester radical), 6.3-8.0(12H, m, ArH and =CH—)

Synthetic Example 32

Synthesis of 3-ethyl-2,4-pentanediol dibenzoate (1) Synthesis of 3-ethyl-2,4-pentandione To a three-neck flask in N$_2$ atmosphere free of water and oxygen were successively added 0.066 mol potassium tert-butoxide and 150 mlTHF. Then to the resulting mixture was slowly added dropwise 0.06 mol acetylacetone with stirring while cooling the mixture with ice-bath. The reaction was allowed to continue at room temperature for 1 hour, then 0.07 mol iodoethane was added dropwise at room temperature. Next, the reaction was allowed to continue at room temperature for further 48 hours. After the reaction was finished, the solvent was removed by distillation. To the solid mixture was added saturated saline until the solid mixture was just completely dissolved. The solution was extracted with suitable amount of anhydrous ethyl ether for three times. The organic phase was combined and dried over anhydrous sodium sulfate. The solvent was removed to give 6.5 g product.

(2) Synthesis of 3-ethyl-2,4-pentanediol

In N$_2$ atmosphere free of water and oxygen, to a reactor were successively added 0.024 mol LiAlH$_4$ and 100 ml THF, followed by adding dropwise 0.04 mol 3-ethyl-2,4-pentandione while cooling the mixture with ice-bath. The reaction was allowed to continue at room temperature for 48 hours. Aqueous solution of sodium hydroxide was added carefully to stop the reaction. The reaction mixture was filtered and the cake was washed with anhydrous ethyl ether for three times. The organic phase was combined and dried over anhydrous sodium sulfate. Removing the solvent gave 3.4 g product.

(3) Synthesis of 3-ethyl-2,4-pentanediol dibenzoate

In N$_2$ atmosphere free of water and oxygen, to a reactor were successively added 0.02 mol 3-ethyl-2,4-pentanediol, 20 ml THF, and 0.06 mol pyridine, then slowly added dropwise 0.05 mol benzoyl chloride. The reaction was heated refluxing for 8 hours, and allowed to continue at room temperature for further 12 hours. After the reaction was finished, the reaction mixture was filtered and the cake was washed with anhydrous ethyl ether for three times. The organic phase was completely washed with saturated saline, and dried over anhydrous sodium sulfate. Removing the solvent gave 5.1 g product.

$^1$HNMR: δ (ppm) 7.25-8.17(10H, ArH), 5.39-5.47(2H, CH), 1.80(1H, CH), 1.66(2H, CH$_2$), 1.1-1.42(9H, CH$_3$)

Synthetic Example 33

Synthesis of 3-butyl-2,4-pentanediol dibenzoate

Synthesis procedure was similar to that described in synthetic example 19, and the target product as a colorless liquid was obtained from 3-butyl-2,4-pentandione at a total yield of 86%. $^1$HNMR: δ (ppm) 1.1-1.2(3H, m, CH$_3$), 1.3-1.4(6H, m, CH$_3$), 2.0-2.1(1H, m, CH), 5.1-5.3(2H, m, CH linked to ester radical), 7.3-8.0(10H, m, ArH)

Synthetic Example 34

Synthesis of 3-allyl-2,4-pentanediol dibenzoate

The procedure described in synthetic example 32 was repeated, except replacing iodoethane with bromopropylene, and 5.3 grams target product was obtained. $^1$HNMR: δ (ppm) 7.37-8.13(10H, ArH), 6.0(2H, =CH$_2$), 5.38(1H, CH), 5.12 (2H, CH), 2.49(2H, CH$_2$), 2.27(H, CH), 1.38-1.52(6H, CH$_3$)

Synthetic Example 35

Synthesis of 4-methyl-3,5-heptanediol dibenzoate (1) Synthesis of 4-methyl-3,5-heptandione To 0.02 mol sodium hydride was added 100 ml anhydrous tetrahydrofuran, slowly added dropwise 0.02 mol 3,5-heptandione at room temperature. Upon completion, the mixture was stirred for 0.5 hours, then 0.04 mol iodomethane was slowly added dropwise. After stirred at room temperature for 10 hours, 20 ml water was added. White solid was precipitated. The solid was filtered, washed with water, and dried to give 4-methyl-3,5-heptandione as a white solid, and the yield was 94%. m.p. was 91-92° C.

(2) Synthesis of 4-methyl-3,5-heptanediol dibenzoate

Synthesis procedure was similar to that described in synthetic example 19, and the target product as a colorless liquid was obtained from 4-methyl-3,5-heptandione with total yield of 79%. $^1$HNMR: δ (ppm) 0.9-1.0(6H, m, CH$_3$), 1.1-1.2(3H, m, CH$_3$), 1.7-1.8(4H, m, CH$_2$ of ethyl), 2.1-2.2(1H, m, CH$_2$), 5.21-5.27(2H, m, CH linked to ester radical), 7.3-8.1(10H, m, ArH)

Synthetic Example 36

Synthesis of 2-ethyl-1,3-hexanediol dibenzoate

Synthesis procedure was similar to that described in synthetic example 16, and the target product as a colorless liquid was obtained from 2-ethyl-1,3-hexanediol at a yield of 91%. $^1$HNMR: δ (ppm) 0.9-1.1(6H, m, CH$_3$), 1.4-1.6(6H, m, CH$_2$), 2.2-2.3(1H, m, CH), 4.3-4.5(2H, m, CH$_2$ linked to ester radical), 5.42-5.44(2H, m, CH linked to ester radical), 7.3-8.0 (10H, m, ArH)

Synthetic Example 37

Synthesis of 2,2,4-trimethyl-1,3-pentanediol dibenzoate

Synthesis procedure was similar to that described in synthetic example 16, and the target product as a colorless viscous liquid was obtained from 2,2,4-trimethyl-1,3-pentanediol at a yield of 85%.

¹HNMR: δ (ppm) 1.01-1.07(6H, m, CH₃), 1.1(6H, d, CH₃), 4.14.2(2H, m, CH₂ linked to ester radical), 5.17-5.18(1H, d, CH linked to ester radical), 7.4-8.0(10H, m, ArH)

Synthetic Example 38

Synthesis of 1,3-cyclohexanediol dibenzoate

Synthesis procedure was similar to that described in synthetic example 16, and the target product as a colorless liquid was obtained from 1,3-cyclohexanediol at a yield of 95%.
¹HNMR: δ (ppm) 1.2-2.1(8H, m, CH₂ of cyclohexane), 5.1-5.4(2H, m, CH linked to ester radical), 7.3-8.0(10H, m, ArH)

Synthetic Example 39

Synthesis of 4-methyl-3,5-octanediol dibenzoate (1) Synthesis of 3,5-octandione
In N₂ atmosphere free of water and oxygen, to a 3-neck flask placed in an ice-bath and equipped with addition funnel and reflux condenser were successively added 0.07 mol sodium hydride and 100 ml tetrahydrofuran. To the mixture was added dropwise a solution of 0.06 mol ethyl butyrate and 0.03 mol butanone with stirring. Upon completing the addition, the mixture was heated refluxing for 4 hours. The solvent and composition with a boiling point below 110° C. were removed by distillation. To the residue was added an appropriate amount of saturated saline until the solid composition was just dissolved. The mixture was extracted with ethyl ether for three times. The organic phases were combined and dried over anhydrous sodium sulfate. The solvent was removed by distillation to give 2.4 g product.

(2) Synthesis of 4-methyl-3,5-octanediol dibenzoate
Synthesis procedure was similar to that described in synthetic example 32, and the target product was obtained from 3,5-octanedione.

Synthetic Example 40

Synthesis of 5-methyl-4,6-nonanediol dibenzoate

Target product was obtained according to a synthesis procedure identical with that described in synthetic example 39, except replacing butanone with 2-pentanone.

Synthetic Example 41

Synthesis of 1,3-diphenyl-1,3-propandiol dibenzoate

Target product was prepared according to a procedure described in synthetic example 32. ¹HNMR: δ (ppm) 7.13-7.35(10H, ArH), 5.7(2H, CH), 2.6(2H, CH₂), 2.0(6H, CH₃)

Synthetic Example 42

Synthesis of 1,3-diphenyl-2-methyl-1,3-propandiol dibenzoate (1) Synthesis of 1,3-diphenyl-2-methyl-1,3-propandione
To a three-neck flask in N₂ atmosphere free of water and oxygen were successively added 0.066 mol potassium tert-butoxide and 150 mlTHF. Then to the resulting mixture was slowly added dropwise 0.06 mol dibenzoylmethane with stirring while cooling the mixture with ice-bath. The reaction was allowed to continue at room temperature for 1 hour, then 0.07 mol iodomethane was added dropwise at room temperature. Next, the reaction was allowed to continue at room temperature for further 48 hours. After the reaction was finished, the solvent was removed by distillation. To the solid mixture was added saturated saline until the solid mixture was just completely dissolved. The solution was extracted with suitable amount of anhydrous ethyl ether for three times. The organic phase was combined and dried over anhydrous sodium sulfate. The solvent was removed to give 12 g product.

(2) Synthesis of 1,3-diphenyl-2-methyl-1,3-propandiol
Synthesis procedure was similar to that described in synthetic example 32(2), and the 5.9 g target product was obtained from 1,3-diphenyl-2-methyl-1,3-propandione.

(3) Synthesis of 1,3-diphenyl-2-methyl-1,3-propandiol dibenzoate
Synthesis procedure was similar to that described in synthetic example 32(3), and the 7.3 g target product was obtained from 1,3-diphenyl-2-methyl-1,3-propandiol.
¹HNMR: δ (ppm) 7.5(20H, ArH), 5.93(2H, CH), 1.24(1H, CH), 0.95(3H, CH₃)

Synthetic Example 43

Synthesis of 1,3-diphenyl-1,3-propandiol dipropionate (1) Synthesis of 1,3-diphenyl-1,3-propandiol
Synthetic process was identical with that described in synthetic example 42(2), except replacing 1,3-diphenyl-2-methyl-1,3-propandione with dibenzoylmethane.

(2) Synthesis of 1,3-diphenyl-1,3-propandiol dipropionate
Synthetic procedure was identical with that described in synthetic example 42(3), except that benzoyl chloride was replaced by propionyl chloride, and 1,3-diphenyl-2-methyl-1,3-propandiol was replaced by 1,3-diphenyl-1,3-propandiol. ¹HNMR: δ (ppm) 7.13-7.36(10H, ArH), 5.76(2H, CH), 2.5(4H, CH₂), 2.11(2H, CH₂), 1.1(6H, CH₃)

Synthetic Example 44

Synthesis of 1,3-diphenyl-2-methyl-1,3-propandiol dipropionate

Synthetic procedure was identical with that described in synthetic example 42, except that benzoyl chloride was replaced by propionyl chloride.
¹HNMR: δ (ppm) 7.25(10H, ArH), 5.76(2H, CH), 2.5(4H, CH₂), 2.11(2H, CH₂), 1.1(6H, CH₃)

Synthetic Example 45

Synthesis of 1,3-diphenyl-2-methyl-1,3-propandiol diacetate

Synthetic procedure was identical with that described in synthetic example 42, except that benzoyl chloride was replaced by acetyl chloride.
¹HNMR: δ (ppm) 7.3(10H, ArH), 5.6(2H, CH), 2.4(1H, CH), 1.0(9H, CH₃)

Synthetic Example 46

Synthesis of 1-phenyl-2-methyl-1,3-butandiol dibenzoate (1) Synthesis of 1-phenyl-2-methyl-1,3-butandione
Synthetic procedure was identical with that described in synthetic example 42(1), except that raw material dibenzoyl methane was replaced by 1-phenyl-1,3-butandione.

(2) Synthesis of 1-phenyl-2-methyl-1,3-butandiol

Synthetic procedure was identical with that described in synthetic example 42(2), except that reducing agent LiAlH$_4$ was replaced by sodium borohydride.

(3) Synthesis of 1-phenyl-2-methyl-1,3-butandiol dibenzoate

Synthetic procedure was identical with that described in synthetic example 42(3)

Synthetic Example 47

Synthesis of hepta-6-ene-2,4-diol dipivalate

Synthetic procedure was identical with that described in synthetic example 42(3), except that raw material was hepta-6-ene-2,4-diol, and benzoyl chloride was replaced by tert-butylformyl chloride. $^1$HNMR: δ (ppm) 5.6(1H, =CH—), 5.1(2H, CH), 4.8(2H, =CH$_2$), 2.2(2H, CH$_2$), 1.7(2H, CH$_2$), 1.2(24H, CH$_3$)

Synthetic Example 48

Synthesis of 2,2,4,6,6-pentamethyl-3,5-heptandiol dibenzoate

The target product was synthesized with dipivalyl methane as starting raw material according to the process described in synthetic example 42.
$^1$HNMR: δ (ppm) 8.0(10H, ArH), 5.3(2H, CH), 2.1(1H, CH), 1.3(21H, CH$_3$)

Synthetic Example 49

Synthesis of 2,2,6,6-tetramethyl-4-ethyl-3,5-heptandiol dibenzoate

The synthetic process described in synthetic example 48 was repeated, except replacing idomethane with iodoethane.

Synthetic Example 50

Synthesis of 2-methyl-2-(2-furyl)-1,3-butandiol dibenzoate

The target product was synthesized with 2-(2-furyl)-1,3-butandione as raw material according to the process described in synthetic example 42.

Synthetic Example 51

Synthesis of 1,1-di(benzoyloxymethyl)-3-cyclohexene

Synthesis procedure was similar to that described in synthetic example 16, and the target product as a colorless viscous liquid was obtained from 1,1-di(hydroxymethyl)-3-cyclohexene at a yield of 97%. $^1$HNMR: δ (ppm) 1.2-1.3(2H, t, CH$_2$ of cyclohexene), 2.1-2.2(4H, m, CH$_2$ of cyclohexene), 4.3-4.4(4H, s, CH$_2$), 5.6-5.7(2H, m, double bond H), 7.4-8.2 (10H, m, ArH)

Synthetic Example 52

Synthesis of 1,1-di(propionyloxymethyl)-3-cyclohexene

Synthesis procedure was similar to that described in synthetic example 16, and the target product as a colorless liquid was obtained from 1,1-di(hydroxymethyl)-3-cyclohexene and propionyl chloride at a yield of 92%.
$^1$HNMR: δ (ppm) 1.07-1.11(6H, t, CH$_3$ of propionate), 1.2-1.3(2H, t, CH$_2$ of cyclohexene), 2.1-2.2(4H, m, CH$_2$ of cyclohexene), 2.23-2.25(4H, m, CH$_2$ Of propionate), 4.3-4.4 (4H, m, CH$_2$)

Synthetic Example 53

Synthesis of 2-butyl-2-ethyl-1,3-propandiol dibenzoate

Synthesis procedure was similar to that described in synthetic example 16, and the target product as a colorless liquid was obtained from 2-butyl-2-ethyl-1,3-propandiol at a yield of 93%. $^1$HNMR: δ (ppm) 0.89-0.97(6H, m, CH$_3$), 1.1-1.6 (8H, m, CH$_2$), 4.3(4H, s, CH$_2$ linked to ester radical), 7.4-8.2 (10H, m, ArH)

Synthetic Example 54

Synthesis of 2,2'-biphenyldimethanol dipropionate

Synthesis procedure was similar to that described in synthetic example 52, and the target product as a colorless viscous liquid was obtained from 2,2'-biphenyldimethanol at a yield of 93%. $^1$HNMR: δ (ppm) 1.0-1.1(6H, t, CH$_3$), 2.2-2.3 (4H, m, CH$_2$), 4.8-4.9(4H, t, CH$_2$ linked to ester radical), 7.2-7.5(8H, m, ArH)

Synthetic Example 55

Synthesis of 2,2-dimethoxymethyl-1,3-propandiol dibenzoate (1) Synthesis of 2,2-dihydroxymethyl-1,3-propandiol dibenzoate To 0.05 mol pentaerythritol were added 50 ml tetrahydrofuran and 0.15 mol pyridine, then added 0.12 mol benzoyl chloride with stirring. The reaction was heated refluxing for 4 hours, cooled and added 20 ml saturated saline. The reaction mixture was extracted with ethyl acetate, and the extract was dried over anhydrous sodium sulfate. After removing solvent, the crude was purified by column chromatography to give 2,2-dihydroxymethyl-1,3-propandiol dibenzoate as a colorless viscous liquid, and the yield was 95%.

(2) Synthesis of 2,2-dimethoxymethyl-1,3-propandiol dibenzoate

To 0.03 mol 2,2-dihydroxymethyl-1,3-propandiol dibenzoate were added 30 ml tetrahydrofuran and 0.15 mol iodomethane, then added 0.08 mol sodium hydride with stirring. The reaction was stirred at room temperature for 10 hours. Excess iodomethane was removed. To the mixture was added 10 ml saturated saline, and the mixture was extracted with ethyl acetate. The extract was dried over anhydrous sodium sulfate. After removing solvent, the crude was purified by column chromatography to give 2,2-dimethoxymethyl-1,3-propandiol dibenzoate as a yellow viscous liquid, and the yield was 85%. $^1$HNMR: δ (ppm) 3.3(6H, s, CH$_3$ of ether radical), 3.6(4H, s, CH$_2$ of ether radical), 4.5(4H, s, CH$_2$ linked to ester radical), 7.4-8.0(10H, m, ArH)

Synthetic Example 56

Synthesis of 2-methyl-2-propyl-1,3-propandiol dibenzoate

Synthesis procedure was similar to that described in synthetic example 16, and the target product as a colorless liquid was obtained from 2-methyl-2-propyl-1,3-propandiol at a yield of 92%. $^1$HNMR: δ (ppm) 0.93-0.97(3H, t, CH$_3$ of propyl), 1.1(4H, s, CH$_3$), 1.1-1.5(4H, m, CH$_2$), 4.3(4H, s, CH$_2$ linked to ester radical), 7.4-8.2(10H, m, ArH)

Synthetic Example 57

Synthesis of 9,9-bis(benzoyloxymethyl)fluorene

To 11.3 g (0.05 mol) 9,9-dihydroxymethylfluorene was added 50 ml tetrahydrofuran, then added 12.1 ml (0.15 mol) pyridine with stirring. To the resulting homogenous mixture was slowly added 14.5 ml (0.125 mol) benzoyl chloride. The mixture was stirred at room temperature for 1 hour, and then heated refluxing for 4 hours. Upon reaction completion, 70 ml water was added to dissolve the resulting salt. The mixture was extracted with toluene. The organic phase was separated, washed with saturated saline for two times, dried over anhydrous sodium sulfate. The solvent was removed to give a white solid. Recrystallization from ethyl acetate gave 9,9-bis(benzoyloxymethyl)fluorene as a white crystal, the yield was 89%, and m.p. was 144-146° C. $^1$HNMR: δ (ppm) 4.74(s, 4H, CH$_2$), 7.25-7.75(m, 18H, ArH)

Synthetic Example 58

Synthesis of 9,9-bis((m-methoxybenzoyloxy)methyl)fluorene

To 4.5 g (0.02 mol) 9,9-dihydroxymethylfluorene was added 30 ml tetrahydrofuran, then added 4.8 ml (0.06 mol) pyridine with stirring. To the resulting homogenous mixture was slowly added 6.8 ml (0.04 mol) m-methoxybenzoyl chloride. The reaction was stirred at room temperature for 1 hour, then heated refluxing for 5 hours. Upon reaction completion, 40 ml water was added to dissolve the resulting salt. The mixture was extracted with toluene. The organic phase was separated, washed with saturated saline for two times, and dried over anhydrous sodium sulfate. The solvent was removed. Recrystallization from ethyl acetate gave 9,9-bis((m-methoxybenzoyloxy)methyl)fluorene as a white crystal, the yield was 78%, and m.p. was 129-130° C. $^1$HNMR: δ (ppm) 3.82(s, 6H, CH$_3$O), 4.74(m, 4H, CH$_2$), 6.91(m, 4H, ArH), 7.12-7.81(m, 16H, ArH)

Synthetic Example 59

Synthesis of 9,9-bis((m-chlorobenzoyloxy)methyl)fluorene

Synthesis procedure was similar to that described in synthetic example 17, and the target product as a white solid was obtained from 9,9-dihydroxymethylfluorene and m-chlorobenzoyl chloride at a yield of 93%.

$^1$HNMR: δ (ppm) 4.73(4H, s, CH$_2$ linked to ester radical), 7.3-8.0(8H, m, ArH)

Synthetic Example 60

Synthesis of 9-(benzoyloxymethyl)-9-(propionyloxymethyl)fluorene

To 4.5 g (0.02 mol) 9,9-di(hydroxymethyl)fluorene were added 30 ml tetrahydrofuran, and added 3.3 ml (0.03 mol) pyridine with stirring. To the resulting homogenous mixture was added slowly 2.3 ml (0.02 mol) benzoyl chloride, and the mixture was stirred at temperature for 1 hour, then heated refluxing for 5 hours. Next, the mixture was cooled to room temperature, and 20 ml tetrahydrofuran and 3.3 ml(0.03 mol) pyridine were added with stirring. To the resulting homogenous mixture was slowly added 1.8 ml (0.02 mol) propionyl chloride, and the mixture was stirred at room temperature for 1 hour, and heated refluxing for 5 hours. Then 30 ml water was added to dissolve the resulting salt. The mixture was extracted with toluene. The organic phase was separated, washed with saturated saline for two times, and dried over anhydrous sodium sulfate. The solvent was removed. Recrystallization from ethyl acetate gave 9-(benzoyloxymethyl)-9-(propionyloxymethyl)fluorene as a white crystal, and the yield was 79%. $^1$HNMR: δ (ppm) 1.23(t, 3H, CH$_3$), 2.39(m, 2H, CH$_2$), 4.48(s, 2H, COOCH$_2$), 4.62(s, 2H, OCH$_2$ linking with benzoyl), 7.33-8.03(m, 13H, ArH)

Synthetic Example 61

Synthesis of 9,9-bis(acryloyloxymethyl)fluorene

To 6.8 g (0.03 mol) 9,9-di(hydroxymethyl)fluorene was added 4.3 ml (0.06 mol) acrylic acid and 30 ml toluene. To the resulting homogenous mixture was added 0.2 ml concentrated sulfuric acid. Then the reaction mixture was heated refluxing for 7 hours, and the water resulted in the reaction process was separated by a water separator. The mixture was cooled to 70° C., neutralized to alkalinity with saturated sodium carbonate solution, and extracted with toluene. The organic phase was washed with saturated saline to neutrality and dried over anhydrous sodium sulfate. The solvent was removed. Purification by column chromatography gave 9,9-bis(acryloyloxymethyl)fluorene as a white solid, and the yield was 35%. m.p. was 73-75° C. $^1$HNMR: δ (ppm) 4.48(s, 4H, OCH$_3$), 5.85-6.43(m, 6H, H on acryl), 7.32-7.78(m, 8H, ArH)

Synthetic Example 62

Synthesis of 2,2'-biphenyldimethanol dibenzoate (1) Synthesis of diethyl 2,2'-biphenyldicarboxylate To 0.1 mol 2,2'-biphenyl dicarboxylic acid anhydride were added 0.3 mol ethanol, 40 ml toluene, and 0.4 ml concentrated sulfuric acid with stirring. Then the reaction mixture was heated refluxing and the water produced was removed by using a water separator until the amount of the water separated reached theoretical value. Upon the reaction completion, the mixture was neutralized with saturated sodium carbonate solution and extracted with ethyl acetate. The upper layer was separated, washed with saturated saline to neutrality, and dried over anhydrous sodium sulfate. The solvent was removed. Distillation under reduced pressure gave diethyl 2,2'-biphenyldicarboxylate as a colorless liquid, and the yield was 90%.

(2) Synthesis of 2,2'-biphenyldimethanol

To 3 g LiAlH$_4$ was added 100 ml anhydrous ethyl ether. While cooling with ice-bath and stirring intensely, 0.05 mol diethyl 2,2'-biphenyldicarboxylate was slowly added dropwise. The reaction mixture was heated refluxing for 5 hours, then cooled. Excess LiAlH$_4$ was decomposed with water. The mixture was filtered, and the filtrate was extracted with ethyl ether. The extract was dried over anhydrous sodium sulfate. The solvent was removed. Column chromatography gave 2,2'-biphenyldimethanol as a white solid, the yield was 75%, and m.p. was 98-103° C. IR spectrum had a strong absorption peak at 3400 cm$^{-1}$, and had no absorption peak at about 1700 cm$^{-1}$. This demonstrated that the reduction reaction was carried out completely.

(3) Synthesis of 2,2'-biphenyldimethanol dibenzoate

To 0.03 mol 2,2'-biphenyldimethanol was added 30 ml tetrahydrofuran and 0.09 mol pyridine, then added 0.075 mol benzoyl chloride with stirring. The reaction mixture was heated refluxing for 4 hours, cooled and added 20 ml saturated saline. The mixture was extracted with ethyl acetate, and extract was dried over anhydrous sodium sulfate. The solvent was removed. Column chromatography gave 2,2'-biphenyldimethanol dibenzoate as a colorless viscous liquid, and the yield was 93%.

$^1$HNMR: δ (ppm) 5.16(4H, s, CH$_2$ linked to ester radical), 7.2-8.2(18H, m, ArH)

Synthetic Example 63

Synthesis of 2-isoamyl-2-isopropyl-1,3-propandiol dibenzoate (1) Synthesis of 2-isopropyl-5-methyl-2-hexenal (referring to CN1036846C)

207 g Isovaleraldehyde and 26 ml OH$^-$ type Amberlite IRA910 resin (produced by Rohm & Hass) were heated refluxing. The water produced was removed by using a water separator, and the reaction was stopped when about 26 ml water was collected. The resin was filtered. Distillation under reduced pressure gave a cut fraction 85-90° C./20 mmHg.

(2) Synthesis of 2-isopropyl-5-methylhexanal

To 10 g 2-isopropyl-5-methyl-2-hexenal synthesized above were added 70 ml ethanol, 1 ml saturated NaHCO$_3$ solution and 0.25 g 10% Pd on carbon. N$_2$ was introduced, follwed by H$_2$, and the apparatus was connected with a graduated titration tube filled with H$_2$. The reaction was allowed to continue with stirring at room temperature and atmosphere pressure until the absorption of H$_2$ reached calculation value. The reaction mixture was filtered and the filtrate was used in the next step.

(3) Synthesis of 2-isoamyl-2-isopropyl-1,3-propandiol

To the filtrate above were added a solution of 5.3 g K$_2$CO$_3$ in 13.1 ml water and 16.9 ml 60% CH$_2$O. The mixture was heated refluxing for 7 hours. Upon completing the reaction, ethanol was removed. The organic phase was separated and washed with hot water to neutrality. Distillation under reduced pressure gave 2-isoamyl-2-isopropyl-1,3-propandiol, and b.p. was 165° C./20 mmHg.

(4) Synthesis of 2-isoamyl-2-isopropyl-1,3-propandiol dibenzoate

To 9.4 g (0.05 mol) 2-isoamyl-2-isopropyl-1,3-propandiol was added 50 ml tetrahydrofuran, then added 12.1 ml (0.15 mol) pyridine with stirring. To the resulting homogenous mixture was slowly added 14.5 ml (0.125 mol) benzoyl chloride. Then the reaction was stirred at room temperature for 1 hour and heated refluxing for 4 hours. Upon completing the reaction, 70 ml water was added to dissolve the resulting salt. The mixture was extracted with ethyl acetate. The organic phase was separated, washed with saturated saline for two times, and dried over anhydrous sodium sulfate. The solvent was removed. Distilling under reduced pressure gave 2-isoamyl-2-isopropyl-1,3-propandiol dibenzoateas a pale yellow liquid, and the yield was 91%. $^1$HNMR: δ (ppm) 0.88(d, 6H, CH$_3$ of isoamyl), 1.05(d, 6H, CH$_3$ of isopropyl), 1.24(m, 2H, CH$_2$ Of isoamyl), 1.27(m, 2H, CH$_2$ of isoamy), 1.58(m, 1H, CH of isoamyl), 2.04(1H, m, CH of isopropyl), 4.42(m, 4H, CH$_2$O of 1,3-propandiol), 7.38-8.02(m, 10H, ArH)

Synthetic Example 64

Synthesis of 2-isoamyl-2-isopropyl-1,3-propandiol di(p-chlorobenzoate)

Synthesis procedure was similar to that described in synthetic example 16, and the target product as a colorless liquid was obtained from 2-isoamyl-2-isopropyl-1,3-propandiol and p-chlorobenzoyl chloride at a yield of 92%. $^1$HNMR: δ (ppm) 0.86-0.88(6H, d, CH$_3$), 1.01-1.04(6H, d, CH$_3$), 1.2-1.3 (4H, m, CH$_2$), 1.54-1.57(1H, m, CH), 2.01-2.04(1H, m, CH), 4.3-4.4(4H, m, CH$_2$ linked to ester radical), 7.2-7.9(8H, m, ArH)

Synthetic Example 65

Synthesis of 2-isoamyl-2-isopropyl-1,3-propandiol di(p-methoxybenzoate)

To 3.8 g (0.02 mol) 2-isoamyl-2-isopropyl-1,3-propandiol, which was prepared according to the process described in synthetic example 63, was added 30 ml tetrahydrofuran, then added 4.8 ml (0.06 mol) pyridine with stirring. To the resulting homogenous mixture was slowly added 6.8 g (0.04 mol) p-methoxybenzoyl chloride. The reaction mixture was stirred at room temperature for 1 hour, then heated refluxing for 5 hours. Upon completing the reaction, 40 ml water was added to dissolve the resulting salt. The mixture was extracted with ethyl acetate. The organic phase was separated, washed with saturated saline for two times, and dried over anhydrous sodium sulfate. The solvent was removed. Distilling under reduced pressure gave 2-isoamyl-2-isopropyl-1,3-propandiol di(p-methoxybenzoate) as a colorless liquid, and the yield was 79%.

$^1$HNMR: δ (ppm) 0.89(d, 6H, CH$_3$ of isoamyl), 0.98(d, 6H, CH$_3$ of isopropyl), 1.19(m, 2H, CH$_2$ of isoamyl), 1.38(m, 2H, CH$_2$ of isoamy), 1.49(m, 1H, CH of isoamyl), 1.89(m, 1H, CH of isopropyl), 3.84(s, 6H, CH$_3$O of benzene ring), 4.34 (m, 4H, CH$_2$O of 1,3-propandiol), 6.91(m, 4H, ArH), 7.96(m, 4H, ArH)

Synthetic Example 66

Synthesis of 2-isoamyl-2-isopropyl-1,3-propandiol di(p-methylbenzoate)

The target product was obtained according to the procedure described in synthetic example 65, except replacing p-methyloxybenzoyl chloride with p-methylbenzoyl chloride. The yield was 88%. $^1$HNMR: δ (ppm) 0.88(d, 6H, CH$_3$ of isoamyl), 0.97(d, 6H, CH$_3$ of isopropyl), 1.21(m, 2H, CH$_2$ of isoamyl), 1.37(m, 2H, CH$_2$ of isoamy), 1.47(m, 1H, CH of isoamyl), 1.89(m, 1H, CH of isopropyl), 2.38(s, 6H, CH$_3$ of aromatic ring), 4.36(m, 4H, CH$_2$O of 1,3-propandiol), 7.21 (m, 4H, ArH), 7.90(m, 4H, ArH)

Synthetic Example 67

Synthesis of 2-isoamyl-2-isopropyl-1,3-propandiol monobenzoate monopropionate

To 7.5 g (0.05 mol) 2-isoamyl-2-isopropyl-1,3-propandiol, which was prepared according to the process described in synthetic example 63, was added 50 ml tetrahydrofuran, then added 4.8 ml (0.06 mol) pyridine with stirring. To the resulting homogenous mixture was slowly added 4.6 ml (0.04 mol) benzoyl chloride. The mixture was stirred at room temperature for 1 hour and heated refluxing for 5 hours. Upon completing the reaction, the reaction mixture was cooled to room temperature. To the mixture was added 30 ml tetrahydrofuran, then added 4.8 ml (0.06 mol) pyridine with stirring. To the resulting homogenous mixture was slowly added 3.5 ml (0.04 mol) propionyl chloride. The mixture was stirred at room temperature for 1 hour, and heated refluxing for 5 hours. Upon completing the reaction, 40 ml water was added to dissolve the resulting salt. The mixture was extracted with ethyl acetate. The organic phase was separated, washed with saturated saline for two times, and dried over anhydrous sodium sulfate. The solvent was removed. Distillation under reduced pressure gave colorless liquid 2-isoamyl-2-isopropyl-1,3-propandiol monobenzoate monopropionate, and the yield was 91%. $^1$HNMR: δ (ppm) 0.87(d, 6H, $CH_3$ of isoamyl), 0.93(d, 6H, $CH_3$ of isopropyl), 0.99(t, 2H, $CH_3$ of propionyl), 1.06(m, 4H, $CH_2$ of isoamy), 1.11(m, 1H, CH of isoamyl), 1.14(m, 1H, CH of isopropyl), 2.29(m, 2H, $CH_2O$ of 1,3-propandiol), 4.28(m, 2H, $CH_2O$ of 1,3-propandiol), 4.38 (m, 2H, $CH_2$ of propionyl), 7.41-8.03(m, 5H, ArH)

Synthetic Example 68

Synthesis of 2-isoamyl-2-isopropyl-1,3-propandiol dipropionate

The target product was obtained according to the procedure described in synthetic example 65, except replacing p-methyloxybenzoyl chloride with propionyl chloride. The yield was 91%. $^1$HNMR: δ (ppm) 0.88(d, 6H, $CH_3$ of isoamyl), 0.93(d, 6H, $CH_3$ of isopropyl), 1.14(m, 6H, $CH_3$ of propionyl), 1.34-1.39(m, 4H, $CH_2$ of isoamy), 1.44(m, 1H, CH of isoamyl), 1.85(m, 1H, CH of isopropyl), 2.32(m, 4H, $CH_2O$ of 1,3-propandiol), 4.07(m, 4H, $CH_2$ of propionyl)

Synthetic Example 69

Synthesis of 2-isoamyl-2-isopropyl-1,3-propandiol dicinnamate

To 7.5 g (0.04 mol) 2-isoamyl-2-isopropyl-1,3-propandiol, which was prepared according to the process described in synthetic example 63, was added 50 ml tetrahydrofuran, then added 9.7 ml (0.12 mol) pyridine with stirring. To the resulting homogenous mixture was slowly added 16.7 g(0.1 mol) cinnamoyl chloride. The mixture was stirred at room temperature for 1 hour, and heated refluxing for 4 hours. Upon completing the reaction, 50 ml water was added to dissolve the resulting salt. The mixture was extracted with ethyl acetate. The organic phase was separated, washed with saturated saline for two times, and dried over anhydrous sodium sulfate. The solvent was removed. Column chromatography gave 2-isoamyl-2-isopropyl-1,3-propandiol dicinnamate as a yellow viacous liquid, and the yield was 51%. $^1$HNMR: δ (ppm) 0.88(d, 6H, $CH_3$ of isoamyl), 0.99(d, 6H, $CH_3$ of isopropyl), 1.21(m, 2H, $CH_2$ of isoamy), 1.47(m, 2H, $CH_2$ of isoamyl), 1.51(m, 1H, CH of isoamyl), 1.96(m, 1H, CH of isopropyl), 4.26(m, 4H, $CH_2O$ of 1,3-propandiol), 6.45(d, 2H, CH linked to carbonyl), 7.26-7.70(m, 12H, ArH and =CH—)

Synthetic Example 70

Synthesis of 2,2-diisobutyl-1,3-propandiol dibenzoate (1) Synthesis of diethyl 2,2-diisobutylmalonate In $N_2$ atmosphere, to a reactor were added 100 ml ethanol and 5 g Na. After the reaction ended, to the reactor was added 16 g(0.1 mol) diethyl malonate and the mixture was stirred at room temperature for several minutes. Then 28 g (0.21 mol) isobutyl bromide was added, and the mixture was heated refluxing for 6 hours. To the reaction mixture was added 7.5 g (0.12 mol) sodium ethoxide, followed by 14 g (0.1 mol) isobutyl bromide, and the reaction was heated refluxing for 8 hours. Upon completing the reaction, most of solvent was removed by distillation under reduced pressure. The residue was extracted with hexane. After removing hexane, distillation under reduced pressure gave diethyl 2,2-diisobutylmalonate. b.p. 145-146° C./20 mmHg.

(2) Synthesis of 2,2-diisobutyl-1,3-propandiol

To 3 g (0.079 mol) $LiAlH_4$ was added 100 ml ethyl ether, then added 15.5 g (0.057 mol) diethyl 2,2-diisobutylmalonate dropwise with intensely stirring. The reaction mixture was heated refluxing for 5 hours, then poured into 100 g ice that was acidified with dilute hydrochloric acid. The mixture was extracted with ethyl ether. After remove ethyl ether from the extract, 2,2-diisobutyl-1,3-propandiol as a white solid was recrystallized from hexane, and the yield was 78%. m.p. 75-77° C.

(3) Synthesis of 2,2-diisobutyl-1,3-propandiol dibenzoate

To 7.5 g (0.04 mol) 2,2-diisobutyl-1,3-propandiol was added 50 ml tetrahydrofuran, then added 9.7 ml (0.12 mol) pyridine with stirring. To the resulting homogenous mixture was slowly added 11.6 ml (0.1 mol) benzoyl chloride. The mixture was stirred at room temperature for 1 hour, and heated refluxing for 5 hours. Upon completing the reaction, 40 ml water was added to dissolve the resulting salt. The mixture was extracted with ethyl acetate. The organic phase was separated, washed with saturated saline for two times, and dried over anhydrous sodium sulfate. The solvent was removed. Distillation under reduced pressure gave 2,2-diisobutyl-1,3-propandiol dibenzoate as a pale yellow liquid, the yield was 93%.

$^1$HNMR: δ (ppm) 0.91(d, 12H, $CH_3$), 1.21(d, 4H, $CH_2$ of isobutyl), 2.05(t, 2H, CH of isobutyl), 4.43(m, 4H, $CH_2O$ of 1,3-propandiol), 7.40-8.05(m, 10H, ArH)

Synthetic Example 71

Synthesis of 3-methyl-1-trifluoromethyl-2,4-pentandiol dibenzoate

The synthetic process was identical with synthetic example 2, and 4.3 g target product was obtained from 3-methyl-1-trifluoromethyl-2,4-pentandiol (3.4 g), benzoyl chloride (4 g), pyridine (4.5 g), and tetrahydrofuran (70 ml).

$^1$HNMR: δ (ppm) 1.4(6H), 2.2-2.4(2H), 5.1-2.6(1H), 5.8 (1H), 7.3-7.9(10H).

Synthetic Example 72

Synthesis of 1,1,1-trifluoro-3-methyl-2,4pentandiol dibenzoate

The synthetic process was identical with synthetic example 2, and 5.2 g target product was obtained from 1,1,1-trifluoro-3-methyl-2,4-pentandiol (3.8 g), benzoyl chloride (4.5 g), pyridine (4.5 g), and tetrahydrofuran (70 ml). $^1$HNMR: δ (ppm) 1.4(3H), 2.2-2.4(2H), 5.3-5.7(2H), 5.8(1H), 7.3-7.9 (10H).

Synthetic Example 73

Synthesis of 2,4-pentandiol di(p-fluoromethylbenzoate)

The synthetic process was identical with synthetic example 2. 3.5 g target product was obtained from 2,4-pentandiol (2.1 g), p-fluoromethylbenzoyl chloride (9.2 g), pyridine (6 g), and tetrahydrofuran (70 ml). $^1$HNMR: δ (ppm) 1.4(6H), 1.9-2.2(2H), 5.3-5.4(2H), 7.4-8.2(8H).

Synthetic Example 74

Synthesis of 2,2'-biphenyldimethanol dipivalate

According to the procedure described in synthetic example 16, the target product as a colorless viscous liquid was obtained from 2,2'-biphenyldimethanol and pivaloyl chloride at a yield of 93%. $^1$HNMR: δ (ppm) 1.1-1.2(18H, s, CH$_3$), 4.84-4.86(4H, d, CH$_2$ linked to ester radical), 7.3-7.4(8H, m, ArH).

Synthetic Example 75

Synthesis of 3,6-dimethyl-2,4-heptanediol dibenzoate (1) Synthesis of 3,6-dimethyl-2,4-heptandione To 0.1 mol sodium hydride was added 100 ml anhydrous tetrahydrofuran, then added slowly dropwise 0.1 mol 6-methyl-2,4-heptandione at room temperature. The reaction was stirred for 0.5 hours, then 0.12 mol iodomethane was added dropwise and the reaction was stirred at room temperature for further 10 hours. Upon completing the reaction, 20 ml water was added. The mixture was extracted with ethyl acetate. After removing the solvent, distillation under reduced pressure gave a cut fraction 88-9° C./1 kPa (165-166° C. at atmosphere pressure), and the yield was 94%.

(2) Synthesis of 3,6-dimethyl-2,4-heptanediol

To the mixture of 2.5 g sodium borohydride, 0.05 g sodium hydroxide, and 25 ml water was added dropwise the mixture of 14.2 g 3,6-dimethyl-2,4-heptandione and 30 ml methanol at 0-10° C. Upon completing the addition, the solvent was removed by reduced pressure distillation. The reaction mixture was continuously extracted with 40 ml ethyl acetate for 15 hours. The solvent was removed. Distillation under reduced pressure gave colorless liquid 3,6-dimethyl-2,4-heptanediol, and the yield was 90%. IR spectrum had a strong absorption peak at 3400 cm$^{-1}$, and had no absorption peak at about 1700 cm$^{-1}$. This demonstrated that the reduction reaction was carried out completely.

(3) Synthesis of 3,6-dimethyl-2,4-heptanediol dibenzoate

Synthesis procedure was similar to that described in synthetic example 16, and the target product as a colorless liquid was obtained from 3,6-dimethyl-2,4-heptanediol at a yield of 88%.

Synthetic Example 76

Synthesis of 2,2,6,6-tetramethyl-3,5-heptanediol dibenzoate

The target product was obtained according to a synthetic process similar to that described in synthetic example 48. $^1$HNMR: δ (ppm) 8.0(10H, ArH), 5.3(2H, CH), 2.0(2H, CH$_2$), 1.3(1H, CH$_3$)

Synthetic Example 77

Synthesis of 2,3-diisopropyl-1,4-butandiol dibenzoate (1) Synthesis of 2,3-diisopropyl-1,4-butandiol A mixture of 5.1 g LiAlH$_4$ and 120 ml ethyl ether was cooled to 0° C., then a solution of 11 g diethyl 2,3-diisopropyl-1,4-succinate and 60 ml ethyl ether was added dropwise at that temperature. Upon completing the addition, the mixture was heated refluxing for 1 hour. Then the reaction mixture was cooled to 0° C. again, and 5 ml 15% solution of sodium hydroxide and 20 ml water were added dropwise. The mixture was warmed to room temperature and allowed to react for 0.5 hours. The reaction mixture was filtered, and the filtrate was washed, dried, concentrated and distilled under reduced pressure to give 8.4 g product with a yield of 76%. bp 118° C./0.1 mmHg. $^1$HNMR: δ (ppm) 0.9(14H), 1.4(2H), 1.9(4H), 3.7(2H).

(2) Synthesis of 2,3-diisopropyl-1,4-butandiol dibenzoate 7.7 g 2,3-diisopropyl-1,4-butandiol and 100 ml THF were mixed, and to the mixture was added 12.5 g benzoyl chloride and 14 g pyridine. The mixture was heated refluxing for 4 hours. Upon completing the reaction, water was added to dissolve solid substance. The organic phase was separated, washed, dried, and concentrated to give 13.9 g product, and the yield was 87%.

$^1$HNMR: δ (ppm) 1.2-1.4(14H), 2.0-2.2(2H), 4.4-4.6(4H), 7.3-8.2(10H).

Synthetic Example 78

Synthesis of 2,3-dimethyl-1,4-butandiol dibenzoate

According to the synthetic processes described in synthetic example 77, following substance was synthesized:

(1) 2,3-dimethyl-1,4-butandiol bp95° C./0.1 mmHg; $^1$HNMR: δ (ppm) 0.7-1.8(8H), 3.2-3.8(4H), 4.8(2H).

(2) 2,3-dimethyl-1,4-butandiol, dibenzoate $^1$HNMR: (δ, ppm) 1.1-1.6(8H), 5.0-5.5(4H), 7.3-8.2 (10H).

Synthetic Example 79

Synthesis of 2,2'-diphenol dibenzoate

The target product was synthesized according to the process described in synthetic example 77. $^1$HNMR: δ (ppm) 7.2-8.0(18H).

Synthetic Example 80

Synthesis of Phthalyl Alcohol Dibenzoate

Synthesis procedure was similar to that described in synthetic example 17, and the target product as a white floc solid was obtained from 1,2-xylenediol at a yield of 95%. m.p.

65-66° C. ¹HNMR: δ (ppm) 5.5(4H, s, CH$_2$ linked to ester radical), 7.3-8.0(10H, m, ArH)

Synthetic Example 81

Synthesis of 2,5-hexanediol dibenzoate

To 2.4 g (0.02 mol) 2,5-hexanediol was added 30 ml tetrahydrofuran, then added 4.8 ml (0.06 mol) pyridine with stirring. To the resulting homogenous mixture was slowly added 5.8 ml (0.05 mol) benzoyl chloride, and the reaction was stirred at room temperature for 1 hour, then heated refluxing for 5 hours. Upon completing the reaction, 20 ml water was added to dissolve the resulting salt. The mixture was extracted with ethyl acetate. The organic phase was separated, washed with saturated saline for two times, and dried over anhydrous sodium sulfate. The solvent was removed. Distillation under reduced pressure gave colorless liquid 2,5-hexanediol dibenzoate, and the yield was 94%. ¹HNMR: δ (ppm) 1.36(d, 6H, CH$_3$), 1.86(m, 4H, CH$_2$), 5.21(m, 2H, CH), 7.40-8.16(m, 10H, ArH)

Synthetic Example 82

Synthesis of 2,5-dimethyl-2,5-hexanediol dibenzoate

Synthesis procedure was similar to that described in synthetic example 16, and the target product as a colorless viscous liquid was obtained from 2,5-dimethyl-2,5-hexanediol at a yield of 93%. ¹HNMR: δ (ppm) 1.6(12H, s, CH$_3$), 2.0(4H, s, CH$_2$), 7.4-8.0(10H, m, ArH)

Synthetic Example 83

Synthesis of 2,5-dimethyl-2,5-hexanediol dipropionate

The procedure of synthetic example 82 was repeated, except replacing benzoyl chloride with propionyl chloride. The target product as a colorless viscous liquid was obtained at a yield of 94%. ¹HNMR: δ (ppm) 1.07-1.11(6H, t, CH$_3$ of propionyloxy), 1.4(12H, s, CH$_3$), 1.8(4H, s, CH$_2$), δ 2.23-2.25(4H, m, CH$_2$ of propionyloxy)

Synthetic Example 84

Synthesis of 2,5-dimethyl-hexa-3-yne-2,5-diol dibenzoate

Synthesis procedure was similar to that described in synthetic example 16, and the target product as a colorless viscous liquid was obtained from 2,5-dimethyl-hexa-3-yne-2,5-diol at a yield of 93%. ¹HNMR: δ (ppm) 1.7(12H, s, CH$_3$), 7.4-8.0(10H, m, ArH)

Synthetic Example 85

Synthesis of 2,2-dimethyl-1,5-pentanediol dibenzoate (1) Synthesis of diethyl 2,2-dimethylglutarate
To 0.1 mol 2,2-dimethyl-glutaric acid were added 0.3 mol ethanol, 40 ml toluene, and 0.4 ml concentrated sulfuric acid with stirring. The mixture was heated refluxing, and the water produced was removed by using a water separator until the amount of the water separated reached theoretical value. The mixture was neutralized with saturated sodium carbonate solution and extracted with ethyl acetate. The upper layer solution was separated, washed with saturated saline until being neutral, and dried over anhydrous sodium sulfate. After the solvent was removed, distillation under reduced pressure gave diethyl 2,2-dimethylglutarate as a colorless liquid, and the yield was 90%.
¹HNMR: δ (ppm) 1.18(6H, s, CH$_3$), 1.23-1.27(6H, t, CH$_3$ of ethyl), 1.7-1.8(2H, t, CH$_2$), 2.25-2.29(2H, t, CH$_2$), 4.0-4.1 (4H, m, CH$_2$ of ethyl)

(2) Synthesis of 2,2-dimethylpentanediol
While cooled by an ice-bath and stirred intensely, 0.05 mol diethyl 2,2-dimethyl glutarate was added dropwise slowly to a mixture of 3 g LiAlH$_4$ and 100 ml anhydrous ethyl ether. The mixture was heated refluxing for 5 hours, then cooled. Excess LiAlH$_4$ was decomposed with water. After filtering, the filtrate was extracted with ethyl ether, and the extract was dried over anhydrous sodium sulfate. The solvent was removed. Column chromatography gave 2,2-dimethylpentanediol as a colorless viscous liquid, and the yield was 75%. IR spectrum had a strong absorption peak at 3400 cm$^{-1}$, and had no absorption peak at about 1700 cm$^{-1}$. This demonstrated that the reduction reaction was carried out completely.

(3) Synthesis of 2,2-dimethyl-1,5-pentanediol dibenzoate
Synthesis procedure was similar to that described in synthetic example 16, and the target product as a colorless viscous liquid was obtained from 2,2dimethylpentanediol at a yield of 93%. ¹HNMR: δ (ppm) 1.0(6H, s, CH$_3$), 1.3-1.4(2H, t, CH$_2$), 1.6-1.7(2H, m, CH$_2$), 4.0-4.3(4H, m, CH$_2$ linked to ester radical), 7.4-8.1(10H, m, ArH)

Synthetic Example 86

Synthesis of 1,1-bis(benzoyloxyethyl)cyclohexane (1) 1,1-bis((ethyloxycarbonyl)methyl)cyclohexane
Synthesis procedure was similar to that described in synthetic example 85(1), and 1,1-bis((ethyloxycarbonyl)methyl)cyclohexane as a colorless liquid was obtained from cyclohexane-1,1-diacetic acid at a yield of 90%. ¹HNMR: δ (ppm) 1.12-1.13(6H, t, CH$_3$), 1.3-14(10H, m, CH$_2$ of cyclohexane), 2.48(4H, s, CH$_2$), 4.0-4.1(4H, m, CH$_2$ of ethyl)

(2) Synthesis of cyclohexane-1,1-diethanol
Synthesis procedure was similar to that described in synthetic example 85(2), and cyclohexane-1,1-diethanol as a colorless viscous liquid from 1,1-bis((ethyloxycarbonyl)methyl)cyclohexane at a yield of 75%. IR spectrum had a strong —OH absorption peak at 3400 cm$^{-1}$, and had no —CO— absorption peak at about 1700 cm$^{-1}$. This demonstrated that the reduction reaction was carried out completely.

(3) Synthesis of 1,1-bis(benzoyloxyethyl)cyclohexane
Synthesis procedure was similar to that described in synthetic example 85(3), and the target product as a colorless viscous liquid was obtained from cyclohexane-1,1-diethanol at a yield of 93%. ¹HNMR: δ (ppm) 1.2-1.4(6H, m, CH$_2$ of cyclohexane), 1.4-1.5(4H, t, CH$_2$ of cyclohexane), 2.0-2.1 (4H, t, CH$_2$), 4.1-4.4(4H, m, CH$_2$ linked to ester radical), δ 7.4-8.1(10H, m, ArH)

Synthetic Example 87

Synthesis of 1,5-diphenyl-1,5-pentanediol dibenzoate (1) Synthesis of 1,5-diphenyl-1,5-pentanediol
While cooled by an ice-bath and stirred intensely, 0.0 mol 1,5-diphenyl-1,5-pentandione was added dropwise slowly to a mixture of 3 g LiAlH$_4$ and 100 ml anhydrous tetrahydrofuran. The mixture was heated refluxing for 5 hours, then cooled. Excess LiAlH$_4$ was decomposed with water. After mixing completely the reaction mixture with ethyl acetate, the mixture was filtered, and the filtrate was dried over anhydrous sodium sulfate. The solvent was removed. Column chromatography gave 1,5-diphenyl-1,5-pentanediol as a white solid, and the yield was 85%. mp: 64-67° C. IR spectrum had a strong —OH absorption peak at 3400 cm$^{-1}$, and had no —CO— absorption peak at about 1700 cm$^{-1}$. This demonstrated that the reduction reaction was carried out completely.

(2) Synthesis of 1,5-diphenyl-1,5-pentanediol dibenzoate

Synthesis procedure was similar to that described in synthetic example 16, and the target product as a colorless viscous liquid was obtained from 1,5-diphenyl-1,5-pentanediol at a yield of 93%. $^1$HNMR: δ (ppm) 1.3-1.5(2H, s, CH$_2$), 1.9-2.1(4H, m, CH$_2$), 5.94-5.97(2H, t, CH$_2$ linked to ester radical), 7.2-8.0(20H, m, ArH)

Synthetic Example 88

Synthesis of 1,5-diphenyl-1,5-pentanediol dipropionate

Synthesis procedure was similar to that described in synthetic example 16, and the target product as a colorless viscous liquid was obtained from 1,5-diphenyl-1,5-pentanediol and propionyl chloride at a yield of 94%. $^1$HNMR: δ (ppm) 1.0-1.1(6H, m, CH$_3$), 1.2-1.3(2H, m, CH$_2$), 1.7-1.9(4H, m, CH$_2$), 2.2-2.3(4H, m, CH$_2$ of propyl), 5.6-5.7(2H, t, CH$_2$ linked to ester radical), 7.2-7.8(10H, m, ArH)

Synthetic Example 89

Synthesis of bis(2-benzoyloxynaphthyl)methane

The target product was obtained by a synthetic process similar to that described in synthetic example 77. $^1$HNMR: δ (ppm)3.7-3.9(2H), 6.8-8.1(22H)

Synthetic Example 90

Synthesis of 3,4-dibutyl-1,6-hexanediol dibenzoate

The synthetic procedure was identical with that described in synthetic example 2, and 4.3 g product was obtained from 3,4-dibutyl-1,6-hexanediol (4.4 g), benzoyl chloride (3.8 g), pyridine (4.0 g), and tetrahydrofuran (70 ml).
$^1$HNMR: δ (ppm) 0.8-1.6(18H), 2.1-2.3(6H), 4.3-4.5(4H), 7.4-8.1(10H)

Catalyst Examples 1-90

Preparation of the Solid Catalyst Components

To a reactor which was completely replaced with high pure N$_2$ were added successively 4.8 g magnesium chloride, 95 ml toluene, 4 ml epoxy chloropropane, and 12.5 ml tributyl phosphate. The mixture was heated to 50° C. with stirring and held at the temperature for 2.5 hours to dissolve the solid completely, then added 1.4 g phthalic anhydride and held at the temperature for further one hour. The solution was cooled to below −25° C. and added dropwise 56 ml TiCl$_4$ over one hour, then heated slowly to 80° C. Solid was precipitated gradually during the heating. To the system were added 6 mmol of polyol ester compounds synthesized in synthetic examples 1-90, respectively, and the reaction was held at the temperature with stirring for further one hour. After removing the supernatant, to the residue was added 70 ml toluene and the supernatant was removed again after mixing completely. The washing procedure was repeated twice. The resulting solid precipitate was treated with 60 ml toluene and 40 ml TiCl$_4$ at 100° C. for 2 hours, and after removing the supernatant, the residue was treated with 60 ml toluene and 40 ml TiCl$_4$ at 100° C. for 2 hours again. After removing the supernatant, the residue was washed with 60 ml toluene under boiling state for three times, 60 ml hexane under boiling state for two times, 60 ml hexane at normal temperature for two times to yield the solid catalyst component of catalyst examples 1-90, respectively.

Comparative Examples 1-3

The procedure for preparing the solid catalyst component described in catalyst examples 1-90 was repeated, except that internal electron donor compound was replaced by di-n-butyl phthalate, 9,9-di(methoxymethyl)fluorene and diethyl 2,3-diisopropylsuccinate, respectively.

Catalyst Example 91

100 ml TiCl$_4$ was added to a reactor which was completely replaced by high pure N$_2$, and cooled to −20° C., then added 7.0 g MgCl$_2$.2.6CH$_3$CH$_2$OH spherical support (the preparation method was similar that disclosed in example 2 of U.S. Pat. No. 4,399,054, except the operation was performed at 2800 rpm rather than 10000 rpm). The reaction mixture was heated to 0° C. over one hour, continuously heated to 20° C. ovre 2 hours, and continuously heated to 40° C. over one hour. Then 1.6 g 9,9-bis(benzoyloxymethyl)fluorene which was synthesized in synthetic example 57 was added, and the reaction mixture was heated to 100° C. over one hour and held at the temperature for 2 hours. After removing the supernatant, 100 ml TiCl$_4$ was added, and the mixture was heated to 120° C. over one hour and held at the temperature for 2 hours. After removing the supernatant, the residue was washed with 60 ml hexane under boiling state for 5 times, and 60 ml hexane at normal temperature for 3 times to give 4.9 g spherical catalyst component.

Catalyst Example 92

The procedure for preparing the spherical catalyst component was identical with that described in catalyst example 91, except that polyol ester compound added was replaced by 1.7 g 2-isoamyl-2-isopropyl-1,3-propylene-glycol dibenzoate obtained in synthetic example 63. 5.1 g spherical catalyst component was obtained.

Propylene Polymerization Experiments

The catalyst components obtained in catalyst examples 1-92 were respectively used in the polymerization of propylene. Procedure for the polymerization of propylene was as follow: to a 5 L stainless steel autoclave, which had been replaced with propylene gas completely, were added 2.5 mmol AlEt$_3$, 0.1 mmol cyclohexylmethyldimethoxysilane (CHMMS), about 10 mg of the solid catalyst component prepared in catalyst examples 1-92, and 1.2 L hydrogen, followed by introduction of 2.3 L liquid propylene. The reactor was heated to 70° C., and the polymerization was performed at that temperature and autogenous pressure for one hour. After the temperature was reduced and the pressure was relieved, PP powder was removed. Polymerization results were summarized in table 1.

The solid catalyst components of comparative examples 1, 2, and 3 were respectively used in the polymerization of propylene according to the above polymerization procedure. The polymerization results were summarized in the table 2.

TABLE 1

Propylene Polymerization Results of the Solid Catalyst Components of the present invention

| Catalyst example No. | polyol ester compound | Content of polyol ester (wt %) | Ti (wt %) | Polymerization activity (kgPP/gcat.)* | Isotacticity (%) | MWD |
|---|---|---|---|---|---|---|
| 1 | 1,2,3-propanetriol tribenzoate | 15.2 | 2.7 | 9.3 | 91.4 | |
| 2 | 1,2-butylene-glycol dibenzoate | | | 19.2 | 96.0 | 6.4 |
| 3 | 2,3-butylene-glycol dibenzoate | 11.3 | 2.4 | 14.8 | 95.9 | 7.1 |
| 4 | 1,2-phenylene dibenzoate | 12.1 | 2.6 | 20.1 | 96.1 | 5.8 |
| 5 | 2,4-pentanediol dibenzoate | 18.2 | 2.9 | 51.0 | 99.5 | 5.5 |
| 6 | (2S,4S)-(+)-2,4-pentanediol dibenzoate | | | 17.7 | 95.4 | 8.2 |
| 7 | (2R,4R)-(+)-2,4-pentanediol dibenzoate | | | 18.4 | 94.6 | 8.1 |
| 8 | pentaerythritol tetrabenzoate | 18.2 | 3.1 | 8.1 | 95.1 | |
| 9 | 2,4-pentanediol di(m-chlorobenzoate) | 17.2 | 2.7 | 42.8 | 97.3 | 6.0 |
| 10 | 2,4-pentanediol di(p-bromobenzoate) | 20.1 | 2.8 | 52.5 | 97.8 | 7.2 |
| 11 | 2,4-pentanediol di(o-bromobenzoate) | 21.8 | 3.0 | 47.6 | 96.9 | 7.3 |
| 12 | 2,4-pentanediol di(p-n-butylbenzoate) | 22.1 | 3.1 | 64.2 | 98.6 | 9.7 |
| 13 | 2,4-pentanediol monobenzoate monocinnamate | | | 50.1 | 96.8 | 7.0 |
| 14 | 2,4-pentanediol dicinnamate | 18.2 | 2.8 | 17.5 | 93.8 | 6.7 |
| 15 | 2,4-pentanediol dipropionate | | | 14.9 | 92.0 | 6.9 |
| 16 | 2-methyl-2,4-pentanediol dibenzoate | | | 9.4 | 93.7 | 6.9 |
| 17 | 1,4-xylenediol dibenzoate | | | 10.6 | 96.0 | 7.2 |
| 18 | hepta-6-ene-2,4-diol dibenzoate | 24.5 | 2.9 | 55.4 | 97.8 | 6.4 |
| 19 | 3,5-heptandiol dibenzoate | 18.7 | 3.2 | 49.5 | 98.5 | 6.3 |
| 20 | 2,6-dimethyl-3,5-heptandiol dibenzoate | 18.9 | 3.0 | 44.7 | 97.9 | 7.7 |
| 21 | 6-methyl-2,4-heptandiol dibenzoate | 17.6 | 2.7 | 57.9 | 96.8 | 5.3 |
| 22 | 6-methyl-2,4-heptandiol di(p-methylbenzoate) | 19.5 | 2.9 | 59.5 | 98.4 | 6.8 |
| 23 | 1,4-dibenzoxymethyl cyclohexane | | | 12.1 | 93.7 | 7.6 |
| 24 | 3-methyl-2,4-pentanediol dibenzoate | 18.3 | 3.4 | 55.0 | 99.1 | 6.7 |
| 25 | 3-methyl-2,4-pentanediol di(p-chlorobenzoate) | 20.1 | 3.1 | 54.8 | 98.2 | 6.7 |
| 26 | 3-methyl-2,4-pentanediol di(p-methylbenzoate) | 18.9 | 2.9 | 42.7 | 98.2 | 6.6 |
| 27 | 3-butyl-2,4-pentanediol di(p-methylbenzoate) | 17.8 | 3.1 | 63.2 | 98.8 | 5.7 |
| 28 | 3-methyl-2,4-pentanediol di(p-tert-butylbenzoate) | 20.2 | 2.9 | 52.1 | 98.4 | 9.7 |
| 29 | 3-methyl-2,4-pentanediol monobenzoate monocinnamate | | | 42.0 | 97.2 | 6.2 |
| 30 | 3,3-dimethyl-2,4-pentanediol dibenzoate | 18.1 | 3.0 | 48.0 | 98.1 | 5.7 |
| 31 | 3,3-dimethyl-2,4-pentanediol monobenzoate monocinnamate | 17.5 | 2.9 | 40.5 | 95.7 | 6.6 |
| 32 | 3-ethyl-2,4-pentanediol dibenzoate | 17.6 | 2.9 | 54.8 | 98.2 | 5.8 |
| 33 | 3-butyl-2,4-pentanediol dibenzoate | 16.9 | 2.8 | 59.2 | 97.9 | 8.1 |

TABLE 1-continued

Propylene Polymerization Results of the Solid Catalyst Components of the present invention

| Catalyst example No. | polyol ester compound | Content of polyol ester (wt %) | Ti (wt %) | Polymerization activity (kgPP/gcat.)* | Isotacticity (%) | MWD |
|---|---|---|---|---|---|---|
| 34 | 3-allyl-2,4-pentanediol dibenzoate | 18.2 | 3.0 | 30.2 | 95.8 | 8.2 |
| 35 | 4-methyl-3,5-heptanediol dibenzoate | 18.3 | 3.2 | 53.6 | 97.2 | |
| 36 | 2-ethyl-1,3-hexanediol dibenzoate | 15.6 | 2.9 | 40.7 | 96.7 | 8.9 |
| 37 | 2,2,4-trimethyl-1,3-pentanediol dibenzoate | 19.2 | 2.6 | 23.5 | 97.7 | 5.6 |
| 38 | 1,3-cyclohexanediol dibenzoate | | | 13.5 | 94.3 | 7.2 |
| 39 | 4-methyl-3,5-octanediol dibenzoate | 17.8 | 3.0 | 54.3 | 96.6 | 7.3 |
| 40 | 5-methyl-4,6-nonadiol dibenzoate | 19.1 | 3.1 | 53.9 | 97.8 | |
| 41 | 1,3-diphenyl-1,3-propylene-glycol dibenzoate | | | 15.7 | 93.6 | 6.3 |
| 42 | 2-methyl-1,3-diphenyl-1,3-propylene-glycol dibenzoate | | | 13.3 | 95.1 | |
| 43 | 1,3-diphenyl-1,3-propylene-glycol dipropionate | | | 20.0 | 94.1 | 6.2 |
| 44 | 1,3-diphenyl-2-methyl-1,3-propylene-glycol dipropionate | 20.3 | 2.9 | 19.1 | 94.0 | 6.4 |
| 45 | 2-methyl-1,3-diphenyl-1,3-propylene-glycol diacetate | | | 1.7 | 94.7 | |
| 46 | 2-methyl-1-phenyl-1,3-butandiol dibenzoate | | | 14.0 | 94.9 | 6.7 |
| 47 | hepta-6-ene-2,4-diol dipivalate | | | 18.6 | 93.6 | 8.1 |
| 48 | 2,2,4,6,6-pentamethyl-3,5-heptandiol dibenzoate | 20.8 | 2.9 | 48.0 | 98.2 | 7.6 |
| 49 | 4-ethyl-2,2,6,6-tetramethyl-3,5-heptandiol dibenzoate | 21.6 | 3.2 | 51.6 | 97.9 | 7.8 |
| 50 | 2-methyl-2-(2-furyl)-1,3-butandiol dibenzoate | | | 19.8 | 95.8 | |
| 51 | 1,1-dibenzoyloxymethyl-3-cyclohexene | | | 21.3 | 96.4 | 9.0 |
| 52 | 1,1-dipropionyloxymethyl-3-cyclohexene | | | 17.0 | 96.0 | 6.3 |
| 53 | 2-butyl-2-ethyl-1,3-propylene-glycol dibenzoate | 15.7 | 2.8 | 21.4 | 97.6 | 8.3 |
| 54 | 2,2'-biphenyldimethanol dipropionate | | | 10.5 | 94.2 | 6.8 |
| 55 | 2,2-dimethoxymethyl-1,3-propylene-glycol dibenzoate | | | 11.4 | 94.3 | 5.7 |
| 56 | 2-methyl-2-propyl-1,3-propylene-glycol dibenzoate | | | 21.5 | 95.9 | 8.9 |
| 57 | 9,9-bis(benzoyloxymethyl)fluorene | 15.1 | 2.5 | 33.7 | 98.3 | 6.6 |
| 58 | 9,9-bis((m-methoxybenzoyloxy)methyl)-fluorene | 18.6 | 2.6 | 13.5 | 92.7 | |
| 59 | 9,9-bis(m-chlorobenzoyloxymethyl)fluorene | | | 32.7 | 98.5 | 7.1 |
| 60 | 9-(benzoyloxymethyl)-9-(propionyloxymethyl)fluorene | 12.6 | 2.1 | 20.2 | 96.6 | 5.9 |
| 61 | 9,9-bis(acryloyloxymethyl)fluorene | 12.1 | 1.9 | 11.9 | 95.5 | |
| 62 | 2,2'-biphenyldimethanol dibenzoate | | | 14.1 | 92.1 | 6.7 |
| 63 | 2-isoamyl-2-isopropyl-1,3-propylene-glycol dibenzoate | 12.8 | 2.4 | 31.7 | 97.8 | 5.8 |

TABLE 1-continued

Propylene Polymerization Results of the Solid Catalyst Components of the present invention

| Catalyst example No. | polyol ester compound | Content of polyol ester (wt %) | Ti (wt %) | Polymerization activity (kgPP/gcat.)* | Isotacticity (%) | MWD |
|---|---|---|---|---|---|---|
| 64 | 2-isoamyl-2-isopropyl-1,3-propylene-glycol di(p-chlorobenzoate) | 17.8 | 2.6 | 33.5 | 98.5 | 6.0 |
| 65 | 2-isoamyl-2-isopropyl-1,3-propylene-glycol di(p-methoxybenzoate) | 16.4 | 2.4 | 20.4 | 97.5 | 5.9 |
| 66 | 2-isoamyl-2-isopropyl-1,3-propylene-glycol di(p-methylbenzoate) | 14.1 | 2.3 | 24.8 | 98.1 | 6.4 |
| 67 | 2-isoamyl-2-isopropyl-1,3-propylene-glycol monobenzoate monopropionate | 11.7 | 2.0 | 18.9 | 96.7 | 6.7 |
| 68 | 2-isoamyl-2-isopropyl-1,3-propylene-glycol dipropionate | 10.2 | 2.1 | 13.9 | 91.0 | |
| 69 | 2-isoamyl-2-isopropyl-1,3-propylene-glycol dicinnamate | 15.6 | 1.9 | 14.1 | 94.3 | |
| 70 | 2,2-diisobutyl-1,3-propylene-glycol dibenzoate | 12.8 | 2.2 | 32.6 | 97.1 | 5.7 |
| 71 | 3-methyl-1-trifluoromethyl-2,4-pentanediol benzoate | 15.7 | 2.9 | 36.5 | 97.2 | 8.6 |
| 72 | 1,1,1-trifluoro-3-methyl-2,4-pentanediol dibenzoate | 16.1 | 2.8 | 34.5 | 96.4 | 10.1 |
| 73 | 2,4-pentanediol di(p-fluoromethylbenzoate) | 16.0 | 2.9 | 52.2 | 98.1 | 7.3 |
| 74 | 2,2'-biphenyldimethanol dipivalate | | | 17.2 | 93.5 | 6.7 |
| 75 | 3,6-dimethyl-2,4-heptanediol dibenzoate | | | 53.8 | 98.1 | 7.4 |
| 76 | 2,2,6,6-tetramethyl-3,5-heptanediol dibenzoate | 19.5 | 3.1 | 57.1 | 97.6 | |
| 77 | 2,3-diisopropyl-1,4-butanediol dibenzoate | | | 31.7 | 96.9 | 6.6 |
| 78 | 2,3-dimethyl-1,4-butanediol dibenzoate | | | 22.0 | 95.7 | 6.7 |
| 79 | 2,2'-biphenylene dibenzoate | 20.5 | 3.0 | 29.7 | 97.5 | 5.0 |
| 80 | 1,2-xylenediol dibenzoate | | | 11.5 | 96.4 | 5.9 |
| 81 | 2,5-hexanediol dibenzoate | 11.9 | 2.1 | 23.9 | 95.6 | |
| 82 | 2,5-dimethyl-2,5-hexanediol dibenzoate | | | 19.6 | 95.3 | |
| 83 | 2,5-dimethyl-2,5-hexanediol dipropionate | | | 12.5 | 96.3 | 5.0 |
| 84 | 2,5-dimethyl-hexa-3-yne-2,5-diol dibenzoate | 15.9 | 2.7 | 20.2 | 96.8 | 4.8 |
| 85 | 2,2-dimethyl-1,5-pentanediol dibenzoate | | | 8.0 | 95.1 | 6.6 |
| 86 | 1,1-bis(benzoyloxyethyl)cyclohexane | | | 7.5 | 92.6 | 6.6 |
| 87 | 1,5-diphenyl-1,5-pentanediol dibenzoate | | | 18.5 | 96.1 | 6.3 |
| 88 | 1,5-diphenyl-1,5-pentanediol dipropionate | | | 21.5 | 94.3 | 7.5 |
| 89 | Bis(2-benzoyloxynaphthyl)methane | 21.5 | 3.0 | 27.3 | 96.0 | 5.3 |
| 90 | 3,4-dibutyl-1,6-hexanediol dibenzoate | 20.6 | 3.1 | 30.4 | 97.0 | 7.5 |
| 91 | 9,9-bis(benzoyloxymethyl)fluorene | 9.8 | 2.3 | 34.5 | 95.9 | 8.1 |
| 92 | 2-isoamyl-2-isopropyl-1,3-propylene-glycol dibenzoate | 12.8 | 2.4 | 42.4 | 97.6 | 6.5 |

*Polymerization activity: kilograms of the polymer obtained per gram solid catalyst component.

TABLE 2

Propylene Polymerization Results of the Solid Catalyst Components of the comparative examples

| Comparative Example No. | Inner electron donor | content of external electron donor, Si/Al mole ratio | Polymerization Activity, kgPP/g cat | Isotacticity, % | MWD |
|---|---|---|---|---|---|
| 1 | di-n-butyl phthalate | 0.04 | 32.5 | 98.7 | 4.4 |
| 2 | 9,9-di(methoxymethyl)fluorene | 0.04 | 58.4 | 98.5 | 4.0 |
| 3 | diethyl 2,3-diisopropyl-succinate | 0.04 | 39.8 | 98.0 | 8.7 |

Propylene Polymerization in the Absence of External Electron Donor

According to above polymerization procedure but in the absence of external electron donor, the solid catalyst components prepared in catalyst examples 5, 24, 57, 63 and comparative example 3 were respectively used in the polymerization of propylene. The polymerization results and those obtained in the presence of external electron donor were compared in table 3.

It can be seen from the results of Table 3 that in the absence of external electron donor, the polymers obtained by using the solid catalyst components of the invention still had high isotacticity, and the polymerization activity was higher than that obtained in the presence of external electron donor. However, the polymers obtained by using the catalyst of prior art (comparative example 3) in the absence of external electron donor had low isotacticity.

Catalyst Example 93

Solid catalyst component was prepared according to the procedure described in catalyst examples 1-90, except that internal electron donor was changed to the combination of 3 mmol di-n-butyl phthalate and 3 mmol 2-isoamyl-2-isopropyl-1,3-propylene-glycol dibenzoate.

The catalyst component was used in the polymerization of propylene under the same conditions as examples 1-90, except that the amount of hydrogen was changed to 2.0 L. The polymerization activity was 34.1 kgPP/gcat, and the molecular weight distribution (MWD) of polymers was 8.6.

Catalyst Example 94

Solid catalyst component was prepared according to the procedure described in catalyst examples 1-90, except that internal electron donor was changed to the combination of 3 mmol 2-isoamyl-2-isopropyl-1,3-propylene-glycol dibenzoate and 3 mmol 9,9-di(methylmethoxy)fluorene.

The catalyst component was used in the polymerization of propylene under the same conditions as examples 1-90,

TABLE 3

Comparison of polymerization results in the presence and in the absence of external electron donor

| Number | Inner electron donor | Amount of external electron donor, Si/Al mole ratio | Polymerization Activity, kgPP/g cat | Isotacticity % | MWD |
|---|---|---|---|---|---|
| Catalyst example 5 | 2,4-pentanediol dibenzoate | 0.04 | 51.0 | 99.5 | 5.9 |
| Catalyst example 5 | As above | 0 | 53.4 | 98.1 | 5.9 |
| Catalyst example 24 | 3-methyl-2,4-pentanediol dibenzoate | 0.04 | 55.0 | 99.1 | 6.7 |
| Catalyst example 24 | As above | 0 | 60.2 | 96.5 | 6.6 |
| Catalyst example 57 | 9,9-bis(benzoyloxymethyl)fluorene | 0.04 | 33.7 | 98.3 | 6.6 |
| Catalyst example 57 | As above | 0 | 35.2 | 95.4 | 6.5 |
| Catalyst example 63 | 2-isoamyl-2-isopropyl-1,3-propylene-glycol dibenzoate | 0.04 | 31.7 | 97.8 | 5.8 |
| Catalyst example 63 | As above | 0 | 32.8 | 95.3 | 5.9 |
| Comparative example 3 | diethyl 2,3-diisopropyl-succinate | 0.04 | 39.8 | 98.0 | 8.7 |
| Comparative example 3 | As above | 0 | 27.4 | 87.3 | | except that the amount of hydrogen was changed to 2.0 L. The polymerization activity was 58.7 kgPP/gcat, and the molecular weight distribution (MWD) of polymers was 7.1.

Catalyst Example 95

To a reactor which was completely replaced with high pure $N_2$ were added successively 4.8 g magnesium chloride, 95 ml toluene, 4 ml epoxy chloropropane, and 12.5 ml tributyl phosphate. The mixture was heated to 50° C. with stirring and held at the temperature for 2.5 hours to dissolve the solid completely, then added 1.4 g phthalic anhydride and held at the temperature for further one hour. The solution was cooled to below −25° C. and added dropwise 56 ml $TiCl_4$ over one hour, then heated slowly to 80° C. Solid was precipitated gradually during the heating. To the system was added 4 mmol of 9,9-bis(benzoyloxymethyl)fluorene, and the reaction was held at the temperature with stirring for further one hour. After removing the supernatant, to the residue was added 70 ml toluene and the supernatant was removed again after mixing completely. The washing procedure was repeated twice. The resulting solid precipitate was treated with 60 ml toluene and 40 ml $TiCl_4$ at 110° C. for 0.5 hours. The $TiCl_4$-treating procedure was repeated three times. After removing the supernatant, the residue was washed with 60 ml toluene under boiling state for three times, 60 ml hexane under boiling state for two times, 60 ml hexane at normal temperature for two times to yield 6.0 grams solid catalyst component.

The solid catalyst component was used in the polymerization of propylene under the same conditions as catalyst examples 1-90. The polymerization activity was 52.7 kgPP/gcat, and the isotacticity of the polymer was 98.5%.

Catalyst Example 96

The procedures of preparing solid catalyst component and propylene polymerization were identical with those described in catalyst example 95, except that 9,9-bis(benzoyloxymethyl)fluorene was replaced by 2-isoamyl-2-isopropyl-1,3-propylene-glycol dibenzoate. The polymerization activity was 47.5 kgPP/gcat, and the isotactcity of the polymer was 98.1%.

Catalyst Examples 97-104

The solid catalyst component obtained in example 96 was used in the polymerization of propylene under the conditions of catalyst examples 1-90, except that CHMMS was replaced by different external electron donor. The results were shown in Table 4.

TABLE 4

The results of polymerization of propylene using different external electron donor

| Catalyst example No. | External Electron Donor | Activity (kgPP/gcat) | Isotacticity (%) |
|---|---|---|---|
| 97 | CHMMS | 47.5 | 98.1 |
| 98 | MPT | 46.3 | 97.4 |
| 99 | DIBS | 45.9 | 98.0 |
| 100 | DIPS | 41.5 | 97.8 |
| 101 | PPDE | 41.0 | 98.6 |
| 102 | DCPMS | 46.0 | 98.5 |
| 103 | PPDB | 41.9 | 98.2 |
| 104 | 3,3,3-trifluoropropyl-dimethoxysilane | 44.9 | 98.3 |

Wherein:
CHMMS is cyclohexylmethyldimethoxysilane
MPT is methyl p-methylbenzoate
DIBS is diisobutyldimethoxysilane
DIPS is diisopropyldimethoxysilane
PPDE is 2-isoamyl-2-isopropyl-1,3-dimethoxypropane
DCPMS is dicyclopentyldimethoxysilane
PPDB is 2-isoamyl-2-isopropyl-1,3-dibenozyloxypropane

Catalyst Examples 105 and 106 and Comparative Examples 4 and 5

In catalyst examples 105 and 106 and comparative examples 4 and 5, the solid catalyst components prepared in catalyst examples 95 and 96 and comparative examples 1 and 2 were used in the polymerization of ethylene, respectively.

Procedure of the polymerization of ethylene was as follow: To a 2 L stainless steel autoclave, which had been evacuated and replaced with high pure hydrogen for several times, were added 1 L hexane, appropriate amount of a solid catalyst component and 2.5 mmol cocatalyst $AlEt_3$ in $N_2$ atmosphere with stirring. The reactor was heated to 75° C., made up appropriate amount of high pure hydrogen to make the fractional pressure of hydrogen in the autoclave be 0.28 MPa, then introduced ethylene gas to make its fractional pressure be 0.75 MPa. The polymerization reaction was continued for 2 hours at constant temperature of 85° C. and ethylene was made up during the polymerization to maintain the fractional pressure of ethylene unchanged. Then the temperature of the autoclave was reduced, the pressure was relieved and the product was discharged. After removing solvent, the polymer was dried completely and weighted, and its properties were measured. The results of ethylene polymerization were listed in Table 5.

TABLE 5

Results of Ethylene Polymerization

| Catalyst example No. | Solid catalyst component | Polymerization Activity kgPE/gcat | Bulk density g/ml | Melt index g/10 min |
|---|---|---|---|---|
| Catalyst Example 105 | As catalyst example 95 | 14.6 | 0.28 | 0.41 |
| Catalyst Example 106 | As catalyst example 96 | 19.0 | 0.31 | 0.27 |
| Comparative 4 | As Comparative 1 | 3.82 | 0.40 | 0.53 |
| Comparative 5 | As Comparative 2 | 18.7 | 0.28 | 0.35 |

It can be seen from the results of table 5 that satisfactory polymerization activities can be achieved using the solid catalyst components of the present invention in combination with alkylaluminum, the particle morphology of the polymers was good, and the hydrogen response of the catalyst was also good.

Catalyst Examples 107-110 and Comparative Examples 6-9

In catalyst examples 107-110 and comparative examples 6-9, the solid catalyst components prepared in catalyst examples 95 and 96 and comparative example 1 were used in the copolymerization of ethylene and propylene.

Procedure of the copolymerization: To a 2 L stainless autoclave, which had been evacuated and replaced with a proportioned mixed gas of ethylene and propylene (volume ratio of ethylene to propylene is 1:3) for several times, were added 1 L hexane, appropriate amount of solid catalyst component and 2.5 mmol cocatalyst $AlEt_3$ in $N_2$ atmosphere with stirring. External electron donor CHMMS was added or not added to the autoclave. The autoclave was made up appropriate amount of high pure hydrogen to make the fractional pressure of hydrogen in the autoclave be 0.035 MPa, heated and continuously made up the mixed gas such that when the temperature of the system reached the set temperature of 60° C., the pressure of the system was 0.30 MPa. The pressure and temperature of the system were kept constantly, and the polymerization was continued for 0.5 hour. Then the temperature of the autoclave was reduced, and the product was discharged. The insoluble substance was separated from the soluble substance, and the polymer was dried completely and weighted. The results were listed in Table 6.

TABLE 6

Results of copolymerization of ethylene and propylene

| Catalyst example No. | Solid catalyst component | External Electron Donor | Activity kgPE-PP/gcat | Content of the insoluble in polymer |
|---|---|---|---|---|
| 107 | As catalyst example 95 | None | 7.0 | 12.5 |
| 108 | As catalyst example 95 | CHMMS | 3.2 | 16.9 |
| 109 | As catalyst example 96 | none | 7.5 | 7.5 |
| 110 | As catalyst example 96 | CHMMS | 6.6 | 5.5 |
| Comparative example 6 | As Comparative 2 | none | 9.8 | 16.9 |
| Comparative example 7 | As Comparative 2 | CHMMS | 11.2 | 22.8 |

It can be seen from the results of table 6 that less gel content can be achieved when using the solid catalyst components of the invention in the copolymerization of ethylene and propylene. That indicated that the solid catalyst components of the invention have better copolymerization property.

Although the present invention has been described in connection with embodiments and examples, further modifications and alternative embodiments of various aspects of the invention will be apparent to those skilled in the art in view of this description. Accordingly, this description is to be constructed as illustrative only and is for the purpose of teaching the general manner of carrying out the invention. Additionally, all cited documents are wholly incorporated into this description by reference.

What is claimed is:

1. A solid catalyst component for polymerization of olefins, comprising magnesium, titanium, a halogen and an electron donor, wherein said electron donor comprises at least one ester of polyol having the formula (I):

$$R_1CO—O—CR_3R_4-A-CR_5R_6—O—CO—R_2 \quad (I)$$

wherein the $R_1$ and $R_2$, which are identical or different, are substituted or unsubstituted hydrocarbyl having 1 to 20 carbon atoms; the $R_3$-$R_6$, which are identical or different, are selected from the group consisting of hydrogen, halogen, or substituted or unsubstituted hydrocarbyl having 1 to 20 carbon atoms; the $R_1$-$R_6$ optionally contain one or more heteroatoms replacing carbon, hydrogen atom or the both, said hetero-atom being selected from the group consisting of nitrogen, oxygen, sulfur, silicon, phosphorus, fluorine, chlorine, bromine, and iodine; two or more of $R_3$-$R_6$ are optionally linked to form a saturated or unsaturated monocyclic or polycyclic ring; A is a a bivalent linking group with a chain length of 1-10 atoms, wherein said bivalent linking group is selected from the group consisting of aliphatic, alicyclic and aromatic bivalent linking groups, wherein A optionally has $C_1$-$C_{20}$ linear or branched substituents; one or more of hydrogen atoms on the bivalent linking group as well as one or more of carbon atoms and/or hydrogen atoms on the substituents can be replaced by a hetero-atom selected from the group consisting of nitrogen, oxygen, sulfur, silicon, phosphorus, fluorine, chlorine, bromine, and iodine and two or more of said substituents on the linking group as well as said $R_3$-$R_6$ can be linked to form a saturated or unsaturated monocyclic or polycyclic ring.

2. The solid catalyst component according to claim 1, wherein said ester of polyol-of formula (I) having a formula (II):

$$R_1CO—O—C—R_3R_4-Z-CR_5R_6—O—CO—R_2 \quad (II)$$

wherein, $R_1$-$R_6$ have meanings as defined in formula (I); is a bivalent linking group with a chain length of 1-10 atoms, wherein said bivalent linking group is selected from the group consisting of aliphatic, alicyclic and aromatic bivalent radicals, and optionally carry $C_1$-$C_{20}$ linear or branched substituents; one or more of carbon atoms and/or hydrogen atoms on the substituents can be replaced by a hetero-atom selected from the group consisting of nitrogen, oxygen, sulfur, silicon, phosphorus, fluorine, chlorine, bromine, and iodine; and two or more of said substituents on the linking group as well as said $R_3$-$R_6$ groups can be linked to form a saturated or unsaturated monocyclic or polycyclic ring.

3. The solid catalyst component according to claim 2, wherein said $R_3$, $R_4$, $R_5$, and $R_6$ in the formula (II) are not all hydrogen simultaneously.

4. The solid catalyst component according to claim 2, wherein at least one of $R_3$, $R_4$, $R_5$ and $R_6$ in the formula (II) is selected from the group consisting of halogen, $C_1$-$C_{10}$ linear or branched alkyl, $C_3$-$C_{10}$ cycloalkyl, $C_6$-$C_{10}$ aryl, and $C_7$-$C_{10}$ alkaryl or aralkyl.

5. The solid catalyst component according to claim 2, wherein at least one of $R_3$, $R_4$, $R_5$ and $R_6$ in the formula (II) is selected from the group consisting of methyl, ethyl, propyl, isopropyl, butyl, tert-butyl, phenyl, and halophenyl.

6. The solid catalyst component according to claim 2, wherein at least one of $R_3$ and $R_4$, and at least one group among $R_5$ and $R_6$ in the formula (II) are selected from the group consisting of methyl, ethyl, propyl, isopropyl, butyl, tert-butyl, phenyl, and halophenyl.

7. The solid catalyst component according to claim 1, wherein in said ester of polyol of the formula (I), at least one of $R_1$ and $R_2$ containing a phenyl ring.

8. The solid catalyst component according to claim 1, wherein in said ester of polyol of the formula (I), at least one of $R_1$ and $R_2$ is selected from the group consisting of phenyl, halophenyl, alkylphenyl and haloalkylphenyl.

9. The solid catalyst component according to claim 1, wherein in said ester of polyol of the formula (I), both of $R_1$ and $R_2$ are selected from the group consisting of phenyl, halophenyl, alkylphenyl and haloalkylphenyl.

10. The solid catalyst component according to claim 1, wherein said ester of polyol of the formula (I) is selected from the group consisting of 1,3-propylene-glycol dibenzoate
2-methyl-1,3-propylene-glycol dibenzoate
2-ethyl-1,3-propylene-glycol dibenzoate
2-propyl-1,3-propylene-glycol dibenzoate
2-butyl-1,3-propylene-glycol dibenzoate
2,2-dimethyl-1,3-propylene-glycol dibenzoate
(R)-1-phenyl-1,3-propylene-glycol dibenzoate
(S)-1-phenyl-1,3-propylene-glycol dibenzoate
1,3-diphenyl-1,3-propylene-glycol dibenzoate
2-methyl-1,3-diphenyl-1,3-propylene-glycol dibenzoate
1,3-diphenyl-1,3-propylene-glycol dipropionate
2-methyl-1,3-diphenyl-1,3-propylene-glycol dipropionate
2-methyl-1,3-diphenyl-1,3-propylene-glycol diacetate
2,2-dimethyl-1,3-diphenyl-1,3-propylene-glycol dibenzoate
2,2-dimethyl-1,3-diphenyl-1,3-propylene-glycol dipropionate
2-ethyl-1,3-di(tert-butyl)-1,3-propylene-glycol dibenzoate
1,3-diphenyl-1,3-propylene-glycol diacetate
2-butyl-2-ethyl-1,3-propylene-glycol dibenzoate
2,2-diethyl-1,3-propylene-glycol dibenzoate
2-dimethoxymethyl-1,3-propylene-glycol dibenzoate
2-methyl-2-propyl-1,3-propylene-glycol dibenzoate
2-isoamyl-2-isopropyl-1,3-propylene-glycol dibenzoate
2-isoamyl-2-isopropyl-1,3-propylene-glycol di(p-chlorobenzoate)
2-isoamyl-2-isopropyl-1,3-propylene-glycol di(m-chlorobenzoate)
2-isoamyl-2-isopropyl-1,3-propylene-glycol di(p-methoxybenzoate)
2-isoamyl-2-isopropyl-1,3-propylene-glycol di(p-methylbenzoate)
2-isoamyl-2-isopropyl-1,3-propylene-glycol monobenzoate monopropionate
2-isoamyl-2-isopropyl-1,3-propylene-glycol dipropionate
2-isoamyl-2-isopropyl-1,3-propylene-glycol diacrylate
2-isoamyl-2-isopropyl-1,3-propylene-glycol dicinnamate
2,2-diisobutyl-1,3-propylene-glycol dibenzoate
2-isoamyl-2-isopropyl-1,3-propylene-glycol 2,2'-biphenyl diformate
2-isoamyl-2-isopropyl-1,3-propylene-glycol phthalate
1,3-diisopropyl-1,3-propylene-glycol di(4-butylbenzoate)
2-ethyl-2-methyl-1,3-propylene-glycol dibenzoate
2-amino-1-phenyl-1,3-propylene-glycol dibenzoate
2,2-dimethyl-1,3-propylene-glycol dibenzoate
2-methyl-1-phenyl-1,3-butylene-glycol dibenzoate
2-methyl-1-phenyl-1,3-butylene-glycol dipivalate
2-methyl-2-(2-furyl)-1,3-butylene-glycol dibenzoate
1,4-butylene-glycol dibenzoate
2,3-diisopropyl-1,4-butylene-glycol dibenzoate
2,3-dimethyl-1,4-butylene-glycol dibenzoate
2,3-diethyl-1,4-butylene-glycol dibenzoate
2,3-dibutyl-1,4-butylene-glycol dibenzoate
2,3-diisopropyl-1,4-butylene-glycol dibutyrate
4,4,4-trifluoro-1-(2-naphthyl)-1,3-butylene-glycol dibenzoate
2,4-pentanediol dibenzoate
3-methyl-2,4-pentanediol dibenzoate
3-ethyl-2,4-pentanediol dibenzoate
3-propyl-2,4-pentanediol dibenzoate
3-butyl-2,4-pentanediol dibenzoate
3,3-dimethyl-2,4-pentanediol dibenzoate
(2S,4S)-(+)-2,4-pentanediol dibenzoate
(2R,4R)-(+)-2,4-pentanediol dibenzoate
2,4-pentanediol di(p-chlorobenzoate)
2,4-pentanediol di(m-chlorobenzoate)
2,4-pentanediol di(p-bromobenzoate)
2,4-pentanediol di(o-bromobenzoate)
2,4-pentanediol di(p-methylbenzoate)
2,4-pentanediol di(p-tert-butylbenzoate)
2,4-pentanediol di(p-butylbenzoate)
2,4-pentanediol monobenzoate monocinnamate
2,4-pentanediol dicinnamate
1,3-pentanediol dipropionate
2-methyl-1,3-pentanediol dibenzoate
2-methyl-1,3-pentanediol di(p-chlorobenzoate)
2-methyl-1,3-pentanediol di(p-methylbenzoate)
2-butyl-1,3-pentanediol di(p-methylbenzoate)
2-methyl-1,3-pentanediol di(p-tert-butylbenzoate)
2-methyl-1,3-pentanediol dipivalate
2-methyl-1,3-pentanediol monobenzoate monocinnamate
2,2-dimethyl-1,3-pentanediol dibenzoate
2,2-dimethyl-1,3-pentanediol monobenzoate monocinnamate
2-ethyl-1,3-pentanediol dibenzoate
2-butyl-1,3-pentanediol dibenzoate
2-allyl-1,3-pentanediol dibenzoate
2-methyl-1,3-pentanediol monobenzoate monocinnamate
2-methyl-1,3-pentanediol dibenzoate
2-ethyl-1,3-pentanediol dibenzoate
2-propyl-1,3-pentanediol dibenzoate
2-butyl-1,3-pentanediol dibenzoate
1,3-pentanediol di(p-chlorobenzoate)
1,3-pentanediol di(m-chlorobenzoate)
1,3-pentanediol di(p-bromobenzoate)
1,3-pentanediol di(o-bromobenzoate)
1,3-pentanediol di(p-methylbenzoate)
1,3-pentanediol di(p-tert-butylbenzoate)
1,3-pentanediol di(p-butylbenzoate)
1,3-pentanediol monobenzoate monocinnamate
1,3-pentanediol dicinnamate
2,2,4-trimethyl-1,3-pentanediol dibenzoate
2,2,4-trimethyl-1,3-pentanediol di(isopropylformate)
3-methyl-1-trifluoromethyl-2,4-pentanediol dibenzoate
2,4-pentanediol di(p-fluoromethyl benzoate)
2,4-pentanediol di(2-furancarboxylate)
3-butyl-3-methyl-2,4-pentanediol dibenzoate
2,2-dimethyl-1,5-pentanediol dibenzoate
1,5-diphenyl-1,5-pentanediol dibenzoate
1,5-diphenyl-1,5-pentanediol dipropionate
2-ethyl-1,3-hexanediol dibenzoate
2-propyl-1,3-hexanediol dibenzoate
2-butyl-1,3-hexanediol dibenzoate
4-ethyl-1,3-hexanediol dibenzoate
4-methyl-1,3-hexanediol dibenzoate
3-methyl-1,3-hexanediol dibenzoate
3-ethyl-1,3-hexanediol dibenzoate
2,2,4,6,6-pentamethyl-3,5-hexanediol dibenzoate
2,5-hexanediol dibenzoate
2,5-dimethyl-2,5-hexanediol dibenzoate
2,5-dimethyl-2,5-hexanediol dipropionate
2,5-dimethyl-hexa-3-yne-2,5-diol dibenzoate
hexa-3-yne-2,5-diol dibenzoate (T)
hexa-3-yne-2,5-diol dibenzoate (S)
hexa-3-yne-2,5-diol di(2-furancarboxylate)
3,4-dibutyl-1,6-hexanediol dibenzoate
1,6-hexanediol dibenzoate
hepta-6-ene-2,4-diol dibenzoate 2-methyl-hepta-6-ene-2,4-diol dibenzoate
3-methyl-hepta-6-ene-2,4-diol dibenzoate
4-methyl-hepta-6-ene-2,4-diol dibenzoate
5-methyl-hepta-6-ene-2,4-diol dibenzoate
6-methyl-hepta-6-ene-2,4-diol dibenzoate
3-ethyl-hepta-6-ene-2,4-diol dibenzoate
4-ethyl-hepta-6-ene-2,4-diol dibenzoate
5-ethyl-hepta-6-ene-2,4-diol dibenzoate
6-ethyl-hepta-6-ene-2,4-diol dibenzoate
3-propyl-hepta-6-ene-2,4-diol dibenzoate
4-propyl-hepta-6-ene-2,4-diol dibenzoate
5-propyl-hepta-6-ene-2,4-diol dibenzoate
6-propyl-hepta-6-ene-2,4-diol dibenzoate
3-butyl-hepta-6-ene-2,4-diol dibenzoate
4-butyl-hepta-6-ene-2,4-diol dibenzoate
5-butyl-hepta-6-ene-2,4-diol dibenzoate
6-butyl-hepta-6-ene-2,4-diol dibenzoate
3,5-dimethyl-hepta-6-ene-2,4-diol dibenzoate
3,5-diethyl-hepta-6-ene-2,4-diol dibenzoate
3,5-dipropyl-hepta-6-ene-2,4-diol dibenzoate
3,5-dibutyl-hepta-6-ene-2,4-diol dibenzoate
3,3-dimethyl-hepta-6-ene-2,4-diol dibenzoate
3,3-diethyl-hepta-6-ene-2,4-diol dibenzoate
3,3-dipropyl-hepta-6-ene-2,4-diol dibenzoate
3,3-dibutyl-hepta-6-ene-2,4-diol dibenzoate
3,5-heptanediol dibenzoate
2-methyl-3,5-heptanediol dibenzoate
3-methyl-3,5-heptanediol dibenzoate
4-methyl-3,5-heptanediol dibenzoate
5-methyl-3,5-heptanediol dibenzoate
6-methyl-3,5-heptanediol dibenzoate
3-ethyl-3,5-heptanediol dibenzoate
4-ethyl-3,5-heptanediol dibenzoate
5-ethyl-3,5-heptanediol dibenzoate
3-propyl-3,5-heptanediol dibenzoate
4-propyl-3,5-heptanediol dibenzoate
3-butyl-3,5-heptanediol dibenzoate
2,3-dimethyl-3,5-heptanediol dibenzoate
2,4-dimethyl-3,5-heptanediol dibenzoate
2,5-dimethyl-3,5-heptanediol dibenzoate
2,6-dimethyl-3,5-heptanediol dibenzoate
3,3-dimethyl-3,5-heptanediol dibenzoate
4,4-dimethyl-3,5-heptanediol dibenzoate
6,6-dimethyl-3,5-heptanediol dibenzoate
3,4-dimethyl-3,5-heptanediol dibenzoate
3,5-dimethyl-3,5-heptanediol dibenzoate
3,6-dimethyl-3,5-heptanediol dibenzoate
4,5-dimethyl-3,5-heptanediol dibenzoate
4,6-dimethyl-3,5-heptanediol dibenzoate
4,4-dimethyl-3,5-heptanediol dibenzoate
6,6-dimethyl-3,5-heptanediol dibenzoate
3-ethyl-2-methyl-3,5-heptanediol dibenzoate
4-ethyl-2-methyl-3,5-heptanediol dibenzoate
5-ethyl-2-methyl-3,5-heptanediol dibenzoate
3-ethyl-3-methyl-3,5-heptanediol dibenzoate
4-ethyl-3-methyl-3,5-heptanediol dibenzoate
5-ethyl-3-methyl-3,5-heptanediol dibenzoate
3-ethyl-4-methyl-3,5-heptanediol dibenzoate
4-ethyl-4-methyl-3,5-heptanediol dibenzoate
5-ethyl-4-methyl-3,5-heptanediol dibenzoate
2-methyl-3-propyl-3,5-heptanediol dibenzoate
2-methyl-4-propyl-3,5-heptanediol dibenzoate
2-methyl-5-propyl-3,5-heptanediol dibenzoate
3-methyl-3-propyl-3,5-heptanediol dibenzoate
3-methyl-4-propyl-3,5-heptanediol dibenzoate
3-methyl-5-propyl-3,5-heptanediol dibenzoate
4-methyl-3-propyl-3,5-heptanediol dibenzoate
4-methyl-4-propyl-3,5-heptanediol dibenzoate
4-methyl-5-propyl-3,5-heptanediol dibenzoate
6-methyl-2,4-heptanediol di(p-chlorobenzoate)
6-methyl-2,4-heptanediol di(p-methylbenzoate)
6-methyl-2,4-heptanediol di(m-methylbenzoate)
6-methyl-2,4-heptanediol dipivalate
hepta-6-ene-2,4-diol dipivalate
3,6-dimethyl-2,4-heptanediol dibenzoate
2,2,6,6-tetramethyl-3,5-heptanediol dibenzoate
2,6-dimethyl-2,6-heptanediol dibenzoate
4-methyl-3,5-octandiol dibenzoate
4-ethyl-3,5-octandiol dibenzoate
4-propyl-3,5-octandiol dibenzoate
5-propyl-3,5-octandiol dibenzoate
4-butyl-3,5-octandiol dibenzoate
4,4-dimethyl-3,5-octandiol dibenzoate
4,4-diethyl-3,5-octandiol dibenzoate
4,4-dipropyl-3,5-octandiol dibenzoate
4-ethyl-4-methyl-3,5-octandiol dibenzoate
3-phenyl-3,5-octandiol dibenzoate
3-ethyl-2-methyl-3,5-octandiol dibenzoate
4-ethyl-2-methyl-3,5-octandiol dibenzoate
5-ethyl-2-methyl-3,5-octandiol dibenzoate
6-ethyl-2-methyl-3,5-octandiol dibenzoate
5-methyl-4,6-nonandiol dibenzoate
5-ethyl-4,6-nonandiol dibenzoate
5-propyl-4,6-nonandiol dibenzoate
5-butyl-4,6-nonandiol dibenzoate
5,5-dimethyl-4,6-nonandiol dibenzoate
5,5-diethyl-4,6-nonandiol dibenzoate
5,5-dipropyl-4,6-nonandiol dibenzoate
5,5-dibutyl-4,6-nonandiol dibenzoate
4-ethyl-5-methyl-4,6-nonandiol dibenzoate
5-phenyl-4,6-nonandiol dibenzoate
4,6-nonandiol dibenzoate
1,1-cyclohexane dimethanol dibenzoate
1,3-cyclohexandiol dibenzoate
1,4-cyclohexandiol dibenzoate
1,1-bis(benzoyloxyethyl)cyclohexane
1,4-bis(benzoyloxymethyl)cyclohexane
1,1-bis(benzoyloxymethyl)-3-cyclohexene
1,1-bis(propionyloxymethyl)-3-cyclohexene
9,9-bis(benzoyloxymethyl)fluorene
9,9-bis((m-methoxybenzoyloxy)methyl)fluorene
9,9-bis((m-chlorobenzoyloxy)methyl)fluorene
9,9-bis((p-chlorobenzoyloxy)methyl)fluorene
9,9-bis(cinnamoyloxymethyl)fluorene
9-(benzoyloxymethyl)-9-(propionyloxymethyl)fluorene
9,9-bis(propionyloxymethyl)fluorene
9,9-bis(acryloyloxymethyl)fluorene
9,9-bis(pivaloyloxymethyl)fluorene
9,9-fluorene dimethanol dibenzoate
1,3-phenylene dibenzoate
1,4-phenylene dibenzoate
2,2'-biphenylene dibenzoate
bis(2-benzoyloxynaphthyl)methane
1,2-xylenediol dibenzoate
1,3-xylenediol dibenzoate
1,4-xylenediol dibenzoate
2,2'-biphenyldimethanol dipivalate
2,2'-biphenyldimethanol dibenzoate
2,2'-biphenyldimethanol dipropionate
2,2'-binaphthyldimethanol dibenzoate
pentaerythritol tetrabenzoate
1,2,3-propanetriol tribenzoate.

11. The solid catalyst component according to claim 1, further comprising at least one compound selected from the group consisting of ethers, organic mono- or poly-carboxylic esters other than polyol of formula (I) and amines as additional electron donor compound(s), with the amount of the additional donor compound(s) being in the range of from 5 to 95 percent by mole of all the electron donor compounds of the solid catalyst compounds.

12. The solid catalyst component according to claim 11, wherein the ether compound is selected from the group consisting of 1,3-propanediol diethers of general formula (V):

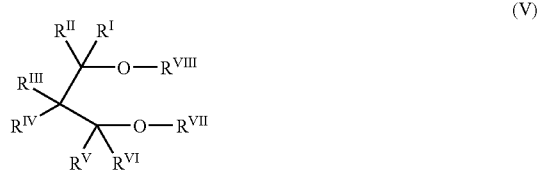

wherein $R^I$, $R^{II}$, $R^{III}$, $R^{IV}$, $R^V$, and $R^{VI}$, which are identical with or different from one another, represent hydrogen or hydrocarbon radical having 1 to 18 carbon atoms, $R^{VII}$ and $R^{VIII}$, which are identical with or different from each other, represent hydrocarbon radical having 1 to 18 carbon atoms, and two or more of $R^I$-$R^{VII}$ can be linked to form saturated or unsaturated monocyclic or polycyclic ring.

13. The solid catalyst component according to claim 12, wherein in general formula (V), $R^{VII}$ and $R^{VIII}$ are $C_1$-$C_4$ alkyl group, $R^{III}$ and $R^{IV}$ form an unsaturated fused ring, and $R^I$, $R^{II}$, $R^V$, and $R^{VI}$ are hydrogen.

14. The solid catalyst component according to claim 11, wherein the polycarboxylic ester used as additional electron donor compound is a phthalate compound.

15. The solid catalyst component according to claim 1, comprising a reaction product of a titanium compound, a magnesium compound, and a ester of polyol of formula (I), wherein
said magnesium compound is a magnesium dihalide, a hydrate or an alcohol addition compound of the magnesium dihalide, a derivative formed by replacing one halogen atom of the magnesium dihalide with a hydrocarbyloxy or halo-hydrocarbyloxy, or their mixture thereof,
and said titanium compound has the general formula $TiX_n(OR)_{4-n}$, wherein R is a hydrocarbon radical having 1 to 20 carbon atoms, X is a halogen, and n is from 1 and 4.

16. The solid catalyst component according to claim 15, wherein the magnesium compound is dissolved in a solvent system comprising an organic epoxy compound and an organophosphorus compound.

17. The solid catalyst component according to claim 16, wherein the organic epoxy compound comprises at least one oxide of an aliphatic olefin, a diolefin or a haloaliphatic olefin or a diolefin, a glycidol ether and a cyclic ether having 2-8 carbon atoms.

18. The solid catalyst component according to claim 16, wherein the organophosphorus compound is hydrocarbyl ester or a halohydrocarbyl ester of an ortho-phosphoric acid or phosphorous acid.

19. The solid catalyst component according to claim 15, wherein the magnesium compound is an alcohol addition compound of magnesium dihalide.

20. A catalyst for polymerization of olefin $CH_2$=CHR, wherein R is hydrogen or $C_1$-$C_6$ alkyl or aryl group, comprising the reaction product of the following components:

(a) solid catalyst component according to claim 1;
(b) at least one organoaluminum compound of formula $AlR_nX_{3-n}$, in which R is hydrogen or hydrocarbyl having 1 to 20 carbon atoms, X is a halogen, n is a value satisfying 1<n<3; and
(c) optionally, at least one external electron donor compound.

21. The catalyst according to claim 20, wherein the ratio of the solid catalyst component (a) to the organoaluminum compound (b) and to the external donor compound (c) is 1:5-1000:0-500, in terms of the molar ratio of titanium:aluminum:external donor compound.

22. The catalyst according to claim 20, wherein the organoaluminum compound (b) is a trialkylaluminum compound.

23. The catalyst according to claim 20, wherein the external donor compound (c) comprises at least one ester of polyol of formula (I) or formula (II) as recited in claim 1 or 2, respectively.

24. The catalyst according to claim 20, wherein the external donor compound (c) comprises at least one benzoates.

25. The catalyst according to claim 20, wherein the external donor compound (c) comprises at least one 1,3-propandiol diether of the formula (V) as recited in claim 12.

26. The catalyst according to claim 25, wherein in the formula (V), $R^{VII}$ and $R^{VIII}$ are $C_1$-$C_4$ alkyl, $R^{III}$ and $R^{IV}$ form unsaturated fused ring, and $R^I$, $R^{II}$, $R^V$, and $R^{VI}$ are hydrogen.

27. The catalyst according to claim 20, wherein the external donor compound (c) comprises a silicon compound of formula $R^{10}{}_aR^{11}{}_bSi(OR^9)_c$, in which a and b are independently an integer from 0 to 2, c is an integer from 1 to 3, and the sum of a+b+c is 4; $R^{10}$, $R^{11}$, and $R^9$ are independently $C_1$-$C_{18}$ hydrocarbyl optionally containing hetero-atom(s).

28. The catalyst according to claim 27, wherein a is 1, b is 1, and c is 2.

29. The catalyst according to claim 27, wherein $R^{10}$ and/or $R^{11}$ represent branched alkyl, alkenyl, alkylene, cycloalkyl or aryl group having 3 to 10 carbon atoms, optionally containing hetero-atoms, and $R^9$ is independently a $C_1$-$C_{10}$ alkyl group.

30. The catalyst according to claim 27, wherein a is 0, b is 1, c is 3, $R^{11}$ is a branched alkyl or cycloalkyl group, and $R^9$ is methyl.

31. A prepolymerized catalyst for polymerization of olefin $CH_2$=CHR, in which R is hydrogen or a $C_1$-$C_6$ alkyl or aryl group, comprising a prepolymer obtained by prepolymerizing an olefin in the presence of the solid catalyst component according to claim 1 and a cocatalyst to the extent such that 0.1-1000 gram of olefin polymer per gram of solid catalyst component is obtained.

32. The prepolymerized catalyst according to claim 31, wherein the olefin used in the prepolymerization is ethylene or propylene.

33. A process for the polymerization of olefin $CH_2$=CHR, in which R is hydrogen or a $C_1$-$C_6$ alkyl or aryl group, said process comprising the steps of:
(i) providing the catalyst according to claim 20;
(ii) polymerizing the olefin monomer in the presence of the catalyst to form a polymer; and
(iii) recovering the polymer.

34. The process according to claim 33, wherein the olefin is selected from the group consisting of ethylene, propylene, 1-butylene, 4-methyl-1-pentene, 1-hexene and 1-octene.

35. A process for the polymerization of olefin $CH_2$=CHR, in which R is hydrogen or a $C_1$-$C_6$ alkyl or aryl group, said process comprising the steps of:
- (i) providing the prepolymerized catalyst according to claim 31;
- (ii) polymerizing the olefin monomer in the presence of the prepolymerized catalyst to form a polymer; and
- (iii) recovering the polymer.

* * * * *